(12) United States Patent
Whalen et al.

(10) Patent No.: US 12,459,052 B2
(45) Date of Patent: Nov. 4, 2025

(54) METHODS FOR FRICTION STIR WELDING INVOLVING DISSIMILAR MATERIALS

(71) Applicant: Battelle Memorial Institute, Richland, WA (US)

(72) Inventors: Scott A. Whalen, West Richland, WA (US); M. D. Reza-E-Rabby, Richland, WA (US); Kenneth A. Ross, West Richland, WA (US); Martin McDonnell, Sterling Heights, MI (US); Yuri Hovanski, Mapleton, UT (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 18/494,648

(22) Filed: Oct. 25, 2023

(65) Prior Publication Data
US 2024/0058891 A1    Feb. 22, 2024

Related U.S. Application Data

(60) Division of application No. 16/564,872, filed on Sep. 9, 2019, now abandoned, which is a
(Continued)

(51) Int. Cl.
*B23K 20/12*    (2006.01)
*B32B 7/08*    (2019.01)
(Continued)

(52) U.S. Cl.
CPC ........ *B23K 20/127* (2013.01); *B23K 20/1255* (2013.01); *B32B 7/08* (2013.01);
(Continued)

(58) Field of Classification Search
CPC ................................................. B23K 20/2275
See application file for complete search history.

(56) References Cited

U.S. PATENT DOCUMENTS

| | | | |
|---|---|---|---|
| 3,432,369 A | 3/1969 | Naastepad | |
| 3,640,657 A | 2/1972 | Rowe et al. | |

(Continued)

FOREIGN PATENT DOCUMENTS

| | | |
|---|---|---|
| EP | 2990178 | 3/2016 |
| JP | 2003275876 | 9/2003 |
| JP | 2007222925 | 9/2007 |

OTHER PUBLICATIONS aws.org, American Welding Society Forum "Buttering", https://app.aws.org/forum/topic_show.pl?tid=17795, Sep. 4, 2008 (Year: 2008).*

(Continued)

*Primary Examiner* — Kiley S Stoner
*Assistant Examiner* — Carlos J Gamino
(74) *Attorney, Agent, or Firm* — Schwegman, Lundberg & Woessner, P.A.

(57) ABSTRACT

Methods are provided for connecting two dissimilar materials. The methods can include: placing a first material within a groove of a second material, the first material leaving at least a portion of the groove vacant; and placing a third material upon the first material and over the groove; heating the second and third materials to a temperature sufficient to plasticize the second and third materials within the groove and form a mixture of the second and third materials within the groove. Friction stir welding tools are also provided that can include a frusta conical tip having an upper portion defining smooth sidewalls and a lower portion defining a roughened structure.

16 Claims, 61 Drawing Sheets
(41 of 61 Drawing Sheet(s) Filed in Color)

Related U.S. Application Data continuation-in-part of application No. 15/694,565, filed on Sep. 1, 2017, now abandoned.

(60) Provisional application No. 62/728,604, filed on Sep. 7, 2018, provisional application No. 62/393,409, filed on Sep. 12, 2016, provisional application No. 62/533,851, filed on Jul. 18, 2017.

(51) Int. Cl.
    *B32B 15/01* (2006.01)
    *B23K 103/04* (2006.01)
    *B23K 103/10* (2006.01)
    *B23K 103/20* (2006.01)

(52) U.S. Cl.
    CPC ........ *B32B 15/012* (2013.01); *B23K 2103/04* (2018.08); *B23K 2103/10* (2018.08); *B23K 2103/20* (2018.08)

(56) References Cited

U.S. PATENT DOCUMENTS

| | | | |
|---|---|---|---|
| 3,661,726 A | 5/1972 | Denes | |
| 3,684,593 A | 8/1972 | Benz et al. | |
| 3,884,062 A | 5/1975 | Green | |
| 3,892,603 A | 7/1975 | Reid | |
| 3,933,536 A | 1/1976 | Doser et al. | |
| 3,977,918 A | 8/1976 | Paladino et al. | |
| 3,989,548 A | 11/1976 | Morris | |
| 4,010,965 A * | 3/1977 | Izuma | B23K 20/085 428/685 |
| 4,287,749 A | 9/1981 | Bachrach et al. | |
| 4,300,376 A | 11/1981 | Wilmotte | |
| 4,300,378 A | 11/1981 | Thiruvarudchelvan | |
| 4,333,670 A * | 6/1982 | Holko | B23K 35/004 228/175 |
| 4,585,473 A | 4/1986 | Narasimhan et al. | |
| 4,778,542 A | 10/1988 | Clemens | |
| 4,801,340 A | 1/1989 | Inoue et al. | |
| 4,808,224 A | 2/1989 | Anderson et al. | |
| 4,892,596 A | 1/1990 | Chatterjee | |
| 4,985,085 A | 1/1991 | Chatterjee | |
| 5,026,438 A | 6/1991 | Young et al. | |
| 5,089,060 A | 2/1992 | Bradley et al. | |
| 5,242,508 A | 9/1993 | McCallum et al. | |
| 5,262,123 A | 11/1993 | Thomas et al. | |
| 5,283,130 A | 2/1994 | Bradley et al. | |
| 5,437,545 A | 8/1995 | Hirai | |
| 5,461,898 A | 10/1995 | Lessen | |
| 5,470,401 A | 11/1995 | McCallum et al. | |
| 5,492,264 A | 2/1996 | Wadleigh | |
| 5,737,959 A | 4/1998 | Korbel et al. | |
| 5,739,498 A | 4/1998 | Sunamoto et al. | |
| 6,022,424 A | 2/2000 | Sellers et al. | |
| 6,036,467 A | 3/2000 | Jameson | |
| 6,638,462 B2 | 10/2003 | Davidson et al. | |
| 6,676,008 B1 | 1/2004 | Trapp et al. | |
| 6,843,405 B2 | 1/2005 | Okamoto et al. | |
| 6,940,379 B2 | 9/2005 | Creighton | |
| 7,096,705 B2 | 8/2006 | Segal | |
| 7,314,670 B2 | 1/2008 | Bartsch et al. | |
| 7,322,508 B2 | 1/2008 | Chang et al. | |
| 7,954,692 B2 | 6/2011 | Fukuda | |
| 8,016,179 B2 | 9/2011 | Burford | |
| 8,052,033 B2 | 11/2011 | Nakagawa et al. | |
| 8,240,540 B2 | 8/2012 | Tanaka et al. | |
| 8,313,692 B2 | 11/2012 | Somekawa et al. | |
| 8,695,868 B2 * | 4/2014 | Messer | B23K 11/20 228/112.1 |
| 10,189,063 B2 | 1/2019 | Lavender et al. | |
| 10,369,748 B2 | 8/2019 | Whalen et al. | |
| 10,695,811 B2 | 6/2020 | Joshi et al. | |
| 11,052,480 B2 | 7/2021 | Karvinen et al. | |
| 2002/0029601 A1 | 3/2002 | Kwok | |
| 2002/0190100 A1 | 12/2002 | Duncan | |
| 2003/0024965 A1 * | 2/2003 | Okamura | B23K 33/00 228/112.1 |
| 2004/0057782 A1 | 3/2004 | Okamoto et al. | |
| 2004/0238501 A1 | 12/2004 | Kawazoe et al. | |
| 2004/0265503 A1 * | 12/2004 | Clayton | C23C 4/18 118/302 |
| 2005/0121497 A1 | 6/2005 | Fuller et al. | |
| 2006/0005898 A1 | 1/2006 | Liu et al. | |
| 2008/0029581 A1 | 2/2008 | Kumagai et al. | |
| 2008/0048005 A1 | 2/2008 | Forrest et al. | |
| 2008/0202653 A1 | 8/2008 | Ignberg | |
| 2008/0251571 A1 | 10/2008 | Burford | |
| 2009/0072007 A1 | 3/2009 | Nagano | |
| 2009/0291322 A1 | 11/2009 | Watanabe et al. | |
| 2010/0059151 A1 | 3/2010 | Iwamura et al. | |
| 2010/0089976 A1 | 4/2010 | Szymanski et al. | |
| 2010/0132430 A1 | 6/2010 | Tsai et al. | |
| 2011/0104515 A1 | 5/2011 | Kou et al. | |
| 2011/0132970 A1 | 6/2011 | Nakagawa et al. | |
| 2011/0309131 A1 | 12/2011 | Hovanski et al. | |
| 2012/0006086 A1 | 1/2012 | Manchiraju et al. | |
| 2012/0052322 A1 | 3/2012 | Hatakeyama et al. | |
| 2012/0168045 A1 | 7/2012 | Ihara et al. | |
| 2012/0258332 A1 | 10/2012 | Hatakeyama et al. | |
| 2013/0075452 A1 | 3/2013 | Burford | |
| 2014/0002220 A1 | 1/2014 | Johnson et al. | |
| 2014/0076957 A1 | 3/2014 | Sayama et al. | |
| 2014/0102161 A1 | 4/2014 | Stewart | |
| 2014/0248508 A1 | 9/2014 | Ohhama et al. | |
| 2014/0283574 A1 | 9/2014 | Lavender et al. | |
| 2015/0075242 A1 | 3/2015 | Eller et al. | |
| 2015/0115019 A1 | 4/2015 | Pascal et al. | |
| 2015/0360317 A1 * | 12/2015 | Kalvala | C22C 21/00 228/2.3 |
| 2016/0008918 A1 | 1/2016 | Burford | |
| 2016/0167353 A1 | 6/2016 | Fan et al. | |
| 2016/0175981 A1 | 6/2016 | Kandasamy | |
| 2016/0175982 A1 | 6/2016 | Kandasamy et al. | |
| 2016/0184922 A1 | 6/2016 | Kikyo | |
| 2016/0228932 A1 | 8/2016 | Hayashi et al. | |
| 2016/0354860 A1 | 12/2016 | Boettcher et al. | |
| 2017/0008121 A1 | 1/2017 | Li | |
| 2017/0136686 A1 | 5/2017 | Ueno et al. | |
| 2017/0163134 A1 | 6/2017 | Posselt et al. | |
| 2017/0163135 A1 | 6/2017 | Emberton et al. | |
| 2017/0182587 A1 | 6/2017 | Tokoro et al. | |
| 2017/0197274 A1 | 7/2017 | Steel et al. | |
| 2017/0216961 A1 | 8/2017 | Utter et al. | |
| 2017/0225265 A1 | 8/2017 | Ito et al. | |
| 2017/0304933 A1 | 10/2017 | Miles et al. | |
| 2018/0043467 A1 * | 2/2018 | Huysmans | B23K 20/129 |
| 2018/0050419 A1 | 2/2018 | Das et al. | |
| 2018/0311713 A1 | 11/2018 | Joshi et al. | |
| 2018/0354231 A1 | 12/2018 | Iwase | |
| 2018/0361498 A1 * | 12/2018 | Zhang | B23K 20/2333 |
| 2018/0369889 A1 | 12/2018 | Zhang et al. | |
| 2019/0275608 A1 | 9/2019 | Das et al. | |
| 2021/0086291 A1 | 3/2021 | Okada et al. | |
| 2021/0205918 A1 | 7/2021 | Fujii et al. | |

OTHER PUBLICATIONS

"U.S. Appl. No. 16/564,872, Notice of Non-Compliant Amendment mailed Jun. 9, 2023", 3 pgs.

"U.S. Appl. No. 15 694,565, Notice of Non-Compliant Amendment mailed Jun. 9, 2023", 3 pgs.

"ThomasNet.com", Online: www. thomasnet.com articles custom-manufacturing-fabricating friction-stir-welding, (Feb. 10, 2011), 2 pgs.

"U.S. Appl. No. 14/222,468, Non Final Offce Action mailed Nov. 6, 2015", (Nov. 6, 2015), 11 pgs.

"U.S. Appl. No. 14/222,468, Final Office Action mailed Apr. 1, 2016", (Apr. 1, 2016), 10 pgs.

"U.S. Appl. No. 14/222,468, Advisory Action mailed May 20, 2016", (May 20, 2016), 2 pgs.

"U.S. Appl. No. 14/222,468, Final Office Action mailed Jan. 26, 2017", (Jan. 26, 2017), 9 pgs.

(56) References Cited

OTHER PUBLICATIONS

"U.S. Appl. No. 14/268,220, Office Action mailed Dec. 1, 2015", (Dec. 1, 2015), 8 pgs.
"International Application Serial No. PCT US2019 040730, International Preliminary Report on Patentability mailed Jan. 5, 2021", (Jan. 5, 2021), 8 pages.
"International Application Serial No. PCT US2019 040730, International Search Report mailed Oct. 21, 2019", (Oct. 21, 2019), 4 pages.
"International Application Serial No. PCT US2019 040730, Written Opinion mailed Oct. 21, 2019", (Oct. 21, 2019), 7 pages.
"International Application Serial No. PCT US2020 05168 International Search Report mailed Feb. 8, 2021", (Feb. 8, 2021), 5 pages.
"International Application Serial No. PCT US2020 05168 Written Opinion mailed Feb. 8, 2021", (Feb. 8, 2021), 6 pages.
"International Application Serial No. PCT US2021 050022, Written Opinion mailed Feb. 3, 2022", 11 pgs.
"International Application Serial No. PCT US2021 050022, International Search Report mailed Feb. 3, 2022", 5 pgs.
Abu-Farha, Fadi, "A Preliminary Study on the Feasibility of Friction Stir Back Extrusion", Scripta Materialia vol. 66 Issue 9; 615-618, (May 2012), 4 pgs.
Amancio-Filho, Sergio T., "Joining of Polymers and Polymer-Metal Hybrid Structures: Recent Developments and Trends", Polymer Engineering and Science vol. 49 Issue: 8, (Aug. 2009), 16 pgs.
Bozzi, S., "Intermetallic Compounds in AI 6016 IF-Steel Friction Stir Spot Welds", Material Science and Engineering: A vol. 527, Issue: 16-17, (Jun. 25, 2010), 5 pgs.
Cole, G. S., "Lightweight materials for Automotive Applications", Materials Characterization vol. 35, Issue: 1, (Jul. 1995), 7 pgs.
Evans, William T., "Friction Stir Extrusion: A new process for joining dissimilar materials", Manufacturing Letters, vol. 5; 25-28, (Aug. 2015), 4 pgs.
Gann, John A., "Magnesium Industry's Lightest Structural Metal", SAE Transactions, vol. 25 26, (1930-1931), 17 pgs.
Hammond, Vincent H., "Equal-Channel Angular Extrusion of a Low-Density High-Entropy Alloy Produced by High-Energy Cryogenic Mechanical Alloying", The Journal of The Minerals, Metals and Materials Society, (Sep. 23, 2014), 9 pgs.
Kaiser, F., "Anisotropic Properties of Magnesium Sheet AZ31", Materials Science Forum, vol. 419-4, (2003), 7 pgs.
Kuo, M. C., "Fabrication of High Performance Magnesium Carbon-Fiber PEEK Laminated Composites", Materials Transactions, vol. 44, Issue: 8, (2003), 7 pgs.
Leitao, C., "Aluminum-steel lap joining by multi pass friction stir welding", Materials and Design, vol. 106, (Sep. 15, 2016), 8 pgs.
Liu, Bin, "Microstructure and mechanical properties of equimolar FeCoCrNi high entropy alloy prepared via powder extrusion", Intermetallics, vol. 75,, (Aug. 2016), 6 pgs.
Liu, Liming, "A Review of Dissimilar Welding Techniques for Magnesium Alloys to Aluminum Alloys", Materials, (2014), 23 pgs.
Luo, Alan A., "Magnesium: Current and Potential Automotive Applications", The Journal of The Minerals, Metals and Materials Society, (Feb. 2002), 7 pgs.
Martinsen, K., "Joining of Dissimilar Materials", CIRP Annals, vol. 64, Issue 2, (2015), 21 pgs.
Nakamura, Takashi, "Tool Temperature and Process Modeling of Friction Stir Welding", Modern Mechanical Engineering, vol. 8, Issue 1, (Feb. 2018), 17 pgs.
Pickens, J. R., "Aluminum Powder Metallurgy Technology for High-Strength Applications", Journal of Materials Science, (Jun. 1981), 21 pgs.
Rodewald, W., "Top Nd—Fe—B Magnets with Greater Than 56 MGOe Energy Density and 9.8 kOe Coercivity", IEEE Transactions on Magnets, vol. 38, Issue 5, (Sep. 2002), 3 pgs.
Saha, Pradip K., "Aluminum Extrusion Technology, Chapter 1, Fundamentals of Extrusion", ASM International, (2000), 29 pgs.
Trang, T. T.T., "Designing a Magnesium Alloy with High Strength and High Formability", Nature Communications, (Jun. 28, 2018), 6 pgs.
Whalen, Scott, "High Ductility Aluminum Alloy Made from Powder by Friction Extrusion", Materialia, vol. 6, (Jun. 2019), 6 pgs.
Zhang, Z., "Numerical Studies on Effect of Axial Pressure in Friction Stir Welding", Science and Technology of Welding and Joining, vol. 12, Issue 3, (2007), 24 pgs.
"U.S. Appl. No. 18/494,629, Response filed Sep. 18, 2024 to Restriction Requirement mailed May 21, 2024", 7 pgs.
"U.S. Appl. No. 18/494,629, Restriction Requirement mailed May 21, 2024", 5 pgs.

\* cited by examiner

METHODS FOR FRICTION STIR WELDING INVOLVING DISSIMILAR MATERIALS

CROSS REFERENCE TO RELATED APPLICATION

This application is a divisional of U.S. patent application Ser. No. 16/564,872 filed Sep. 9, 2019, which claims priority to and the benefit of U.S. Provisional Patent Application Ser. No. 62/728,604 filed Sep. 7, 2018, entitled "Method for Joining AA7XXX Series Aluminum to Steel Using AA6XXX Friction Stir Dovetail Interlayer", and this application is also a Continuation-In-Part of U.S. patent application Ser. No. 15/694,565 filed Sep. 1, 2017, entitled "System And Process For Joining Dissimilar Materials And Solid-State Interlocking Joint With Intermetallic Interface Formed Thereby" which claims priority from and incorporates by reference U.S. provisional patent application No. 62/393,409 filed Sep. 12, 2016, and also incorporates U.S. provisional patent application No. 62/533,851 entitled "The Joining Of Dissimilar Metals Through Formation Of Dovetail Extrusions With Metallurgically Bonded Interfaces" filed Jul. 18, 2017, the entirety of each of which is incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

TECHNICAL FIELD

The present disclosure relates to methods of connecting materials. In particular embodiments metal materials are connected. These metal materials can be connected to form lap joints where the metal materials are mounted surface to surface. Methods for joining dissimilar materials and more particularly to connections between dissimilar metals having different melting points are also described.

BACKGROUND

A world of rising energy necessitates approaches for reducing the amount of energy needed to perform standard tasks. Among approaches under development are lighter more fuel-efficient vehicles. Reducing the weight of vehicles can be accomplished in a variety of ways including replacing heavier steel regions with lighter weight materials such aluminum, plastic, carbon fiber or other dissimilar materials. However, difficulty has arisen in attempting to find ways to robustly join dissimilar materials in a way that provides the needed strength and resiliency that exists in structures that are made from the same material. Preferably, and in some instances by requirement, these seams and interconnects must be welded together. Welding is fairly straight forward when the two materials have similar melting points but becomes more and more difficult when the materials have vastly different melting points or other characteristics.

Joining materials such as steel to aluminum, titanium, magnesium, or copper, or any combination thereof, has proved difficult for a variety of reasons. The prior art generally teaches that when these materials are joined that the temperatures must be maintained generally low so as to prevent the formation of brittle intermetallic compounds, which are generally believed to cause the welds to be brittle and fail. Most prior art methodologies for joining dissimilar materials have focused on getting rid of these brittle intermetallic portions especially when the intermetallic is the only means of joining the two dissimilar metals together.

One of the ways that this is done is by isolating the other metal from the molten aluminum during the arc welding process. Techniques such as coatings, or inserting bimetallic inserts that contain portions of each of the two types of metals and which were formed by another process and welding the materials to the inserts are methodologies that have been taught and practiced. However, the needs for these additional steps increase the complexity and cost and are generally unsuitable in a high throughput manufacturing environment because of these issues and concerns.

Hence what is needed is a process for forming high strength joints between dissimilar materials in ways that are simpler cheaper and more effective than the current methodologies. The present invention is a significant step forward in addressing these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

In one embodiment of the disclosure a method for connecting two dissimilar materials having different melting points is described wherein a first material having a lower melting point than a second material is plasticized to fill a preformed groove, shape or depression in the surface of a second material. The first and second materials are heated together (preferably rubbed and heated by friction) to obtain plasticization of the lower melting point material so as to cause the plasticization of the material and the movement of the material into the surface feature (groove) in such a way so as to simultaneously form intermetallic features of the material within the solid state joint as the first material is deforming into the surface feature of the second material. Preferably and in some embodiments the temperature within the joint is controlled so as to prevent overheating of the weld. Examples of how this temperature control is achieved is described in more detail in the detailed description.

In some embodiments the method maybe performed using a friction stir welding device that extends to a plunge depth greater than the thickness of the second material. Various other features of the friction stir method may be appropriately modified so as to obtain the desired result. This may include varying the rate of traverse, process temperature, force pressures, rotation speeds, tool operational orientation, tip and shoulder temperatures, pretreatments including surface coatings, pre-fillings and other pretreatments and other parameters. In addition, various configurations and operations of the various apertures, features, grooves, dovetail shaped depressions or other features of the devices may also be employed.

In one exemplary arrangement the groove contains nested dovetail grooves and the friction stir welding tool is plunged into to the lower of two nested dovetail grooves such that a portion of the material defining the lower groove contacts the friction stir welding tool and results in the forming at least one feature of higher melting temperature material that extend upward into the lower melting temperature material. In addition to this single exemplary embodiment a variety of other embodiments are also described and set forward.

The result of the implementation of this methodology for joining materials is the formation of a joint that has a geometric shape defined by a preformed groove in a first metal material having a first melting point that has been filled with a second material that has a second lower melting point that has been plasticized and heated to both fill the preformed groove and form intermetallic containing features. This method and these joints can be found in a variety of heterogeneous combinations including combinations of aluminum to steel and other metallic and non-metallic combinations.

Various advantages and novel features of the present invention are described herein and will become further readily apparent to those skilled in this art from the following detailed description. In the preceding and following descriptions we have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

A method for connecting two dissimilar materials having different melting points is provided, the method comprising: placing a first material within a groove of a second material, the first material leaving at least a portion of the groove vacant; and placing a third material upon the first material and over the groove; heating the second and third materials to a temperature sufficient to plasticize the second and third materials within the groove and form a mixture of the second and third materials within the groove.

DRAWINGS

The patent or application file contains at least one drawing executed in color. Copies of this patent or patent application publication with color drawing(s) will be provided by the Office upon request and payment of the necessary fee.

Embodiments of the disclosure are described below with reference to the following accompanying drawings.

FIGS. 12-14A show various feature designs and the respective joints formed therein.

DESCRIPTION

This disclosure is submitted in furtherance of the constitutional purposes of the U.S. Patent Laws "to promote the progress of science and useful arts" (Article 1, Section 8).

The following description includes examples of various embodiments of the present invention. It will be clear from this description of the invention that the invention is not limited to these illustrated embodiments but that the invention also includes a variety of modifications and embodiments thereto. Therefore, the present description should be seen as illustrative and not limiting. There is no intention in the specification to limit the invention to the specific form disclosed, but, on the contrary, the invention is to cover all modifications, alternative constructions, and equivalents falling within the spirit and scope of the invention as defined in the claims.

The present invention centers around the joining of dissimilar materials by utilizing a combination of embedded portions of a first material within a preformed geometric shape or groove located in another material under process conditions and tooling geometries able to form an intermetallic interconnection or layer at the dissimilar interface within the preformed shape or groove. Joining metals with different melting temperatures can be accomplished by extruding a lower melting temperature material into groves in a higher melting temperature material while simultaneously forming a metallurgical bond within the groove at the interface between the dissimilar metals. Joints with this configuration exhibit superior strength and ductility compared to other known techniques for Friction Stir Welding (FSW) of aluminum to steel.

In one embodiment, a method for creating such a connection using a friction stir welding tool to heat the materials, cause plasticization and the formation of intermetallic features and layers are described. Contrary to prior art which teaches that intermetallics and layers should not be created within preformed grooves, the method described herein teaches that creating intermetallics and layers within preformed grooves significantly improve strength and ductility.

Figure 1:
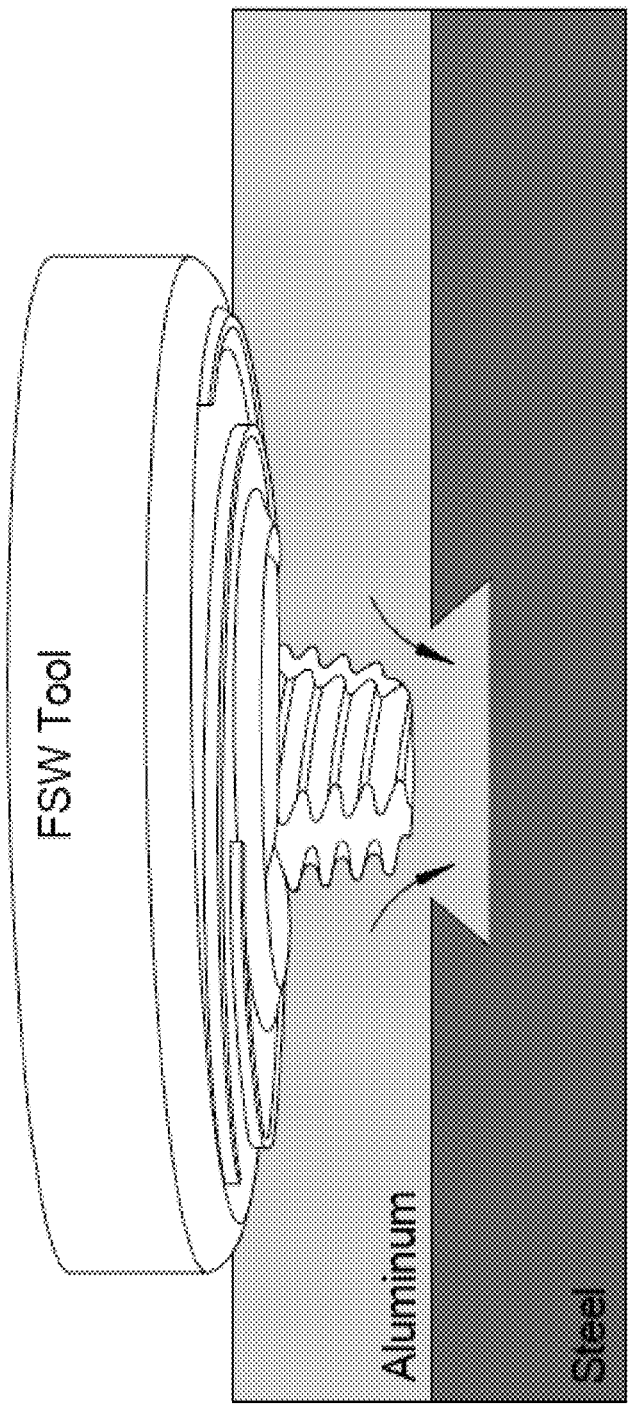
FIG. 1 shows a prior art configuration of a friction stir welding arrangement for use in connecting different materials

Referring however, first to FIG. 1, a prior art configuration of a friction stir welding arrangement for use in connecting different materials is shown. In such an arrangement a friction stir welding tool (FSW) and a material are brought into contact and the material (typically the lower melting point material) is plasticized by the rotating tool. The tool and the plasticized zone that the rotating tool forms (stir zone) are traversed over a joint or along or raster path. When the lower melting temperature material is heated by the friction stir welding device the lower temperature materials is plasticized and flows down into the preformed grooves in the higher temperature material.

Figure 2:
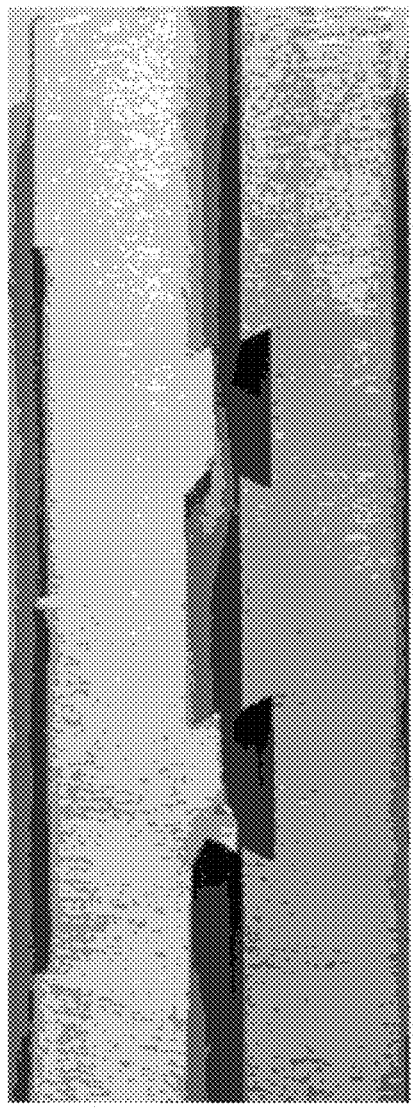
FIG. 2 shows failed joints created by the arrangement shown in FIG. 1 with no metalurgically bonded interlayer.
Figure 2:
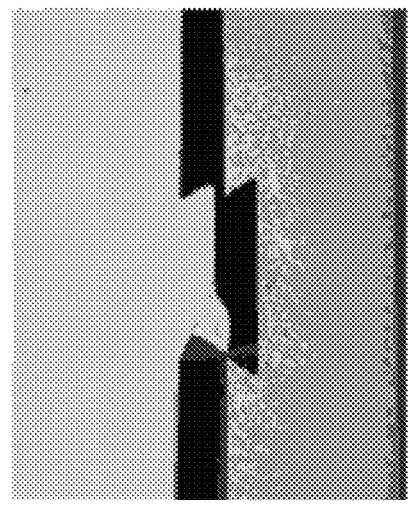

Typically the configuration is arranged such that the tool does not enter into the dovetail and is far from contacting the higher melting temperature material to prevent mixing conditions and elevated temperatures which would form intermetallic layers at the interface between the higher and lower melting point materials. Generally speaking, it is believed that lower temperature welds are stronger because of the more finely grained microstructures that performing welds under these conditions can create. Therefore, existing teachings in the art of friction stir welding try to run the weld as cold as possible and to avoid higher temperature operating conditions and the formation of intermetallic interfaces. As a result, the connections that are formed by plasticizing and pushing the softened material down into without forming an intermetallic connection or layer results in a purely mechanical interconnection that may provide mechanical strength in one direction but does not include metallurgically bonded interlayer in other direction that the present invention provides. An example of the failure after tensile testing is shown in the photograph in FIG. 2 for a single and double dovetail joints with no metallurgically bonded interlayer. The lower melting point material, aluminum in this case, easily tears out from the groove within the higher melting point material (steel in this case).

Figure 3:
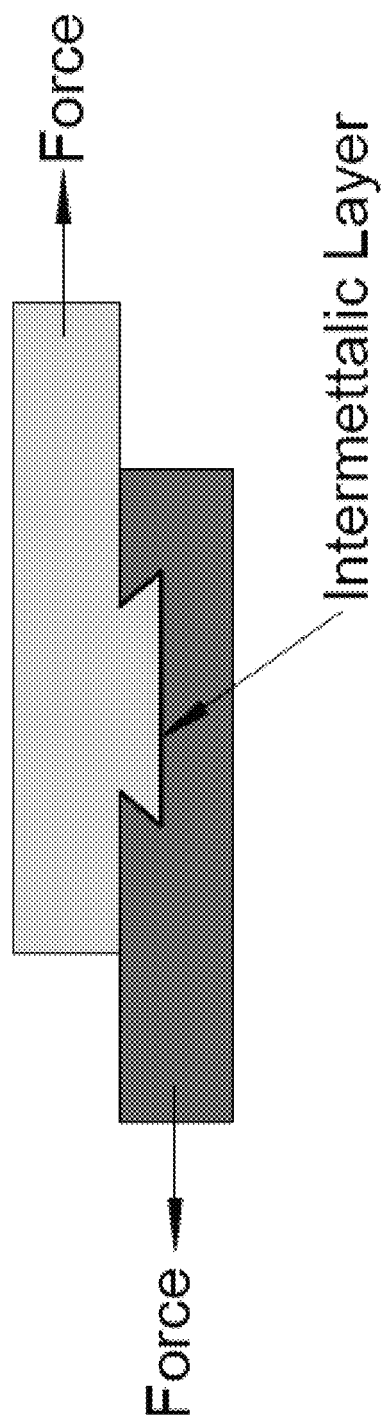
FIG. 3 shows an example of two materials of differing melting points joined in an overheating process where intermetallics are intentionally formed at the dissimilar interface.

In embodiments of the present invention, such as the example shown in FIG. 3, two materials of differing melting points are joined in a process wherein what is typically termed as overheating of the joint occurs and an intermetallic layer is formed within in the dovetail interconnect and strengthens rather than weakens the connection between the higher and lower temperature materials.

Figure 4:
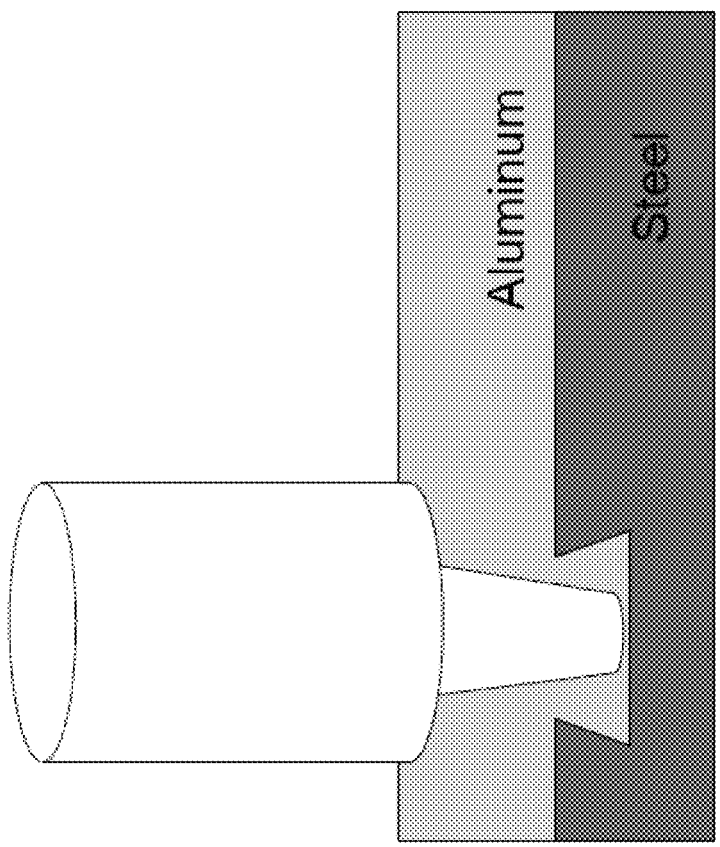
FIG. 4 shows an example of one embodiment of the present disclosure.

In one example of this process called Friction Stir Dovetailing (FSD) a custom designed friction stir welding pin extends into the preformed feature (groove, slot, dovetail, or other depression of a predesignated geometry) and generates heat sufficient to both plasticize the lower melting point material such that it flows into the preformed feature while also heating the higher melting point material through rubbing to a point whereby the filled feature contains intermetallic features (or layer) at the joint interface. An example of such an arrangement for performing this method is shown in FIG. 4. This methodology has shown to be effective when the traverse rate is between 10 mm to 200 mm per minute, the process temperatures range from about 300° C. to about 600° C., the vertical force is between about 1,000 pounds to about 25,000 pounds and the tool rpm between about 50 rpm to about 1000 rpm. All possible parameter combinations for all possible materials have not been examined and parameters outside the general ranges given may also produce the desired intermetallic. Thus, the ranges given should not be viewed as restrictive but are exemplary. In other embodiments combinations of other heating methodologies may also be utilized whereby insertion of the tip of the FSW into the higher temperature material is not always necessary to achieve the formation of intermetallic features.

Figure 5:
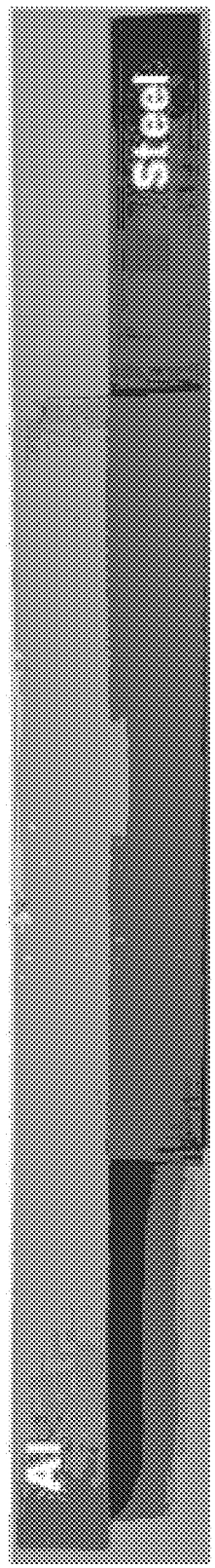
FIG. 5 shows an intermetallic reinforced connection prior to tensile testing.

Contrary to the teachings in the art, the formation of this intermetallic connection between, for example, aluminum and steel within these locking sections significantly improves joint strength. This process is particularly applicable to thick section joints where no other practical solution currently exists. An intermetallic reinforced connection is shown in FIG. 5.

Figure 6:
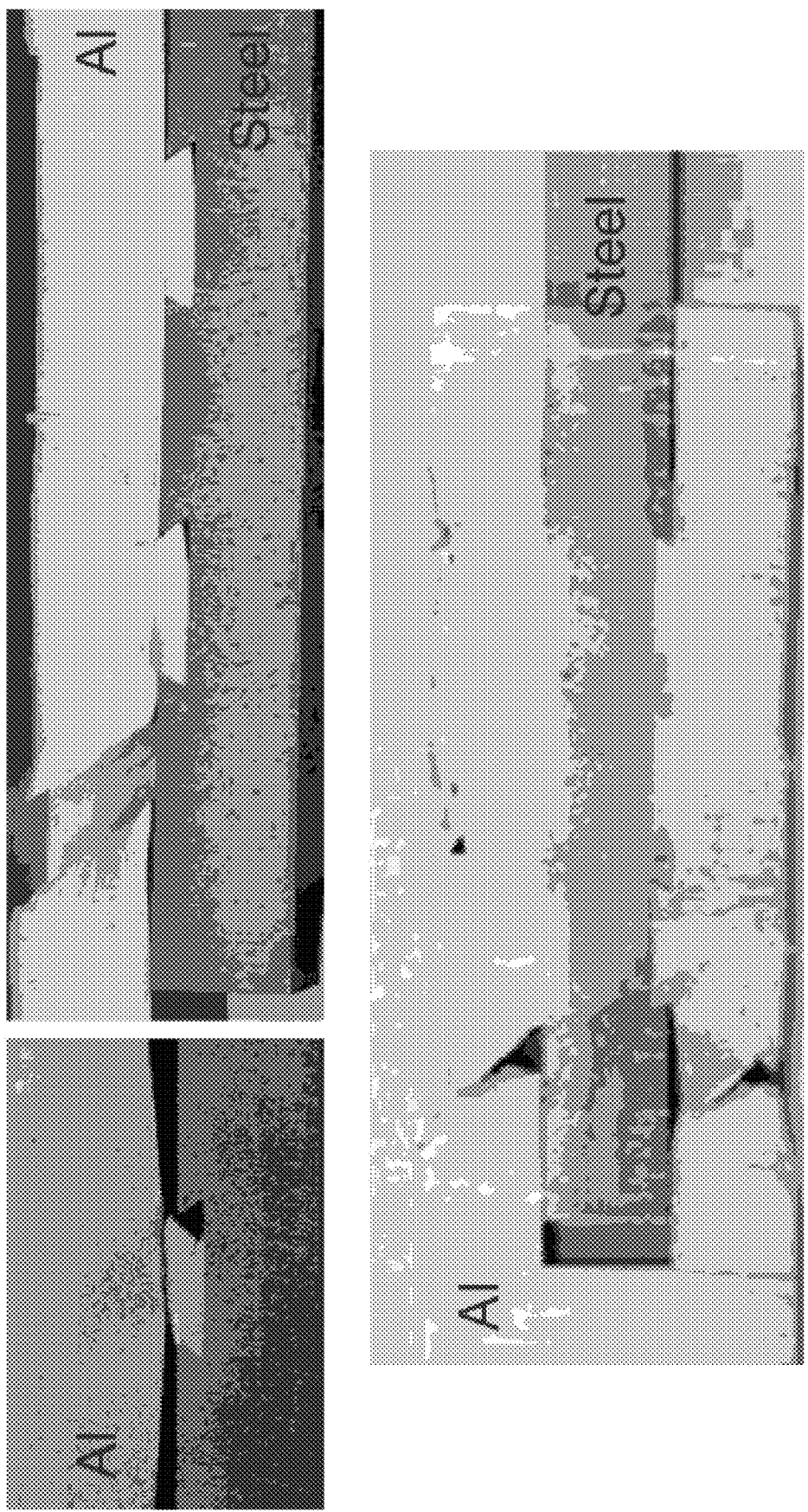
FIG. 6 shows specimens after tensile testing when an intermetallic is intentionally formed at the dissimilar interface performed on various disclosed examples.

The effectiveness of FSD with an intermetallic layer for an AA6061 and Rolled Homogeneous Armor joint is demonstrated through tensile test data which shows specimens failing in the processed aluminum rather than at the joint interface. (see FIG. 6).

TABLE 1

| Weld Set | Maximum Load | Extension at Maximum Load | 75% of Maximum Load | Extension at 75% Maximum Load |
|---|---|---|---|---|
| A | 560 ± 6 | 1.42 ± 0.04 | 420 ± 6 | 2.57 ± 0.05 |
| B | 1175 ± 36 | 2.73 ± 0.26 | 881 ± 27 | 5.36 ± 0.32 |
| C | 797 ± 25 | 1.49 ± 0.04 | 582 ± 18 | 2.24 ± 0.03 |

Figure 7:
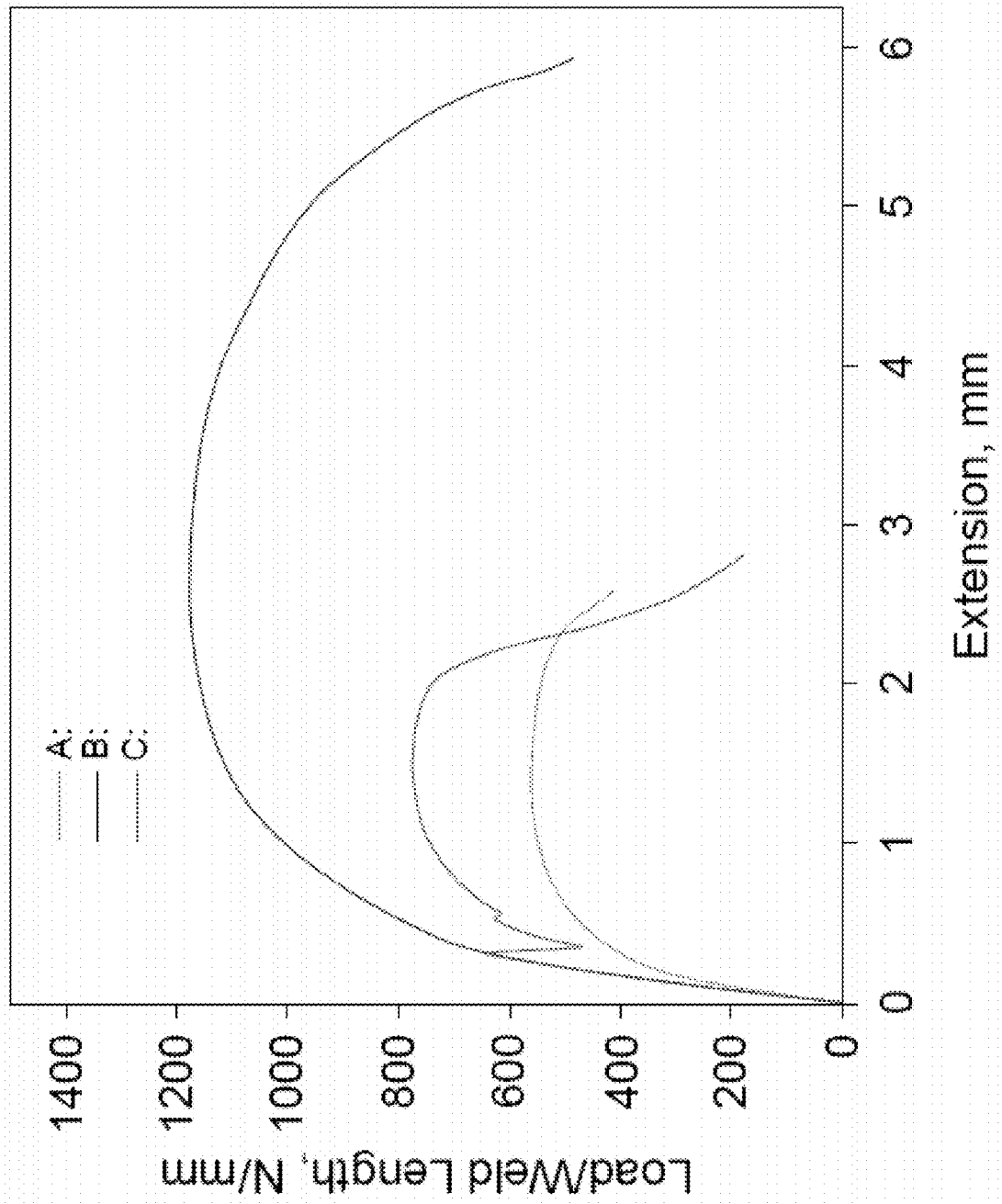
FIG. 7 shows plots of the data reflected in Table 1.

The data reflected in Table 1 is plotted in FIG. 7 and illustrates the effect of the formation of an intermetallic interface. In samples A, no intermetallic interface was formed. In examples B and C these intermetallic interfaces were formed to different degrees. As the data shows the inclusion of the interface in sample B increased the max. tensile load by 107% and extension at max. load increased by 92%. In sample C the max. tensile load was increased by 42% and extension at max. load increased by 5%. The improvements attained with B (with intermetallic) compared to A (no intermetallic) are even larger when considering the load and extension at 75% of maximum load where failure is conventionally defined. Contrary to the teachings of the prior art, a process that includes infilling with intermetallic formation has shown to be an effective process of joining and welding dissimilar materials and does not weaken the weld as the prior art suggests. In this described arrangement the entire dissimilar interface within the dovetail can react to stresses in more than a mechanical interlock in one direction. With intermetallic present, failure has been driven into the bulk material away from the joint; a highly desirable failure mode.

Figure 8:
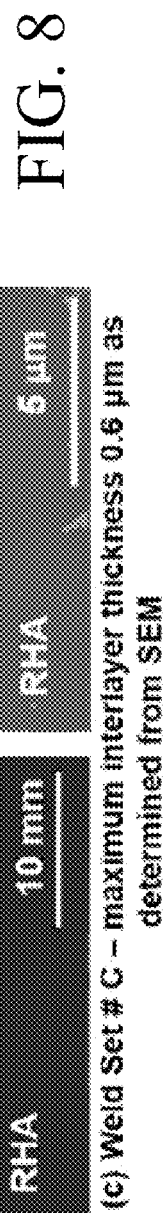
FIG. 8 shows SEM photographs of the intermetallic features in the filled dovetail sections corresponding to FIG. 7 and Table 1.

This arrangement prevents sheering of the angled lower temperature piece such as aluminum and dovetail pullout resulting in greatly improved strength of the joint. This results in lap shear samples that fail in the lower temperature material, not at the aluminum-steel interface. The results show that using FSP or FSW to extrude a plasticized material into an existing feature/s in a material of higher plasticization temperature with the intent to create a mechanical interlock where an intermetallic is created at the dissimilar material interface within the dovetail during the process is superior to joints where the intermetallic interconnect are not formed. SEM photographs of the intermetallic features in the filled dovetail section are shown in FIG. 8. Table 2 below shows the process conditions which generated the aluminum-steel intermetallic described in FIG. 8 leading to the data depicted in FIG. 7.

TABLE 2

| Weld Set | Tool Plunge Depth (mm) | Shoulder Scroll Numbers | Shoulder Temperature Degrees (C.) | Avg. Rotational Speed RPM | Avs. Forge Force kN | Avg. Weld Power kW | Avg. WC TIP Temperature Degrees C. |
|---|---|---|---|---|---|---|---|
| A | 15.22 | 3 | 470 | 170 | 35 | 4.95 | 475 |
| B | 15.45 | 3 | 470 | 150 | 57 | 4.85 | 490 |
| C | 15.45 | 2 | 470 | 400 | 19 | 5.25 | 570 |

Figure 9:
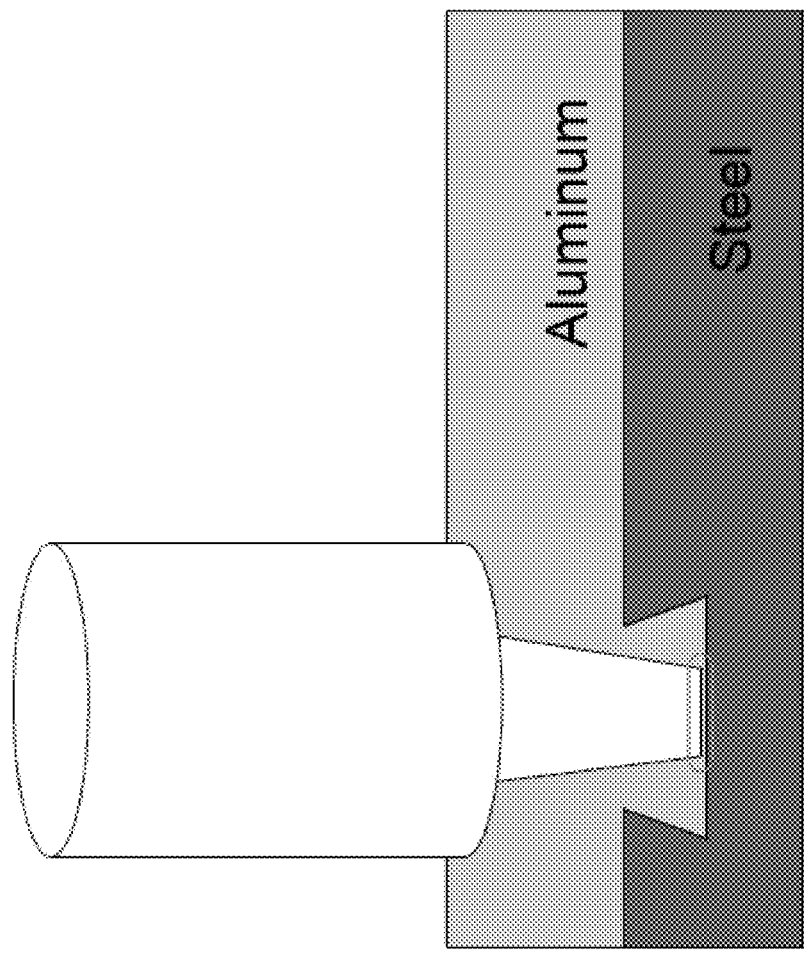
FIGS. 9-11 show various embodiments and configurations of friction stir welding tools with mechanical contact shown being necessary to create metallurgical bond.

In addition to the various examples provided herein, a variety of other alterations or various variations to the basic concept are also contemplated, and various modifications to the process and processing parameters can be undertaken. In one embodiment of the present invention, the friction stir welding tool is inserted or oriented so as to contact the bottom or side of the groove and generate additional heat at these points of contact. This method generates heat at the interface where it is needed to form the intermetallic and is not generated in the bulk material where overheating could degrade the properties. This rubbing between the tool and underlying steel exposes atomically clean surfaces which facilitate formation of intermetallics. In other embodiments, the groove or the dovetail may contain features that when brought into contact with the FSW tool cause this heating to take place and enhance the formation of intermetallic features. In other embodiments the shape of the FSW tool or tip may be modified so as to engage selected portions of the groove or the groove may be variously configured to engage with the FSW tool in a particular way. Examples of various modifications are shown in FIGS. 9, 10, and 11.

Figure 10:
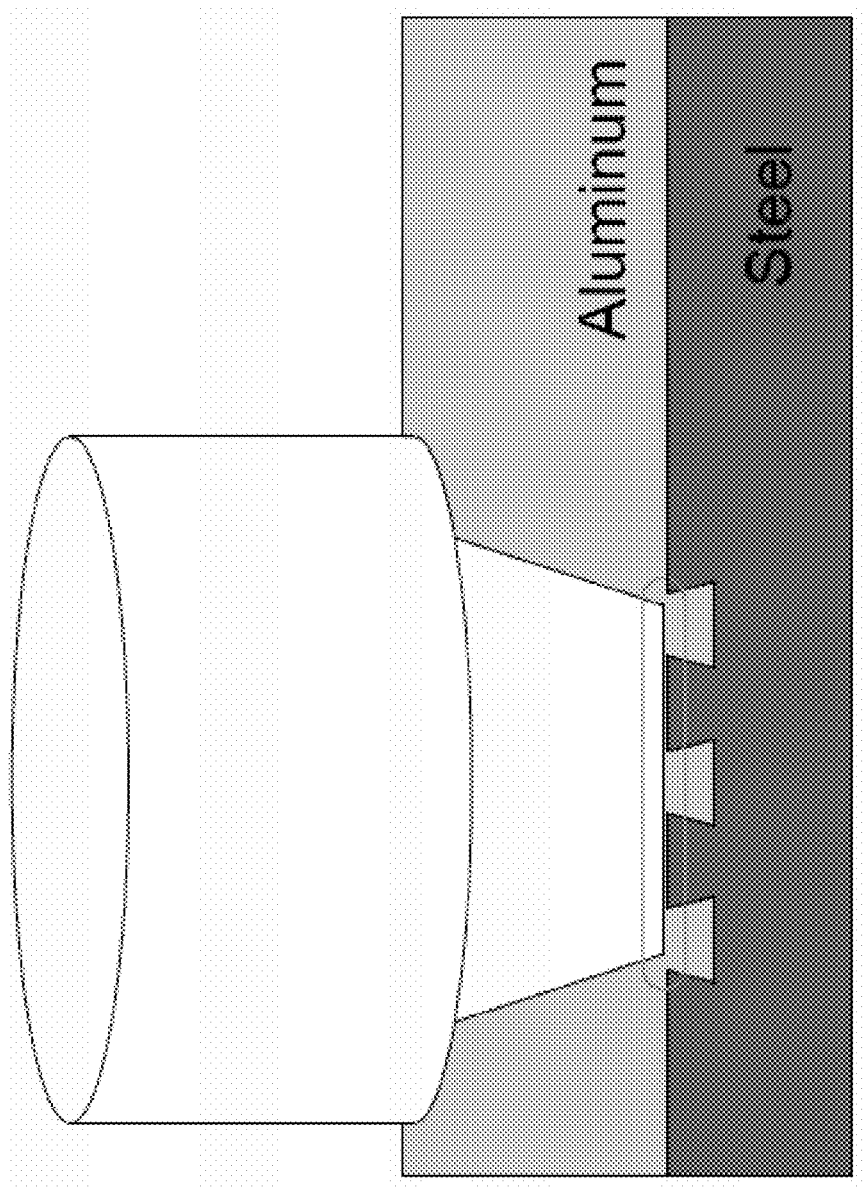

FIG. 10 for example, shows an embodiment wherein the dimensions of the dovetails are proportioned to be generally shallow and small as compared to the pin diameter of this tool. Because the dovetails are shallow and small compared to the diameter of the pin tip, the overheated area created by contact between the pin and high temperature material is generally larger compared to other arrangements and is sufficient to generate a hot layer of material that can form a continuous layer of intermetallic features above and within the dovetails. In other embodiments of the invention induction heating is used to produce localized heating at the interface. In other embodiments plasticized material is forced through narrow openings between the tool and the higher melting temperature material within the dovetail to produce high temperature while the material flows. This localized heating within the gaps will cause localized heating within the gaps allowing for formation of intermetallic layers in the openings.

Figure 11:
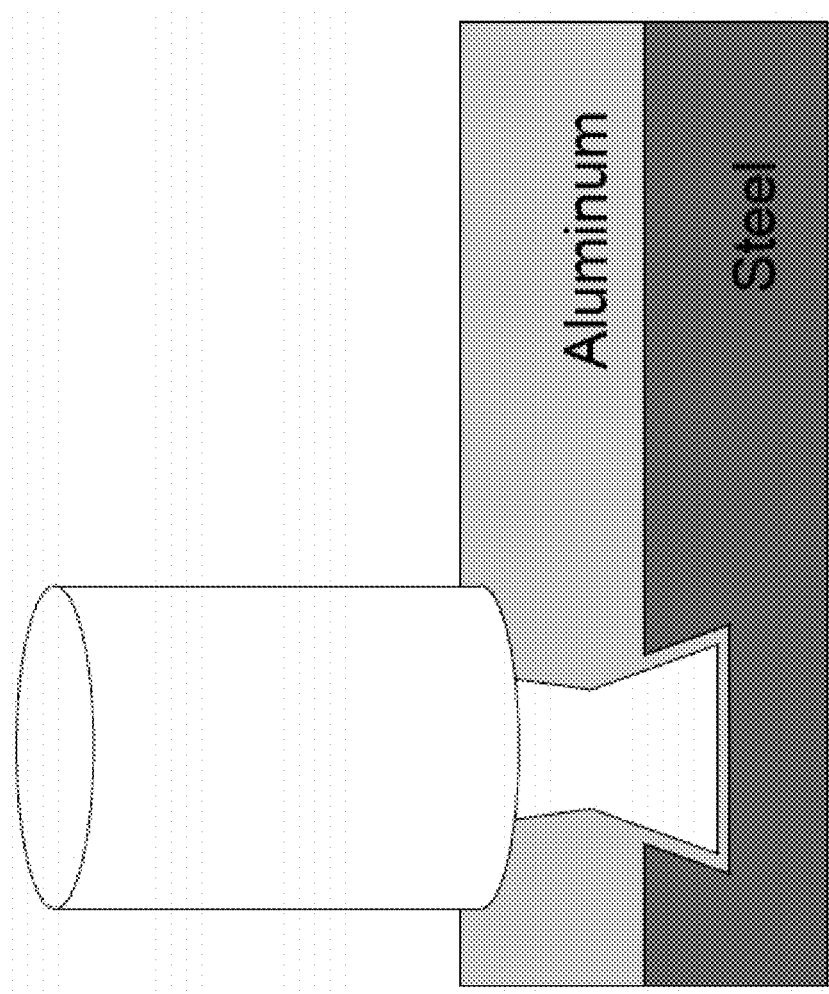
Figure 12:
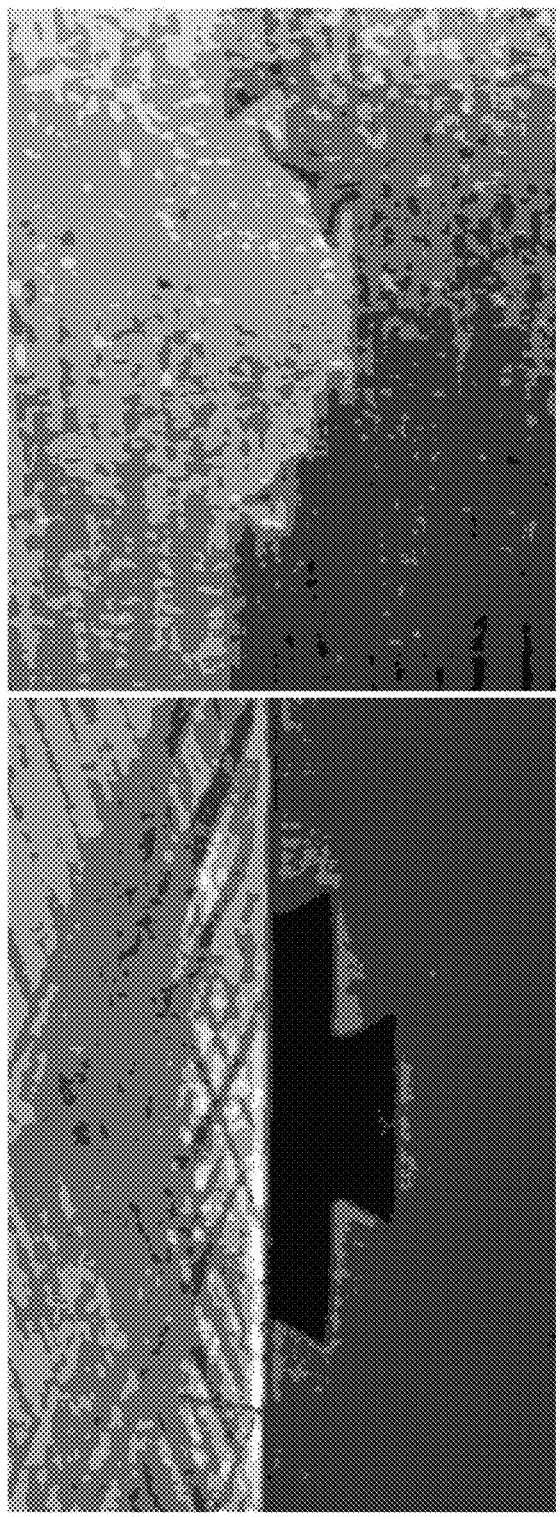

In other embodiments of the invention, the formation of intermetallic hooks of higher melting material are formed by running the tool within the dovetail while the tool is biased such that it contacts one or both side of the dovetail joint and higher temperature material into a hook as shown in FIG. 11. This provides an advantage in that it increases the area of intermetallic contact between the dissimilar materials and assists in forcing the materials together. In other embodiments generally squared grooves are formed in the higher temperature material and then heated with the friction stir welding tool to cause the corners of the device to rise and form hooks in the lower melt temperature materials. In other embodiments the heating process forms intermetallic hooks. These hooks are formed by plunging the tool into to the lower of two nested dovetails (as shown in FIG. 12) such that the edges of the tool contact the corners of the lower dovetail resulting in the formation of two hooks of higher melting temperature material that extend upward into the lower melting temperature material.

Figure 13:
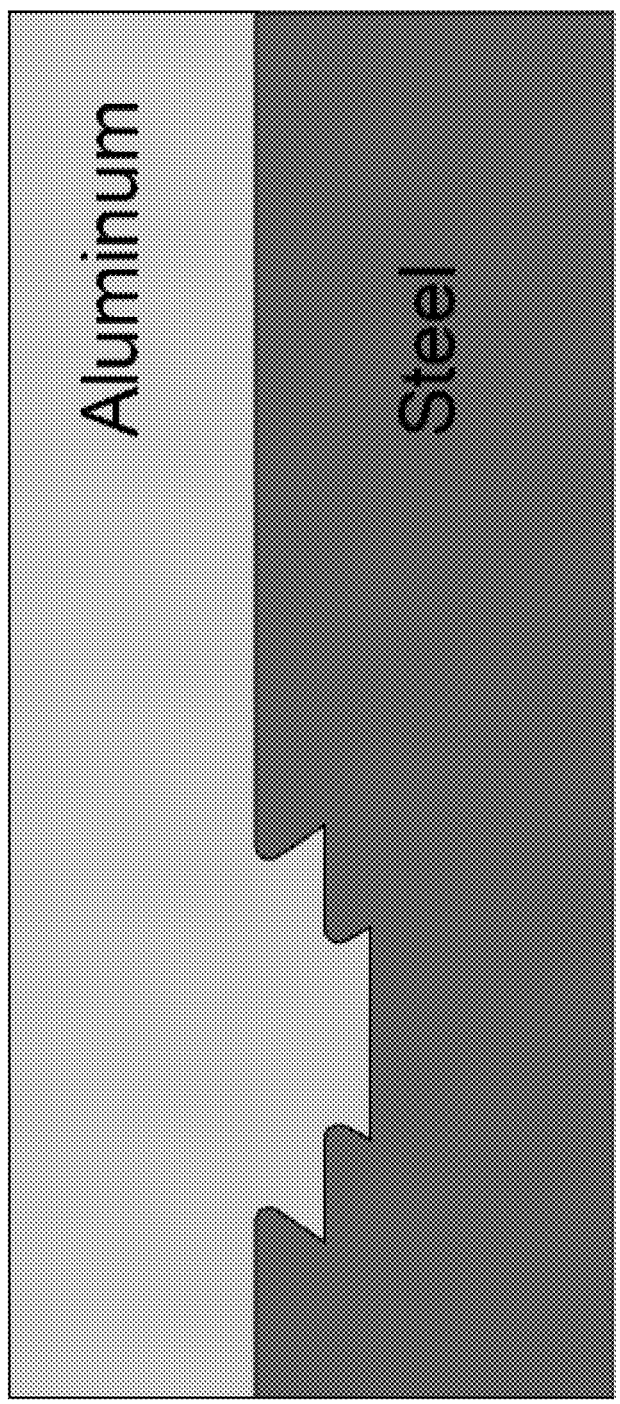

While this specific example is provided the particular squared form of the groove should not be seen as limiting and it should be understood that various other embodiments wherein the geometry provides pushing the tool into a fabricated groove or slit or against the edge of a groove slit so as to cause the higher melting temperature alloy to form a hook or other feature that extends into the lower melting temperature material during friction stir processing, welding or dovetailing are also contemplated. Examples of such configurations and embodiments are found for example in FIG. 13.

Figure 14A:
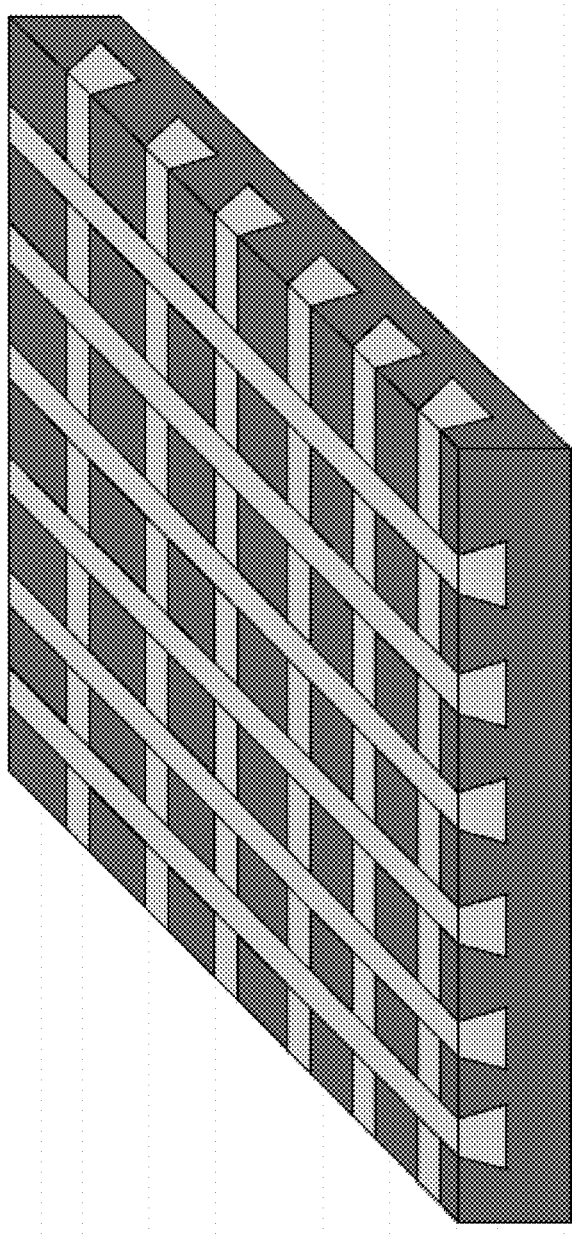

In other arrangements such as the one shown in FIG. 14A mechanical interlocking is accomplished by deforming groves that are easier or faster to manufacture. In instances a rastering grid can be produced. When the friction stir processing tool is sufficiently close to or contacts these grooves during welding, these grooves can have sections that are deformed and form intermetallic features that fill groves and provide strong interlocking. While straight grooves are shown for purposes of illustration this is not meant to be limiting. Various alternatives and modifications can be undertaken to deform the groove during welding to create mechanical interlocking or increase the amount of mechanical interlocking. In addition to the geometry that is shown a variety of other geometries including nesting features, multiple T-slots or notches or other fabricated features may be used to created layers of interlocking features. In some embodiments the dovetails or other mechanical interlocking features with rounded corners improve flow of material into the dovetail and reduce fatigue.

Preferably the tool temperature and force are maintained constant so as to provide consistency along the weld path and manage the strength of the various parts. This is accomplished in one set of embodiments by controlling the tool temperature via a temperature control algorithm and a force control algorithm in conjunction with techniques where the tool contacts the dovetails. Constant tool temperature and position improves consistency of the intermetallic layer and uniformity of size of generated hooks or new features along the weld path and from part to part. In some applications improved performance was obtained when a two piece friction stir welding tool was utilized wherein the pin and shoulder of the tool can move axially relative to one another.

In cases where the pin is contacting the high temperature material within the dovetail, the pin can extend into the dovetail as material is worn from the pin without affecting the shoulder position. This could be done for example by having a servo actuated pin and shoulder that allows for selective connection and release. In another embodiment a spring loaded pin could be used to force more material out and keep pin length relatively constant despite wear on the pit itself. In another embodiment of the invention the upper low melting temperature materials are being extruded into the dovetail groves of underlying high melting temperature materials using a counter-clock wise threaded pin within the FSW tool. Thus clockwise rotation of the tool causes downward extrusion of the plasticized material. Locally heating the dovetail interface caused metallurgical bonding by kneading action between the aluminum and steel interfacial layers.

In as much as the present invention utilizes the combination of mechanical interlocking with intermetallic formation various modifications and alterations could be made so as to enhance and foster the development of intermetallic interconnects at a lower temperature. In one example, a material such as Yttrium, Tungsten, Molybdenum, Iron compounds and others could be applied to reduce the temperature or improve the rate of formation of intermetallic to the dovetail joints prior to FSD. This could be done using cold spray, thermal spray or any other deposition method which can also be used to tailor the composition of the intermetallic layer.

In another example pre-filled dovetails are utilized wherein the mechanical grooves in the higher temperature material is pre-filled with lower melting temperature material. This can reduce or eliminate the excess material that maybe removed from the top of the lower melting temperature material when filling the dovetail. This prefilling can be accomplished by filling the groove with bar stock, powder chips of other forms of the lower temperature material. In another embodiment a laminated approach could be used wherein arc welding, strip cladding or other fusion welding techniques are used to bond lower temperature materials such as aluminum inside of the dovetails and then execute friction stir welding to create the intermetallic hooks and interconnects. This can improve process robustness, welding speed and can prevent the formation of a recess at the top of the weld from material lost to fill the dovetail.

In one application friction stir welding was used to apply cladding by creating a dovetail grid similar to the grid shown in FIG. 14A. While the term grid connotes a square or rectangular geometry it is to be understood that the grid can be circular or any other shape and while the grid would likely be two dimensional on flat cladding and three dimensional on contoured cladding these parameters are not limiting. This cladding arrangement allows for the use of a grooved grid for forming mechanical interlocks that will in turn provide the multi directional strength and fatigue life of thick section cladding. In one set of preferred embodiments a two pass technique for accomplishing this was utilized wherein one pass of the friction stir device was made to create the intermetallic layer or layers along the dovetail interface and a second pass, run at much cooler process conditions followed which increased the strength of the material inside the dovetail while maintaining the intermetallic interface.

Figure 14B:
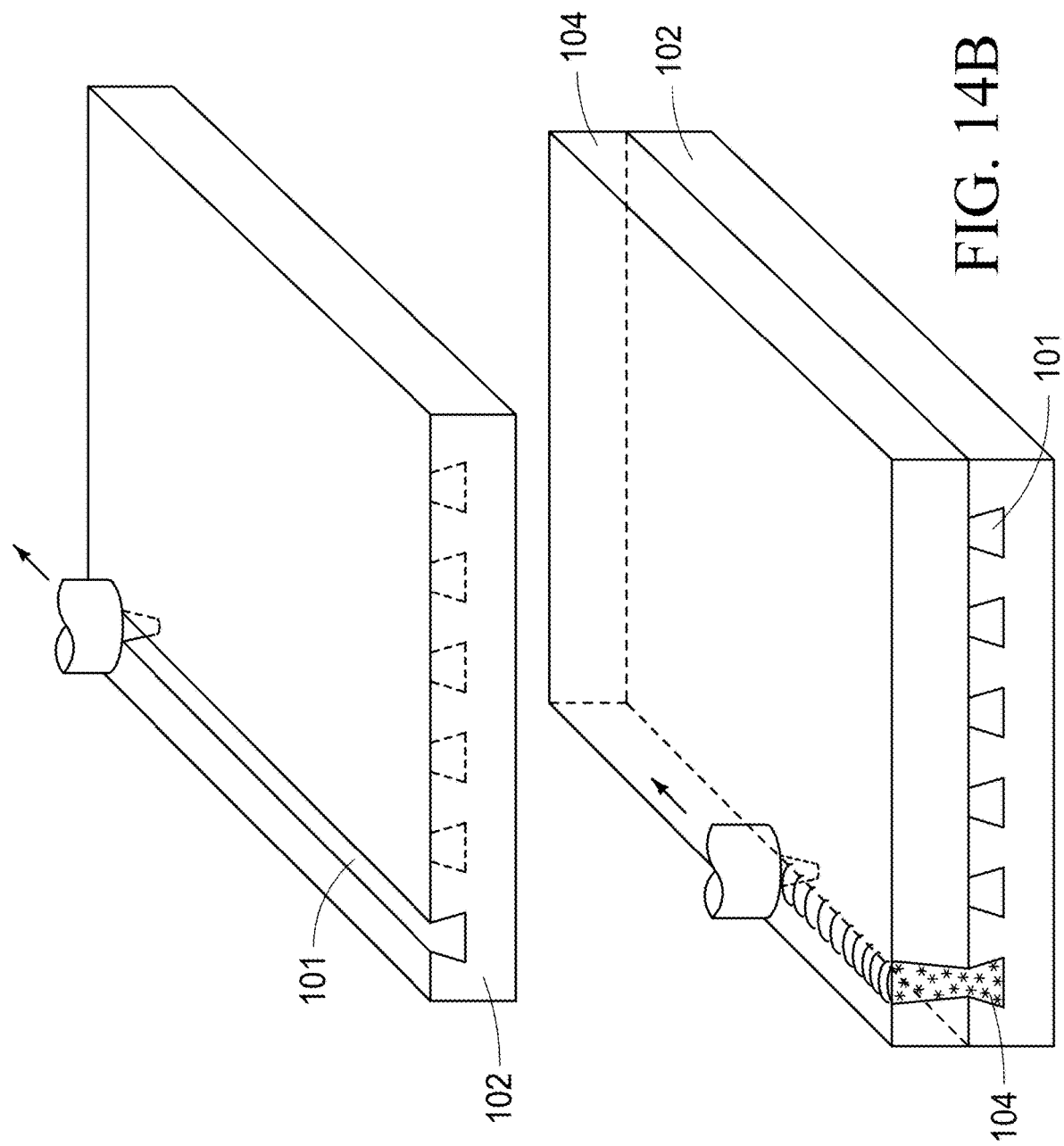
FIGS. 14B and 14C depict materials at different stages of processes according to embodiments of the disclosure.
Figure 14C:
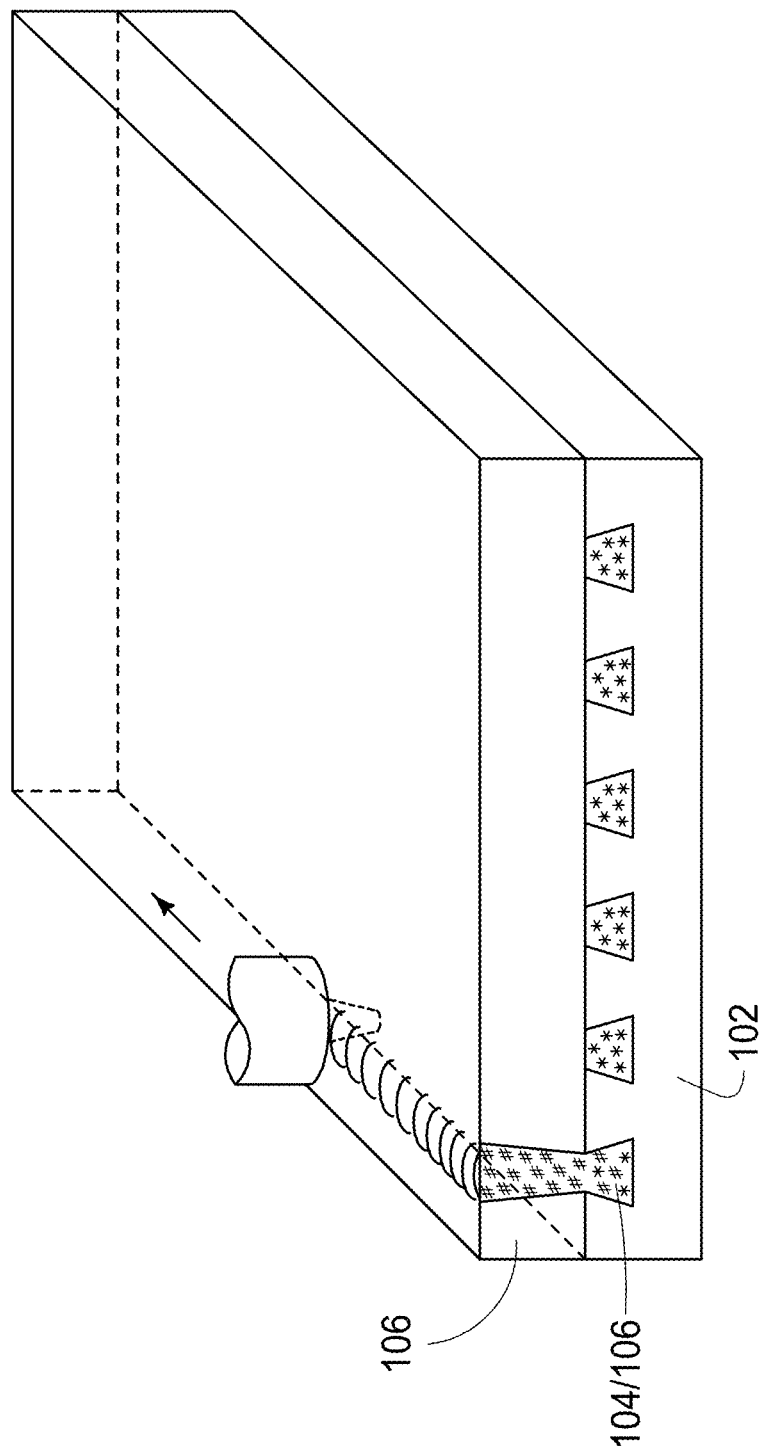

Referring next to FIGS. 14B and 14C, a groove 101 is depicted being formed in a material 102. In accordance with example implementations, groove 101 can be a dovetail grove. Additionally, another material 104 can be extruded into groove 101, and then, as shown in FIG. 14C, after the other material 104 is removed from the surface of material 102, yet another material 106 can be placed on material 102 and FSW can be used to bond materials 102 and 106. Accordingly, this bond can include a mixture of materials 104 and 106 within groove 101.

Figure 15:
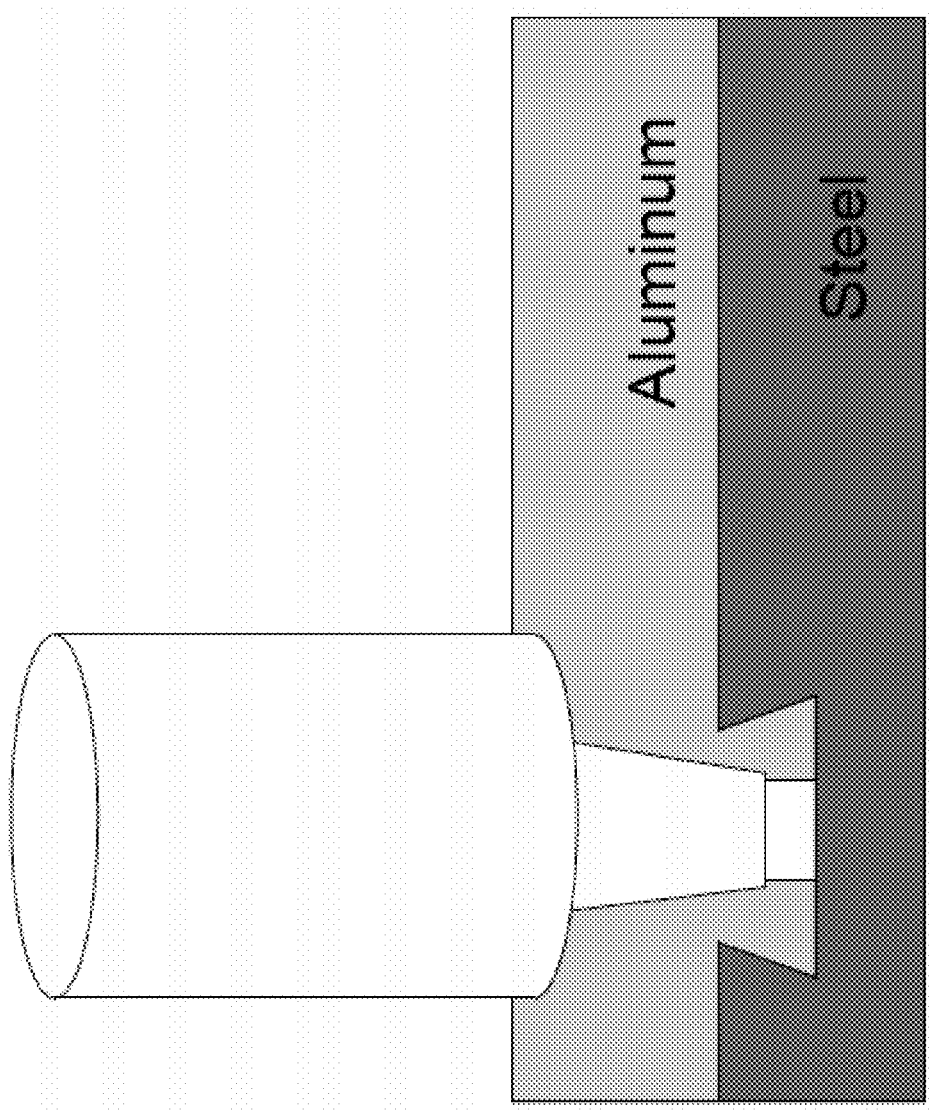
FIGS. 15-18 show examples of such friction stir tooling.
Figure 16:
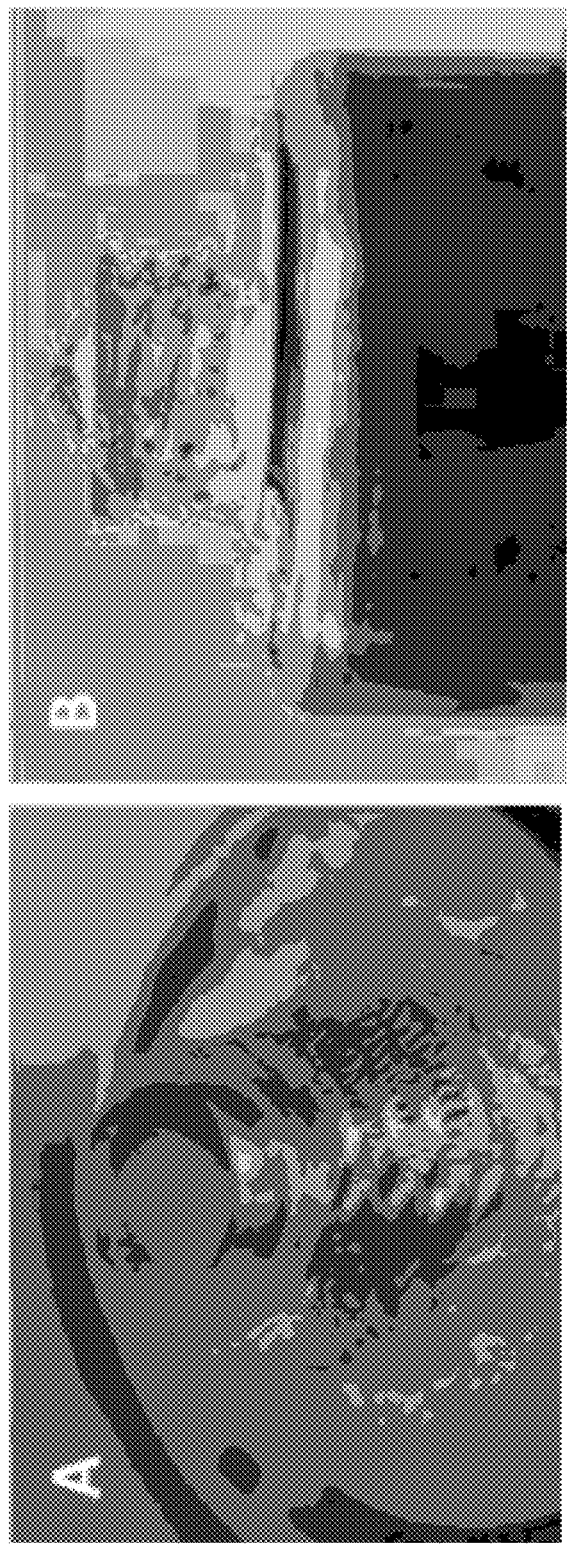

Specialized tooling capable of 1) heating the dissimilar metal interface within or adjacent to the dovetail to temperatures higher than the stir zone and 2) "kneading" a thin interfacial layer to locally mix the dissimilar metals can also assist in the performance of the method. The simultaneous localized temperature rise and kneading at the dissimilar metal interface are achieved by pressing the tool against the higher temperature material during FSD. Tool and dovetails configurations can be designed in coordination to allow for contact anywhere or everywhere within the dovetail. This method enables the formation of intermetallic and/or amorphous bonding at the dissimilar interface, which reinforces the joint, while stir zone temperatures are kept low. A low stir zone temperature are preferable for minimizing degradation of bulk material properties in the lower melting point material. Examples of such tooling are shown in FIGS. 15-16. Friction stir tools have been developed with features specifically intended to extrude lower melting point metal into dovetail grooves in a higher melting point material; while simultaneously forming a metallurgical bond at the dissimilar interface. The tools contain an insert (such as tungsten-carbide, tungsten-rhenium, polycrystalline boron nitride, etc.) within the pin tip which enables high wear resistance and consistency of the metallurgical bond. For example, a tungsten-carbide insert could be press fit into an H13 steel FSW tool. The insert rubs against the higher melting point material, within the dovetail groove, and gives dramatically improved tool life and wear resistance compared to tools without a tip insert. The intent is to protect insertion of high wear resistant materials into FSW tools as a pin, or pin insert, for the purpose of rubbing the higher melting temperature in a dissimilar dovetail joint—for the purpose of creating a metallurgical bond. These illustrative examples are not intended to restrict the possible configurations.

Figure 17:
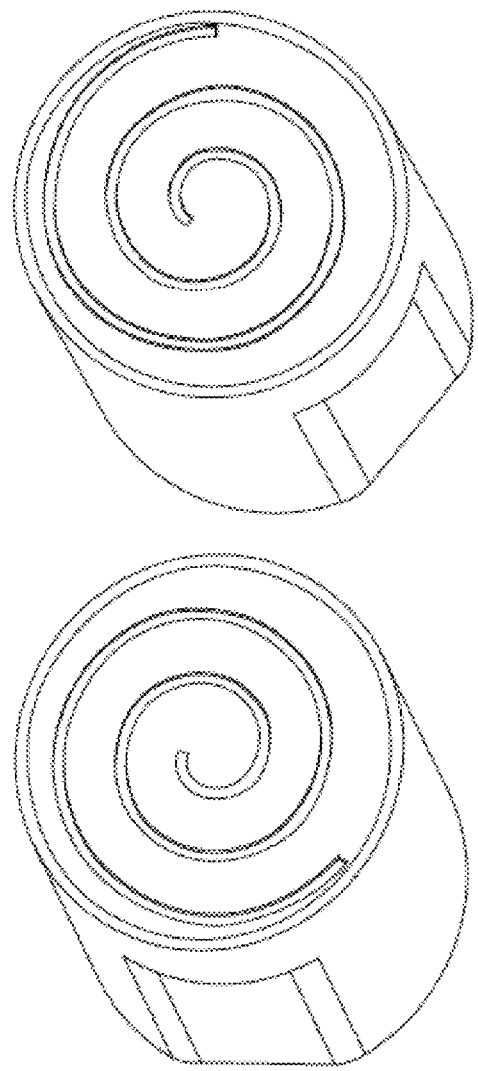

In one embodiment a tip insert is the tool feature that interacts with the dissimilar material interface. The insert can be flat or convex, and may contain scrolls, stepped spirals or other features that enhance "kneading" of the dissimilar materials and also expose new material and push surface impurities away from the interface. Illustrative insert configurations are shown in FIG. 17. The insert may be circular, hexagonal, square, or any shape desired. These features are unique from other tip features attempted in FSW because these features are designed to push material outward and to encourage the formation of a metallurgical bond at a dissimilar metal interface.

Figure 18:
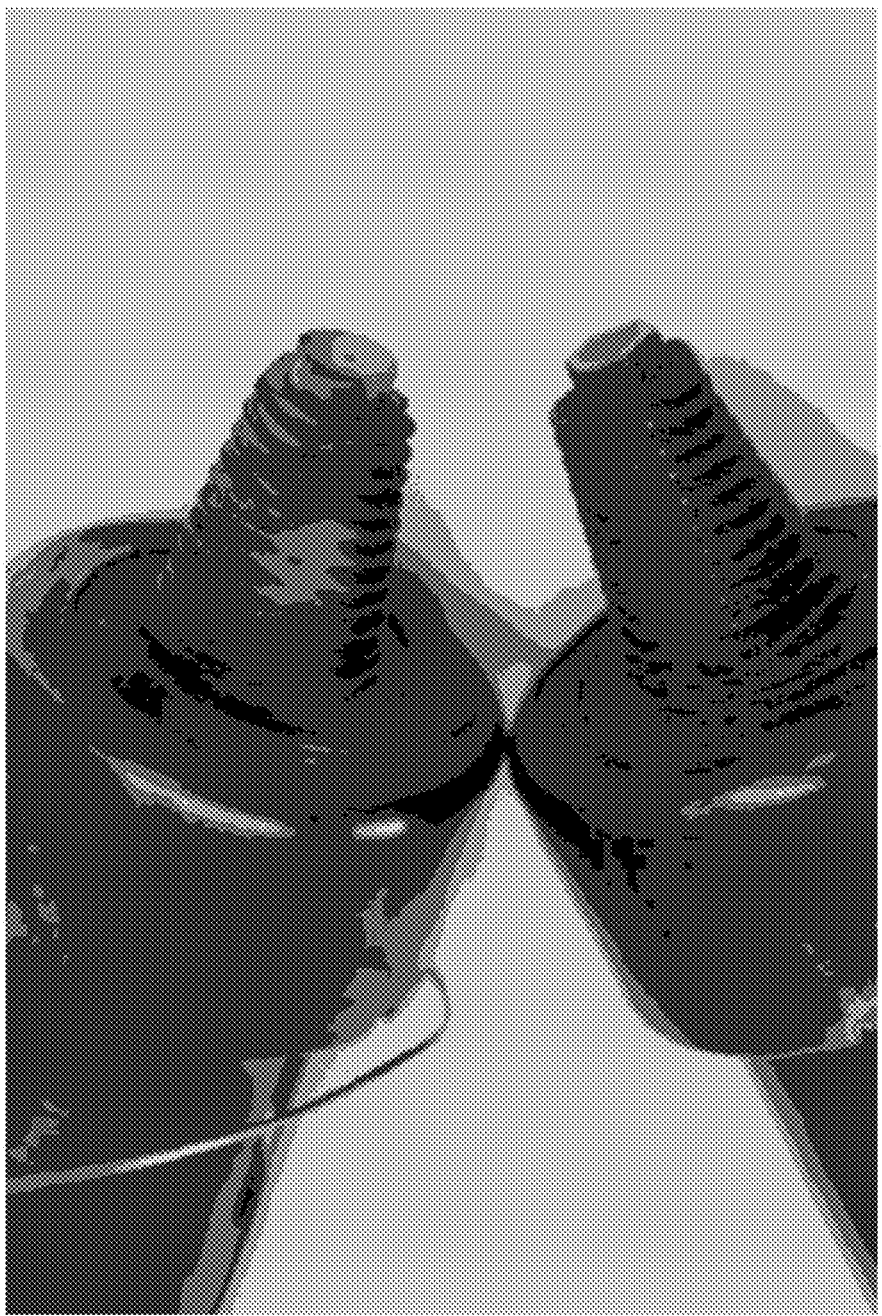
Figure 19:
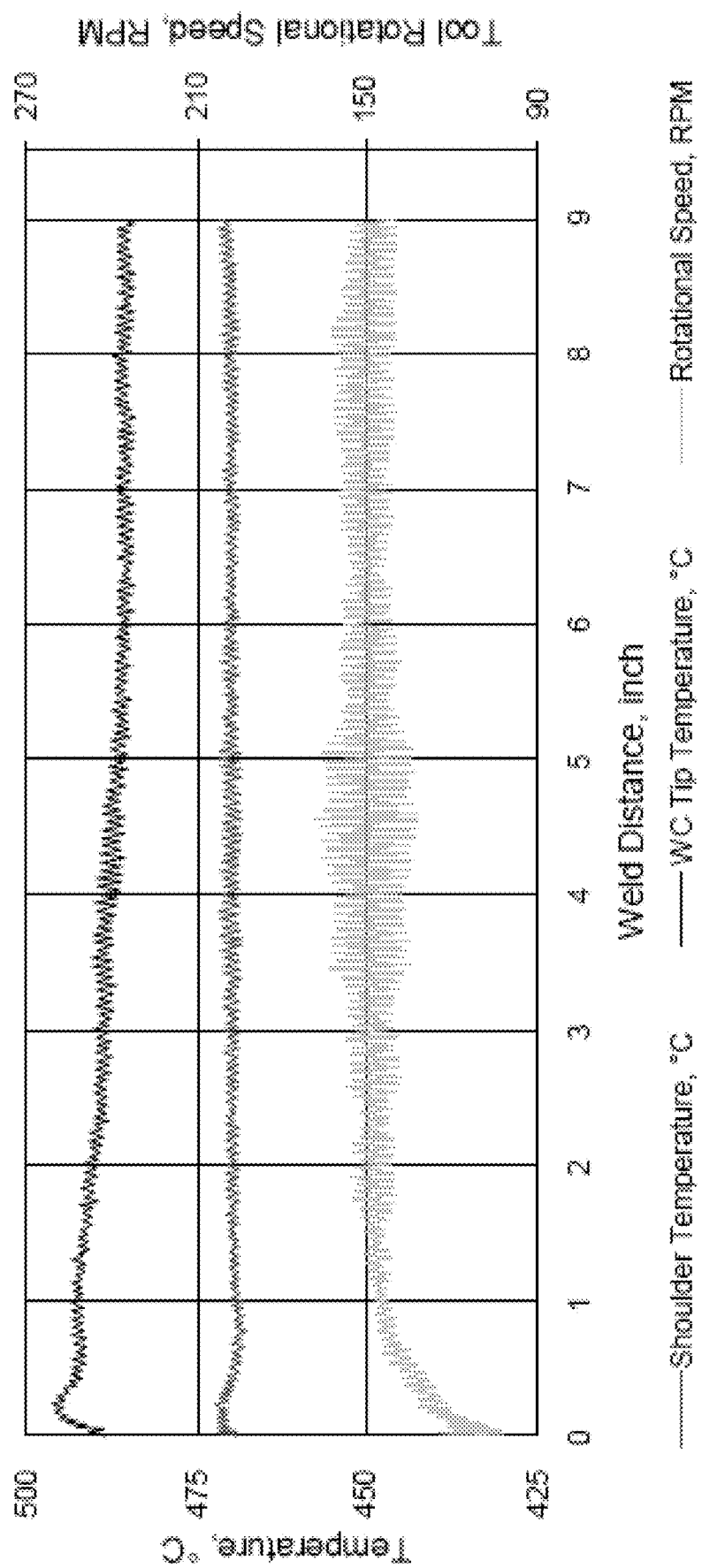
FIG. 19 shows information of one set of process parameters.

FIG. 16 (A) shows the H13 FSW tool with circular tungsten carbide tip insert after eight linear feet of welding. The pin is not deformed and the tungsten carbide insert has no visible sign of wear. By comparison, FIG. 16 (B) shows a H13 FSW tool without a tip insert after eight linear inches of welding. Wear and deformation is immediate when a hardened insert is not used when rubbing to generate an intermetallic bonding layer. Use of a tungsten carbide insert dramatically improves tool wear for this new process. In one set of tests two examples of FSW tools having tungsten-carbide inserts within the pin tip were used, see FIG. 18. The upper tool contains a cylindrical insert and the lower tool contains a hexagonal insert. The cylindrical insert configuration was used to join AA6061 to Rolled Homogenous Armor (RHA) MIL-DTL-12560J in a lap weld configuration. The upper material of the lap joint was 0.5" thick AA60601 and the lower material was 0.5" thick RHA containing a single dovetail. A single tool was used to weld eight linear feet without visible signs of wear or degradation of the tip insert. FIG. 19 shows that in use, the temperature was higher at the face of the tip insert (area of rubbing on the RHA) than at the shoulder which is an important for making the key feature for forming a metallurgical bond. In traditional FSW, the shoulder is the highest temperature—which is not desirable in the present arrangement.

Figure 20:
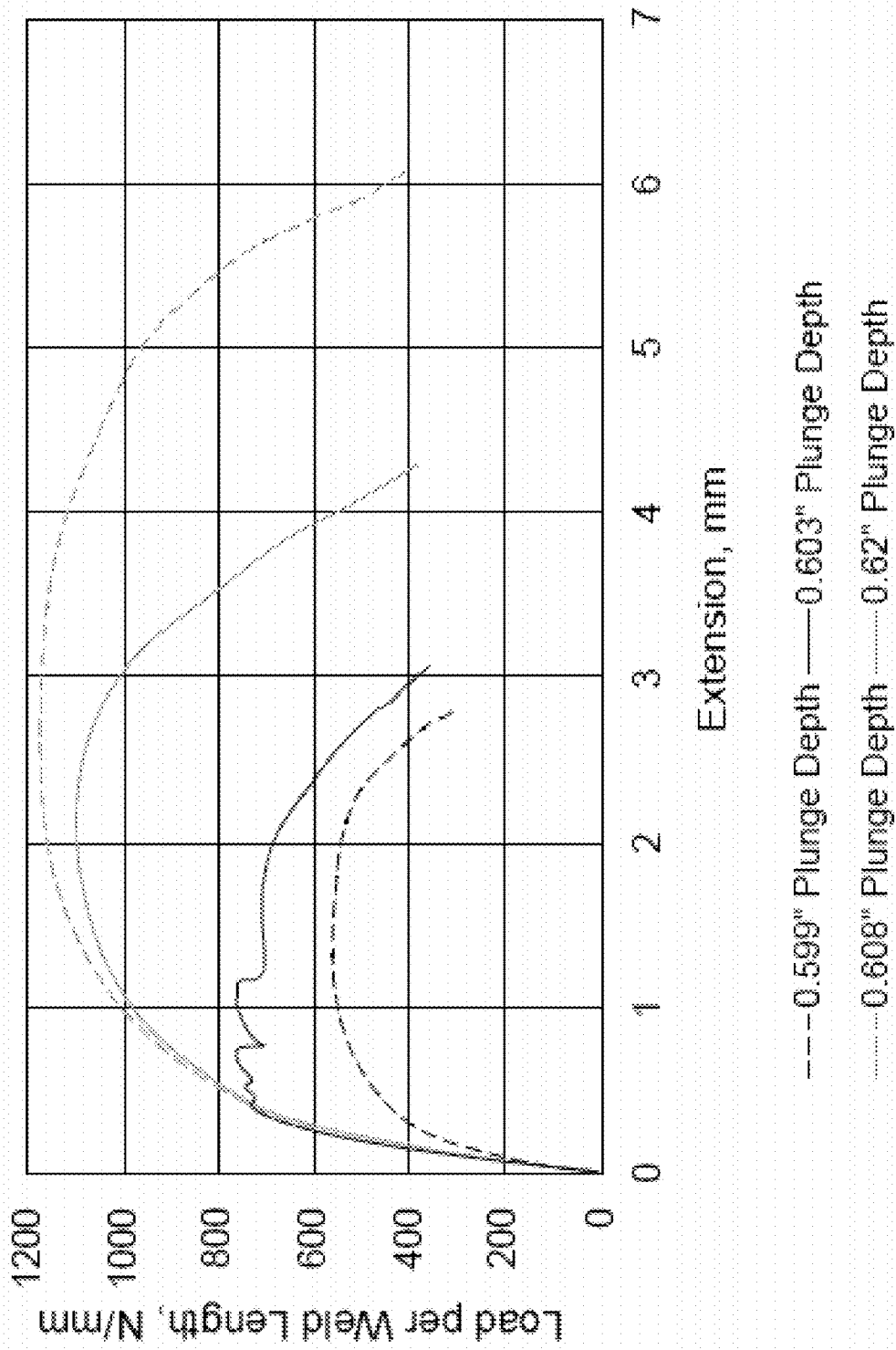
FIG. 20 shows load vs. extension curves for different plunge depths.

In one set of experiments nine sets of lap joints were welded having key parameters within the following ranges. Tool speed 100-250 rpm, feed rate up to 7.5 cm/min, force 25-100 kN, torque 250-350 Nm, tip temperature 450-550 degrees C., shoulder temp 400-500 degrees C. These samples were then tested at different plunge depths. FIG. 20 shows load vs. extension curves for different plunge depths (0.599", 0.603", 0.608" and 0.620") of the FSW tool. The 0.599" case did not involve rubbing of the tip insert within the dovetail grooves for the express purpose of determining baseline strength in the absence of a metallurgical bond. The other three plunge depths were intended to impart increasing amounts of rubbing between the tip insert and base of the RHA dovetail. A total of 26 specimens were tensile tested (qty 6 for 0.599", qty 5 for 0.603", qty 6 for 0.608", qty 9 for 0.620"). The four curves in the following plot represent an average of each grouping. From this plot it is clear that the highest strength and largest ductility (extension) is for a plunge depth of 0.608". A smaller plunge depth of 0.603" gives lower strength and ductility as does a larger plunge depth of 0.620".

Figure 21:
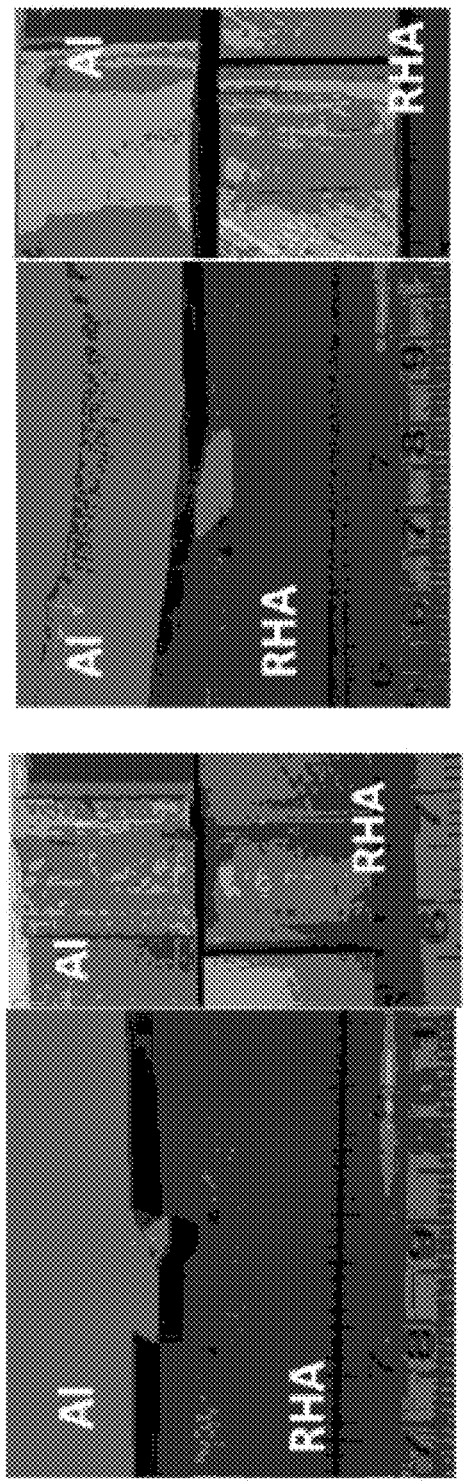
FIG. 21 shows the failure morphologies discovered during tensile testing having the data shown in FIG. 20.
Figure 21:
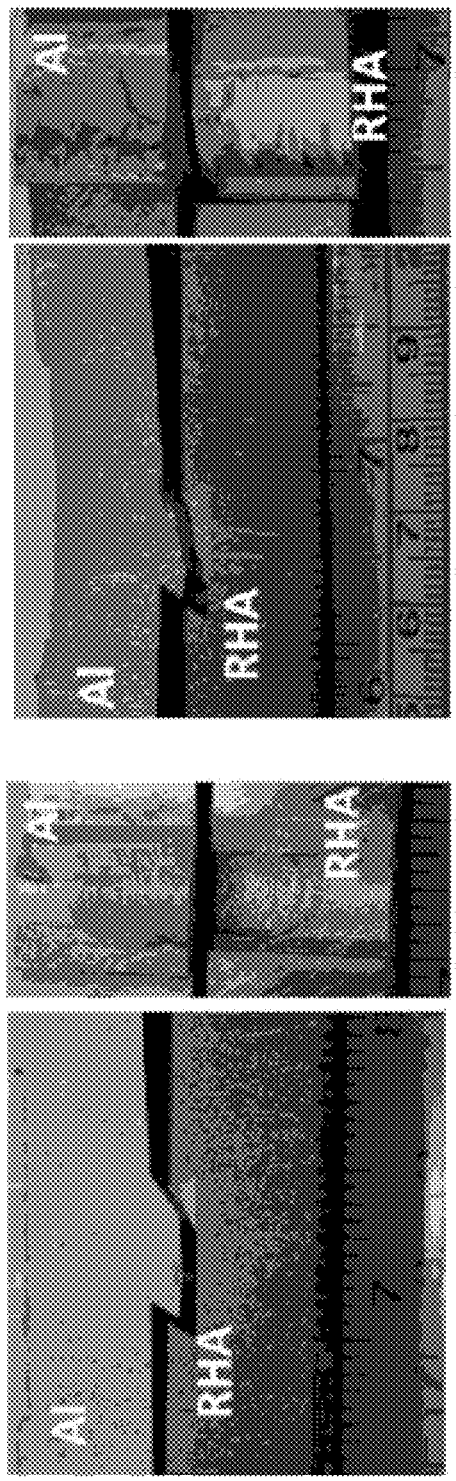
Figure 21:
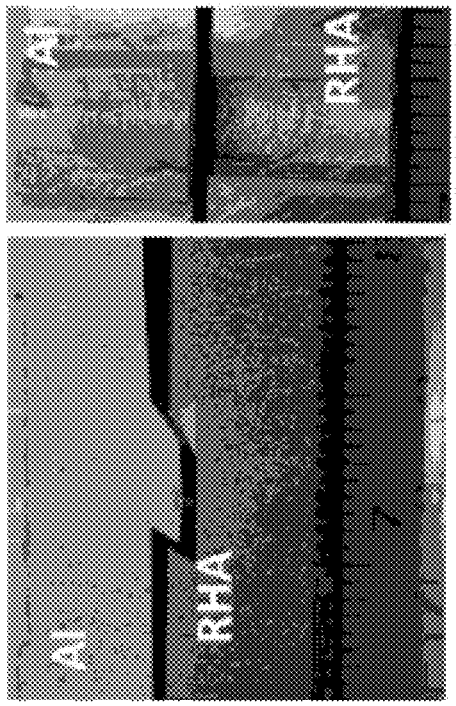
Figure 21:
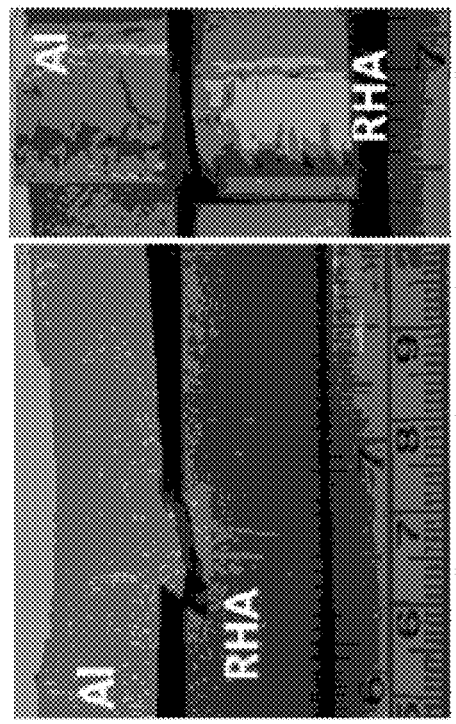

FIG. 21 shows that the failure morphology during tensile testing (AA6061 being pulled to the right and RHA being pulled to the left) is very different for each of the four curves in the above plot. For the 0.599" plunge depth, the aluminum simply pulls out of the dovetail as the aluminum corner plastically deforms. For the 0.603" plunge depth, a weak metallurgical bond is formed which fractures in a brittle manner and then shears at the aluminum corner. For the 0.62" case, the metallurgical bond does not fracture and failure occurs in the bulk aluminum within the dovetail resulting in higher strength and ductility. The case with the highest strength and ductility is for the 0.608" plunge depth where shear failure occurs in the bulk material.

Figure 22:
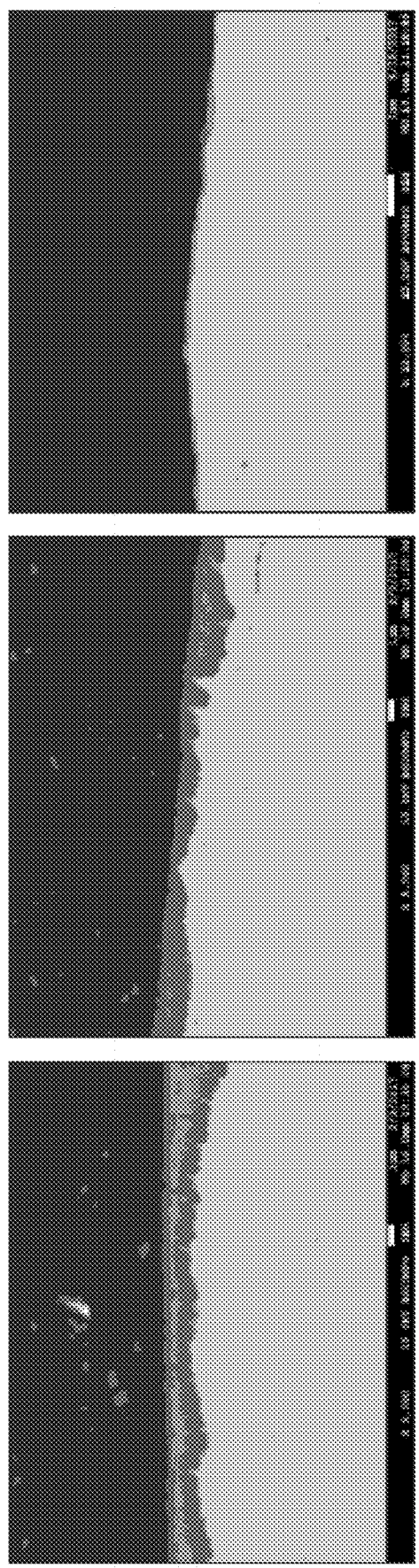
FIG. 22 shows different interlayer thicknesses that are generated under the present embodiment.

FIG. 22 shows different interlayer thicknesses (2.2 micron on left, 1.3 micron in middle and 100 nm on right) that are generated. The phase (for example, intermetallic or amorphous) and strength of the metallurgical bond at the dissimilar interface are affected by temperature as well as the strength of the heat affected zone in the aluminum. Controlling temperature in the stir zone and the dissimilar metal interface simultaneously can be performed by modulating the spindle axis speed, torque, current, power or any combination of these variables. The temperature of the dissimilar interface is preferably controlled by modulating the position, forge force or motor torque of the forge axis. Control algorithms governing the temperatures in the stir zone and at the dissimilar interface operate independently, but may be linked together as part of multivariable control scheme.

In one embodiment the spindle axis is used to control the temperature of the stir zone and the forge axis to control the temperature at or near to the dissimilar interface. This could be done with a monolithic tool or with a two piece tool where the shoulder and pin can move relative to each other along the forge axis. Another embodiment of this concept is to use the spindle axis to control the temperature at or near the dissimilar interface and the forge axis to control the temperature of the stir zone. This could be done with a monolithic tool or with a two piece tool where the shoulder and pin can move relative to each other along the forge axis. Typically the spindle axis is controlled by commanding speed, torque or power to regulate temperature and the forge axis is controlled by commanding a force, velocity or position change to regulate temperature. In FSW machines that allow the pin to rotate relative to the shoulder one spindle axis can control the temperature of the stir zone, while the other control the temperature at the dissimilar interface.

The friction stir dovetailing process can also be used to join dissimilar materials with a myriad of different joint configurations. For example, metal with a higher melting point (for example steel) can be "buttered" (coated) with a metal having a lower melting point (for example aluminum) such that subsequent fusion welding can be performed to form previously impossible configurations for dissimilar metals. This "buttering" can be single or double sided and the thicker section can be either the higher or lower melting point material. The buttered layer, or underlying steel, may contain features (not illustrated due to the limitless embodiments) such as tabs, angles, holes, slots and other features that enable subsequent fusion welding of joints having a final configuration that is otherwise unweldable for dissimilar metals. Buttering can also enable subsequent fusion welding of a nearly limitless array of other structures and attachments such as extrusions, brackets, threaded shafts, fittings and so forth (also not illustrated here due to the numerous possibilities). Buttering can also overcome clearance/access issues during manufacturing that are currently preventing adoption of FSW in vehicle applications. The buttering approach can also enable fusion welding in areas for materials where welded properties are more beneficial than FSW; all while simultaneously allowing a joint between dissimilar metals. Another example is the enabling of interior joints that are otherwise impossible for dissimilar metals.

The chemistry of intermetallic or amorphous layers/regions affects the mechanical properties and microstructure of the metallurgically bonded interface. The intent is to protect the use of cold spray to deposit a layer of metal within the dovetail to modify the chemistry of the metallurgical bond at the dissimilar interface. One embodiment of this concept is to spray a thin layer of cold spray material on the inner surfaces prior to friction stir dovetailing. Alternatively, the dovetail groove could be filled partially or fully with cold spray material prior to FSW. For example, cold spraying 7000 series aluminum into the dovetails of underlying steel would reduce/eliminate the presence of aluminum alloying elements and therefore change the structure/properties of the bonded interlayer.

The following examples are provided as illustrations of the principles and embodiments described above:

EXAMPLE 1

Solid-state joining of thick section aluminum to steel plate was achieved using a custom designed pin tool in a friction stir welding device to flow a lower melting point material (AA6061) into dovetail grooves previously machined into the surface of an underlying material having a higher melting point (rolled homogeneous armor [RHA]). Repeating dovetails form a mechanical interlocking structure akin to metallic Velcro, however the forming of intermetallic interconnects by the friction stir welding tool strengthened this interconnection. In one example, 38.1 mm (1.5 in.) thick AA6061 was joined to 12.7 mm (0.5 in.) thick RHA plates. Tensile test data showed specimens failing in the processed aluminum rather than at the joint interface.

Figure 23:
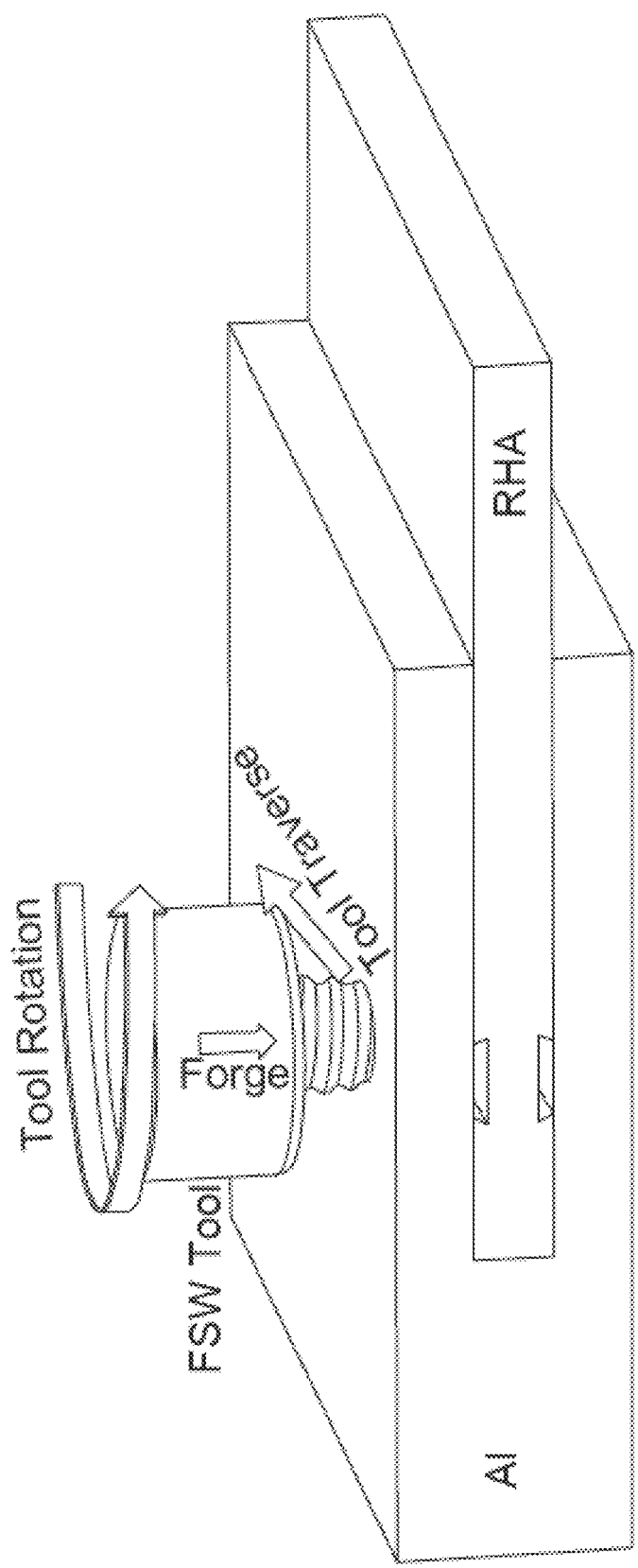
FIG. 23 shows an arrangement of one tested embodiment
Figure 24:
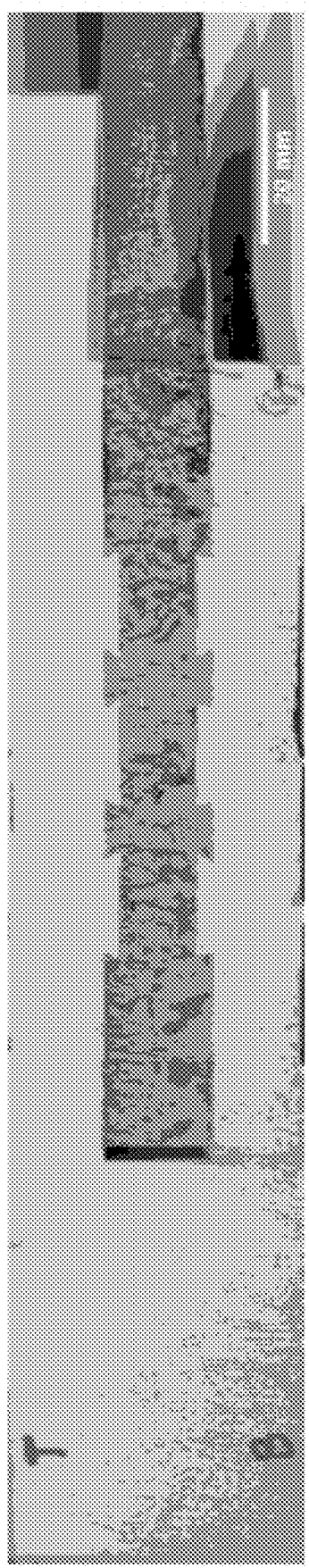
FIG. 24 shows a cross section of one tested configuration

Plates of RHA procured to MIL-DTL-12560J were dual disc ground to a thickness of 12.7 mm and pre-machined dovetail grooves shown in FIG. 23. The RHA plates were inserted into AA6061-T651 sandwich structures having a total thickness of 38.1 mm. FSD was performed using a tool made from H13 tool steel that was heat treated to obtain RHC 45. The one-piece FSW tool consists of a scrolled shoulder and a frustum shaped (6.1.degree.) threaded+3 flatted pin. FSD was performed using a tool rotational speed of 275 RPM and welding speed ranging between 25-50 mm/min. All welding was performed using a position control mode where the forge force is a response variable of the commanded plunge depth. Welds were made on the top side, then machined flat, and the assembly was turned over to weld the bottom side. Tensile specimens were cut from the welded Al-steel to an average thickness of 12.0 mm using a water jet. A cross section is shown in FIG. 24. Standard grinding and polishing sequences were followed for metallographic sample preparation and final polished surface was obtained using colloidal silica (<0.05 µm).

Figure 26:
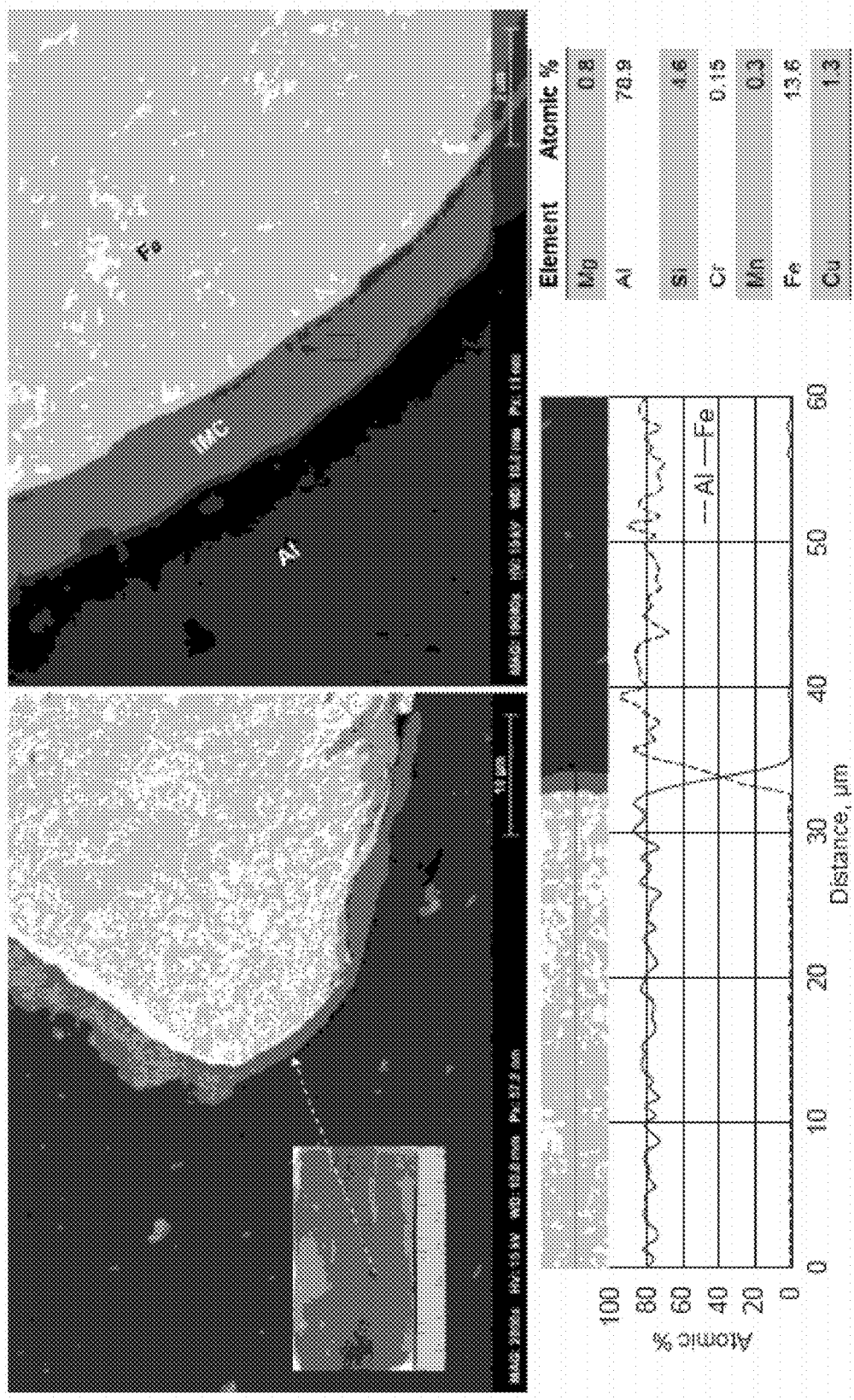
FIGS. 26-27 show the results of testing on the dovetail geometries of FIG. 25.
Figure 27:
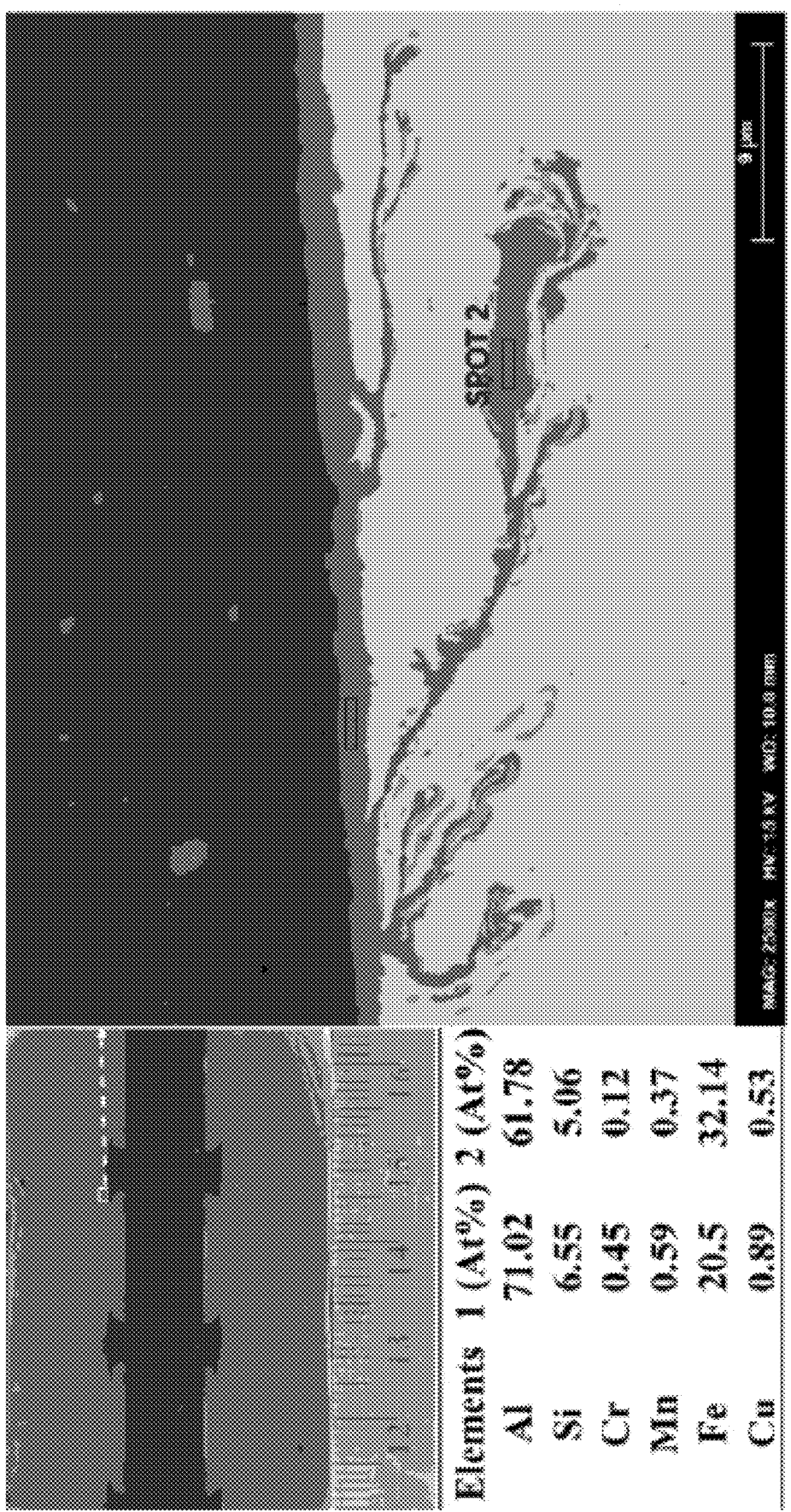

A scanning electron microscope (SEM) equipped with energy dispersive spectroscopy (EDS) was employed to investigate the intermetallic formation. Tensile testing of sandwich plates was performed using a 50 kip MTS test frame to ascertain tensile test and microstructural observations. The results of that testing are shown in FIGS. 26-27. Structural analysis of a dovetail joints between AA6061 and RHA subjected to tensile load was simulated using LS DYNA finite element software. The simulation predicted the failure of tensile specimens with, and without, the formation of IMCs along Al and RHA dovetail interface. Cases for 1, 2 and 3 dovetails having the outlined geometries (shown in FIG. 25) were structurally analyzed.

From the finite element simulations, it was observed that shear failure of the Al dovetail occurred for configuration with one, two and three dovetails when no intermetallic connection is present. Therefore, simple dovetail interlock without bonding doesn't have impact on structural integrity regardless of the number of dovetails. The testing showed that joint strength is improved when IMC is present at the Al-RHA interface within the dovetail. In the case of IMC being present, only two dovetail features are required to cause failure in the bulk Al. In general, the results of this structural analysis indicate that, the presence of IMCs formation improves joint efficiency in the FSD process. As a result, steps were taken to generate an IMC at the Al-RHA interface while simultaneously filling the dovetail grooves.

Figure 25:
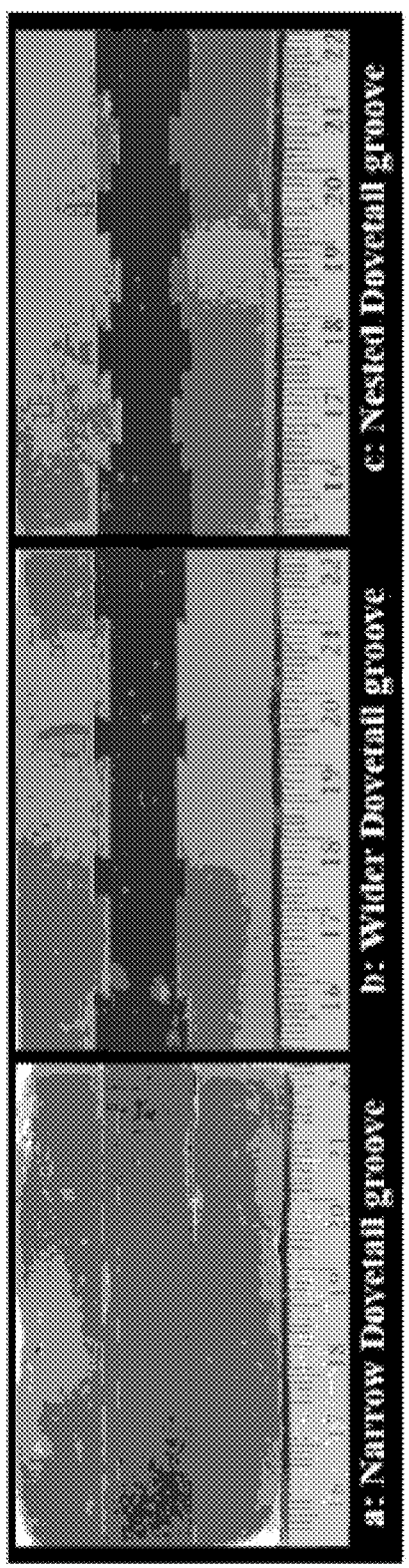
FIG. 25 shows various dovetail geometries.

Transverse macro sections of Al-RHA joints with different dovetail geometries are shown in FIG. 25. The macrosections clearly demonstrate the effective filling of Al into the dovetail grooves regardless of dovetail geometric variations. The FSD process is quite robust in terms being able to fully fill the grooves. For example, welds were performed (from 200 to 275 rpm and 25 to 100 mm/min) with the tip of the tool ranging from 2 mm above the RHA surface to having the tool tip in contact with the bottom of the dovetails. In all cases, the grooves were fully filled with no voids observed. While FIG. 25 provides a macro-view of weld cross sections in terms of defect formation and dovetail filling, metallographic analysis is needed to determine the bonding state along the Al-RHA interface. SEM analysis at the Al-RHA interface of specimens are shown in FIGS. 26 and 27 respectively.

The data indicates that interfacial bonding has occurred due to the formation of an IMC measuring 0.5 µm to 1 µm thick in narrow dovetail grooves and 1.0 µm to 2.0 µm thick in wider dovetail grooves. The SEM micrographs suggest that incipient melting of AA6061 during FSD might cause bonding between RHA and Al with the formation of an intermediate transition layer which will be further confirmed as IMCs from energy dispersive spectroscopy (EDS) analysis. The formation of IMCs was confirmed by elemental quantitative analysis using EDS. The spot (area) and line scanning energy spectrum results are combined with the SEM micrograph in FIG. 27. The atomic percentage of corresponding line scans of Al and Fe at the intermediate transition layer indicate a diffusion profile of Al and Fe across the interface suggesting IMC formation. Moreover, the EDS spot analysis of this layer showed 79 at. % Al and 14 at. % Fe. In FSD, intense plastic deformation of AA6061 by the stirring tool might cause incipient melting of Al in close proximity to the RHA due to high localized temperature. The increased heat input caused by the tool contacting and deforming the RHA resulted in the formation of possible multiple IMCs (AlFe, Al3Fe, FeAl2, Al4Fe, Al13Fe4, Al5Fe2 etc.) at the bonding interface which might be further confirmed from temperature measurement during FSD, phase diagram analysis and corresponding X-ray diffraction analysis.

The macro cross section shows the deformed layer of RHA near the upper region of dovetails where the stir tool intentionally contacted the RHA during processing to locally increase temperature and promote IMC formation. Consequently, the growing of IMCs were evident outside the dovetail in the SEM and EDS analysis. Frictional heating due to contact between the stir tool and RHA may result in the Al being melted locally, thereby resulting in the formation of IMCs. According to the EDS spectra and elemental composition, the intermetallic compounds FeAl2, Fe3Al or Fe2Al might form in the Al-RHA interlayer.

Figure 28:
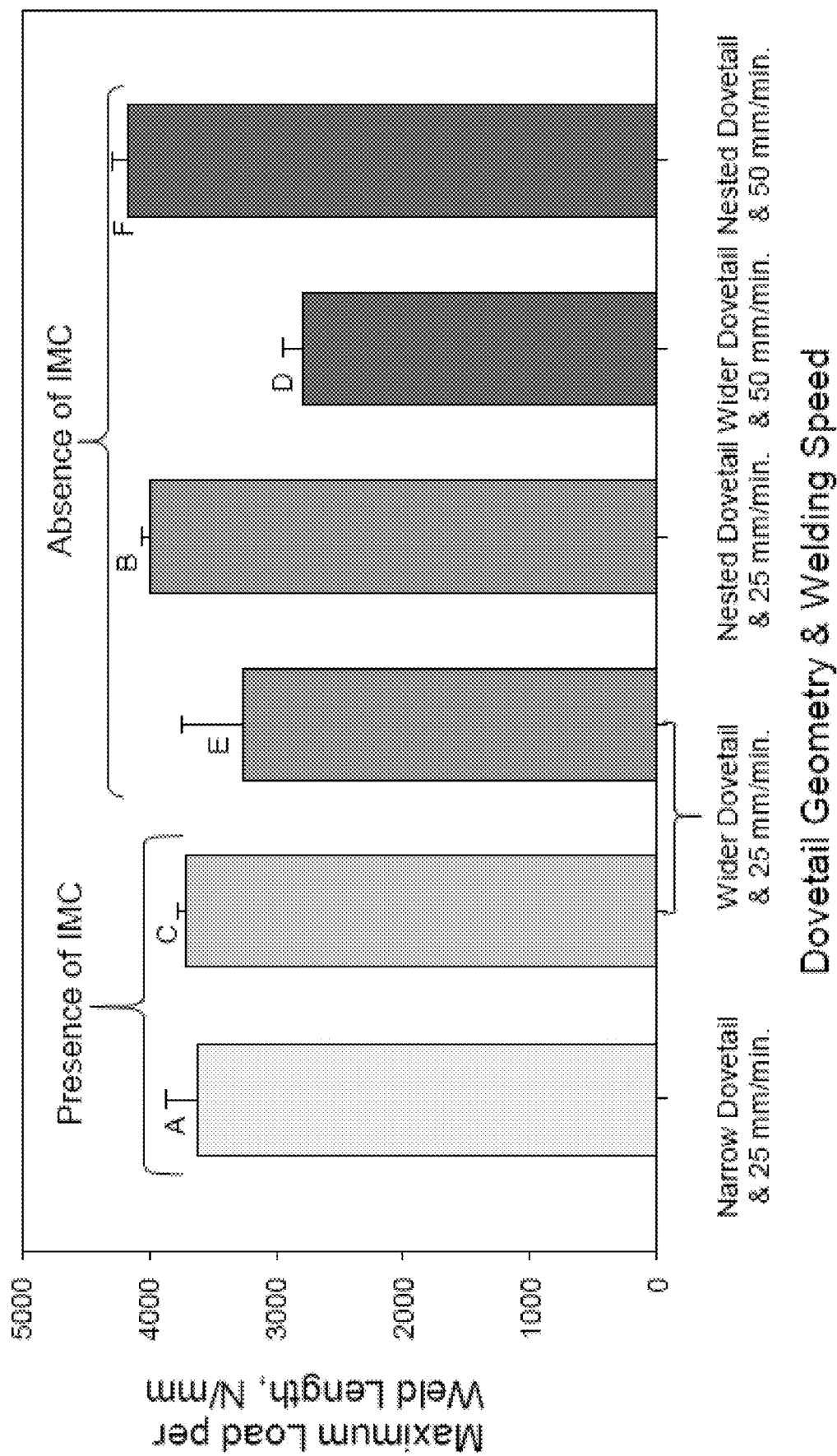
FIG. 28 shows the maximum tensile load per unit length of weld (i.e. specimen thickness) plotted against different dovetail grooves and welding conditions.

FIG. 28 presents the maximum tensile load per unit length of weld (i.e. specimen thickness) plotted against different dovetail grooves and welding conditions. It was observed that nested dovetails result in higher strength than single wider dovetails regardless of welding speed. The higher load carrying capacity provided by nested dovetails is due to the additional interlocking that resists deformation in the tensile and transverse directions. In the absence of IMC, there does not appear to be a statistical difference in the load at failure on the weld speed range of 25-50 mm/min. However, inclusion of the IMC within the wider single dovetail at 25 mm/min was found to increase strength compared to the case of no IMC. This speaks to the role of IMC formation for improving joint strength. The narrow dovetails welded at 25 mm/min have IMC formation outside the dovetail and interestingly show higher strength than the wider dovetails with IMC. From this data, we concluded that the formation of IMCs significantly improves joint strength.

Figure 29:
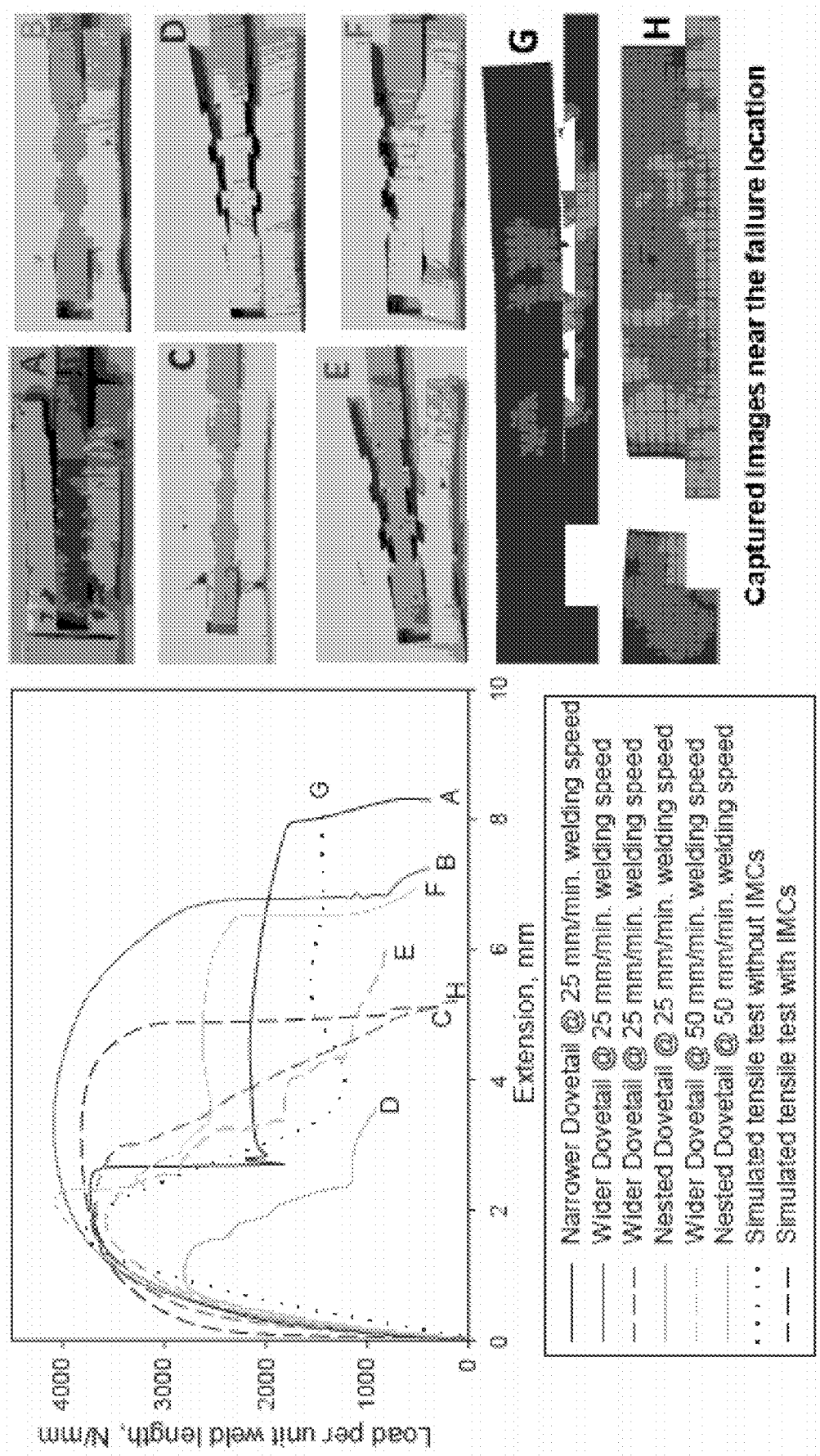
FIG. 29 is a plot of a function of extension for different dovetail geometries.

The normalized load (load per unit weld length) as a function of extension for different dovetail geometries is plotted in FIG. 29. Failure of the narrower dovetail specimen (A) occurred due to fracture of the brittle intermetallic layer on one side of the sandwich structure at peak load which is followed by ductile failure of bulk Al due to eccentric loading. For the specimens D and E, successive separation of dovetails occurred after reaching the maximum load as the dovetails tend to unzip one pair after another. This phenomenon is indicated by the changes in slope of the load curves on their descending part as tensile testing progress to joint failure. For the nested dovetail welded at 25 mm/min corresponding to specimen C, failure occurred in the processed Al rather than at the dovetail interlock. As mentioned earlier the volume of the filled Al in the nested dovetail is high enough to encounter the tensile loading near the region of the additional interlock, resulting in failure in the Al with the failure plane perpendicular to the loading direction. The failure of the tensile specimen C is similar to specimen B. However, an additional contribution of bonding between Al and RHA with the formation of IMCs resulted in a bulk Al failure rather than a failure at the joint. This is indicative of the strength of the joint and demonstrates the viability of extending to a wide range of material stack-up (50 mm or higher thickness) to form dovetail interlock.

In accordance with example implementations described herein and with reference to the drawings and descriptions described herein, friction stirred dovetailing (FSD) can be used to successfully join 0.5" (12.7 mm) AA7099 to 0.5" (12.7 mm) Ni—Cr—Mo steel in a lap configuration. Multiple FSD approaches are described herein that can reduce Zn embrittlement of Fe—Al intermettalic compounds (IMCs) which can form during conventional friction stir welding (FSW). In accordance with example implementations, one of the methods can utilize a FSD approach in which a custom designed tool is used to extrude the AA7099 into the pre-machined dovetail grove of underlying steel such as RHA by forming mechanical interlocking and metallurgical bonding simultaneously. Other methods can utilize a two-step approach where FSD of AA6061 is first used to form a Si rich Fe—Al IMC within the dovetail groove. AA7099 plate can then be joined to the AA6061 within the dovetail using FSW.

Example materials have been used to demonstrate the success of these connection methods and processes. For example, two types of precipitation hardened Al alloys (AA6061-T651 and AA7099-T7451) having the thickness of 0.5" (12.7 mm) can be used for joining with RHA using FSD techniques. The RHA plates can be procured to satisfy the MIL-DTL-12660J specification and the thickness of 0.5" (12.7 mm) can be obtained by dual disc ground. The RHA plates can also be prepared for the FSD process by machining grooves such as dovetail grooves within the RHA plates. For a single pass joint between AA7099 and RHA, FSD can be performed using the FSW tool depicted herein with reference to FIGS. 16 and 18. Accordingly, this tool can have the WC insert as well as the thermal location and threaded pin with flats and a scrolled shoulder. This tool can be utilized to provide welding in accordance with Table 3 below.

Figure 30A:
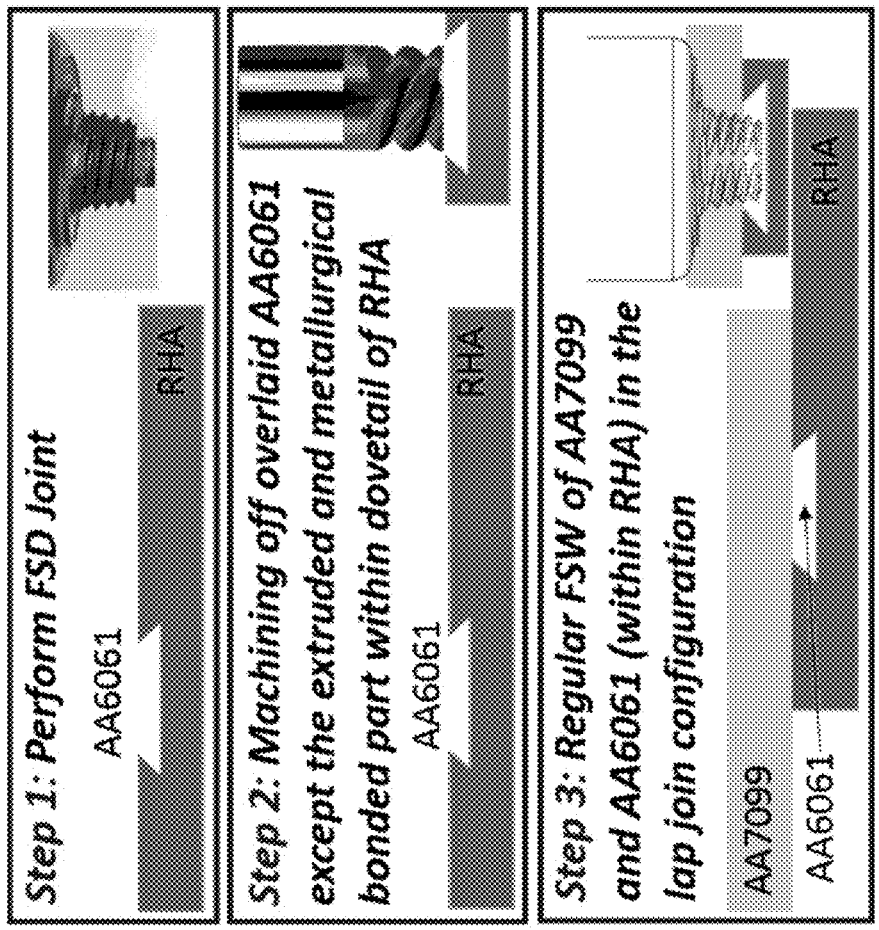
FIG. 30A is a depiction of a method for connecting dissimilar materials according to an embodiment of the disclosure.

In accordance with example implementations and with reference to FIG. 30A, method steps are depicted for utilizing this tool as well as additional tools to bond materials. Accordingly, when joining AA7XXX and steel, Zn rich brittle IMCs using the conventional FSW process can be generated. Another approach is provided wherein intermediate materials are provided such as AA6061 that can link RHA and AA7099 on both sides by producing strong metallurgical bonding with former material and fully stirred metallic bonding with later materials. This has been described herein earlier, but is shown for clarity below in the context of the friction stir welding parameters of the Table 3 below.

Figure 30B:
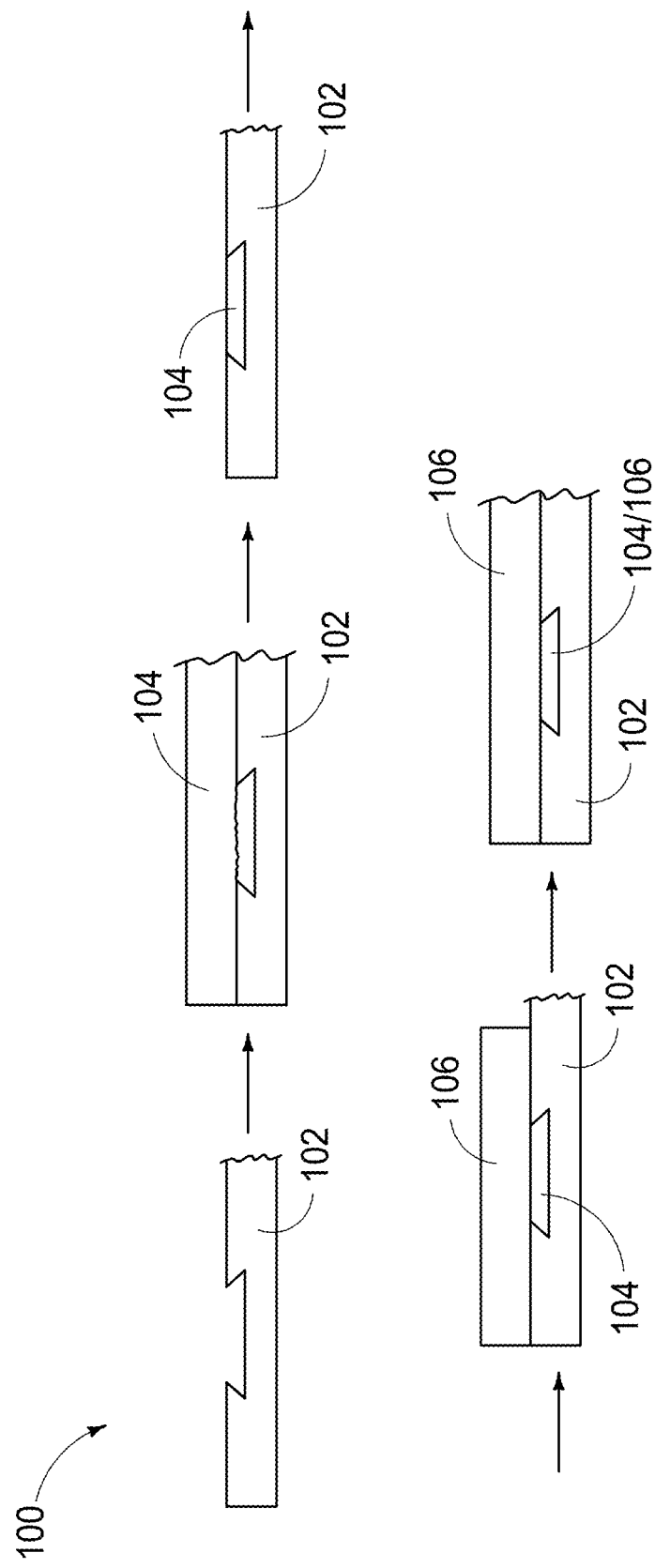
FIG. 30B is another depiction of a method for connecting two dissimilar materials according to an embodiment of the disclosure.

In accordance with example implementations, and with reference to FIG. 30B, a material 102 is provided, for example, RHA having a groove therein. For example, a dovetail groove as shown or described herein. Upon 102 can be placed material 104, such as an AA6061 material. This material can be extruded into the dovetail groove, and the remainder of 104 can be removed from 102 with the exception of the material 104 within the dovetail groove. In accordance with example implementations, an additional material 106 such as an AA7XXX series material, can be provided above material 102, and this material can be friction stir welded into the dovetail groove to provide a mixture of material 104 and 106 within the groove, thereby bonding material 106 to material 102. Mixtures of this material within the groove are shown and depicted within this disclosure.

TABLE 3

Summary of welding parameters in single pass FSD and double passes FSD/FSW joints

| Lap Joint Configuration Single and Double Pass | Trial # | EDC of Position Mm | Forge Force kN | Shoulder Temperature (Controlled) ° C. | Tool Rotational Speed RPM | WC Temperature C. | Weld Power kW |
|---|---|---|---|---|---|---|---|
| Single Pass: FSD joint of AA7099 to RHA | A | 15.30 | 62 | 440 | 91 | 450 | 3.50 |
| | B | 15.40 | 69 | 440 | 86 | 445 | 3.70 |
| | C | 15.45 | 77 | 440 | 88 | 448 | 3.75 |
| | D | 15.45 | 74 | 420 | 85 | 430 | 3.53 |
| | E | 15.35 | 82 | 410 | 70 | 413 | 3.42 |
| Two Pass: FSD-6061 to RHA [10] & FSW-7099 to 6061 | F | 15.30 | 57 | 470 | 150 | 485 | 4.85 |
| | | 12.2 | 74 | 420 | 85 | — | 3.70 |
| | G | 15.30 | 57 | 470 | 150 | 485 | 4.85 |
| | | 12.32 | 83 | 410 | 74 | — | 3.50 |

Figure 31:
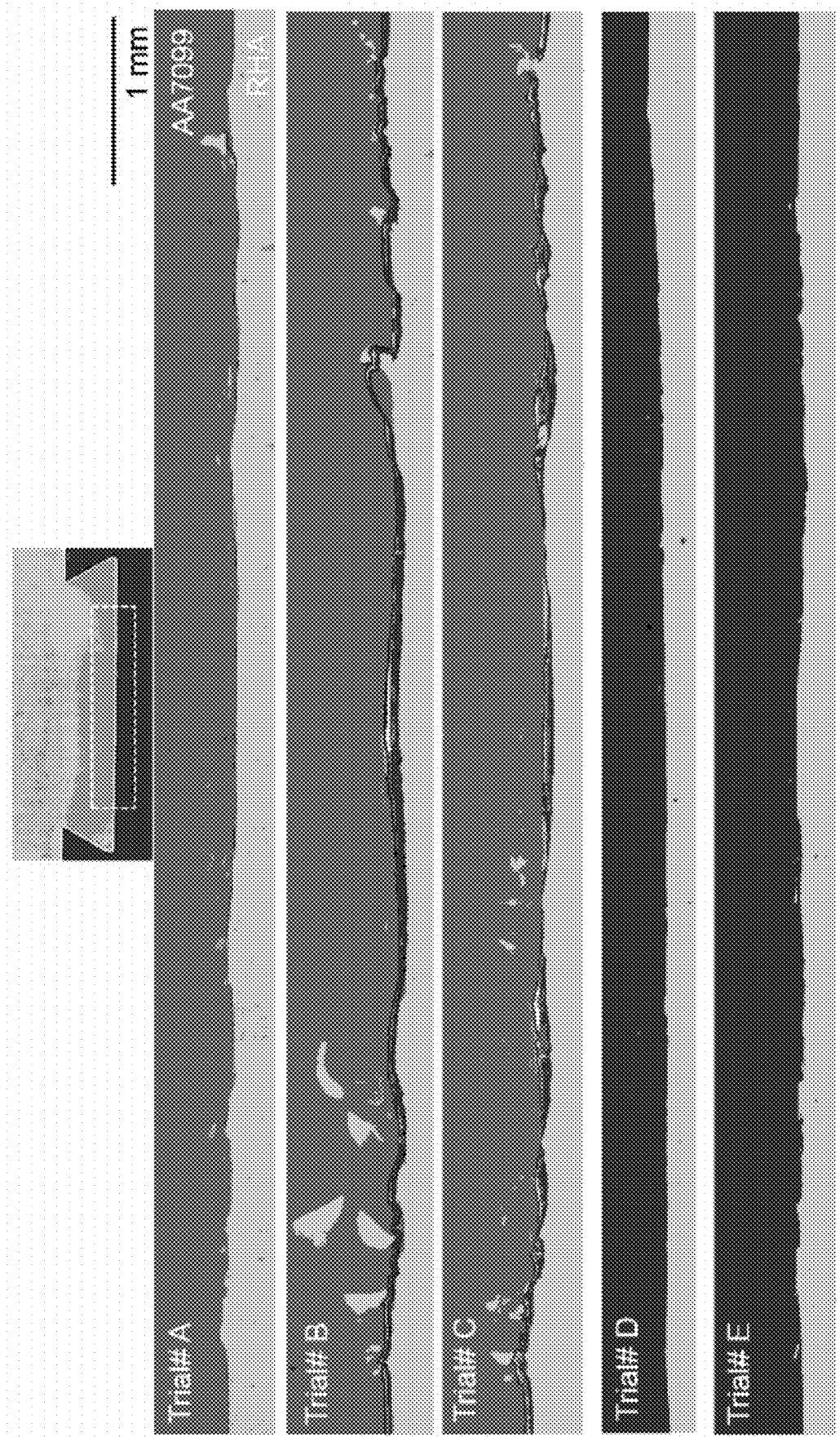
FIG. 31 is a depiction of materials connected utilizing different methods according to an embodiment of the disclosure.

In accordance with example implementations and with reference to the Table 3 above, and FIG. 31, trials and materials A-E are shown with particular emphasis to the bonding at the region outlined in the top image. With regard to Trial A, Trial B, and Trial C, insufficient bonding was formed, however, in Trial D and Trial E, sufficient bonding was made. It is believed that Trials D and E demonstrate continuous metallurgical diffusion bonding at the interface. In accordance with example implementations, Trials D and E were prepared with the WC tip of the tool described herein below 445° C.

Figure 32:
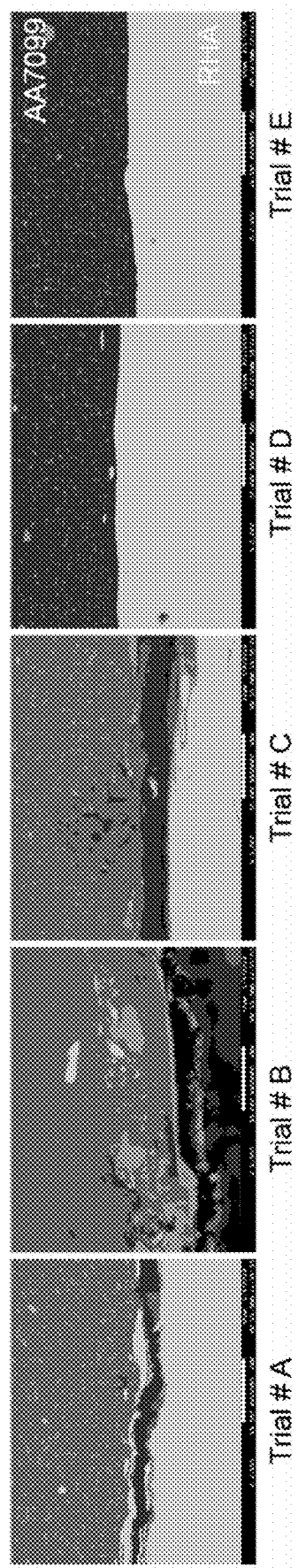
FIG. 32 shows images of materials connected using different methods according to an embodiment of the disclosure.

Referring next to FIG. 32, an even more detailed analysis of the bonding between materials at Trials A-E demonstrates that the intermetallic layer which formed eventually broke down in the trial case of A, B, and C. However, the metallurgical diffusion bonding was evident between AA7099 and RHA for Trial D and E when the recorded tool temperature at the interface was below 450° C.

Figure 33:
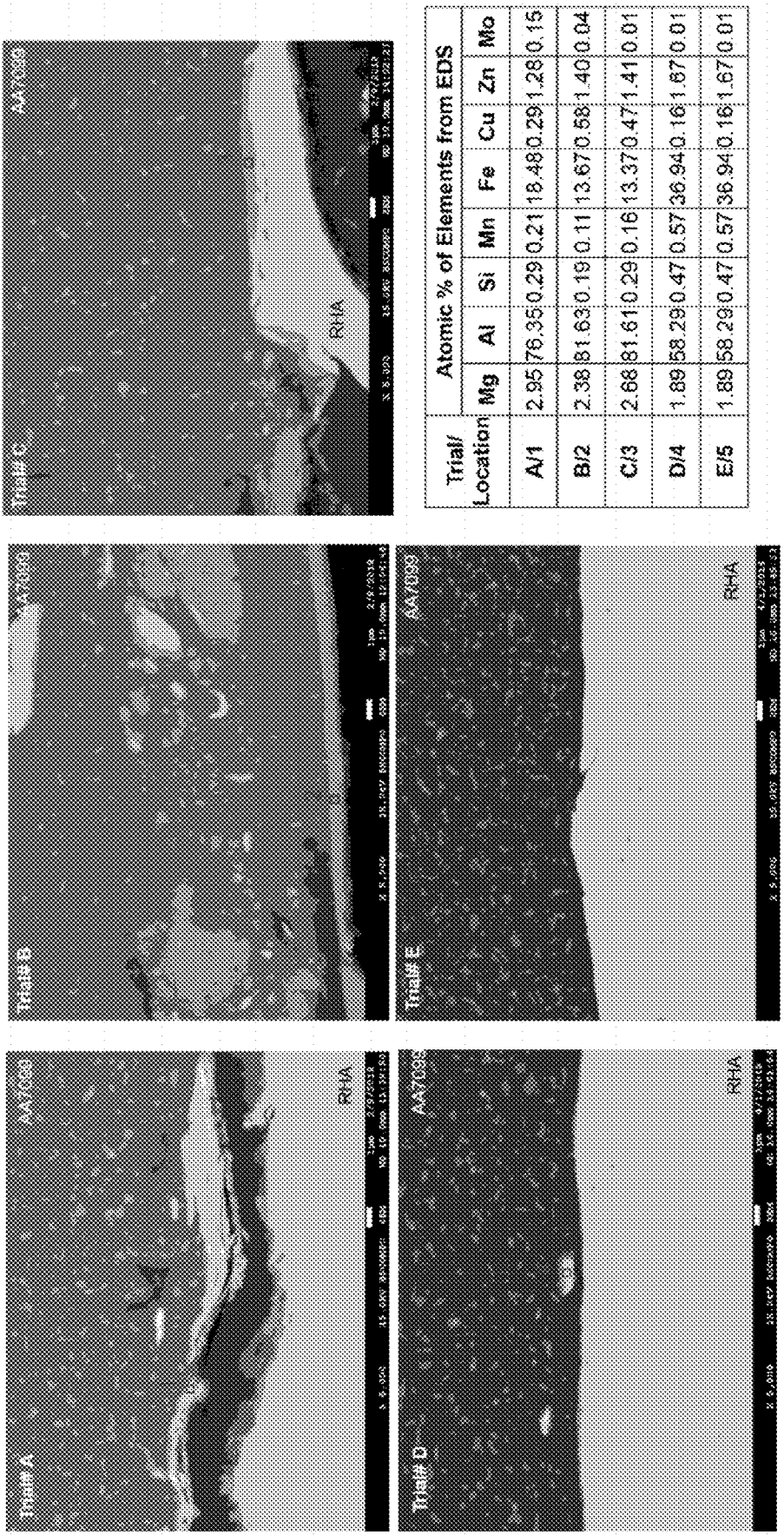
FIG. 33 shows images of materials connected using different methods according to an embodiment of the disclosure.

Referring next to FIG. 33, depictions of the dovetail interface are shown for Trials A, B, C, D, and E, as well as the atomic % of elements at those trial locations. In accordance with example implementations, a continuous IMCs layer can be observed in Trial D and E, apart from the interfaces.

Figure 34:
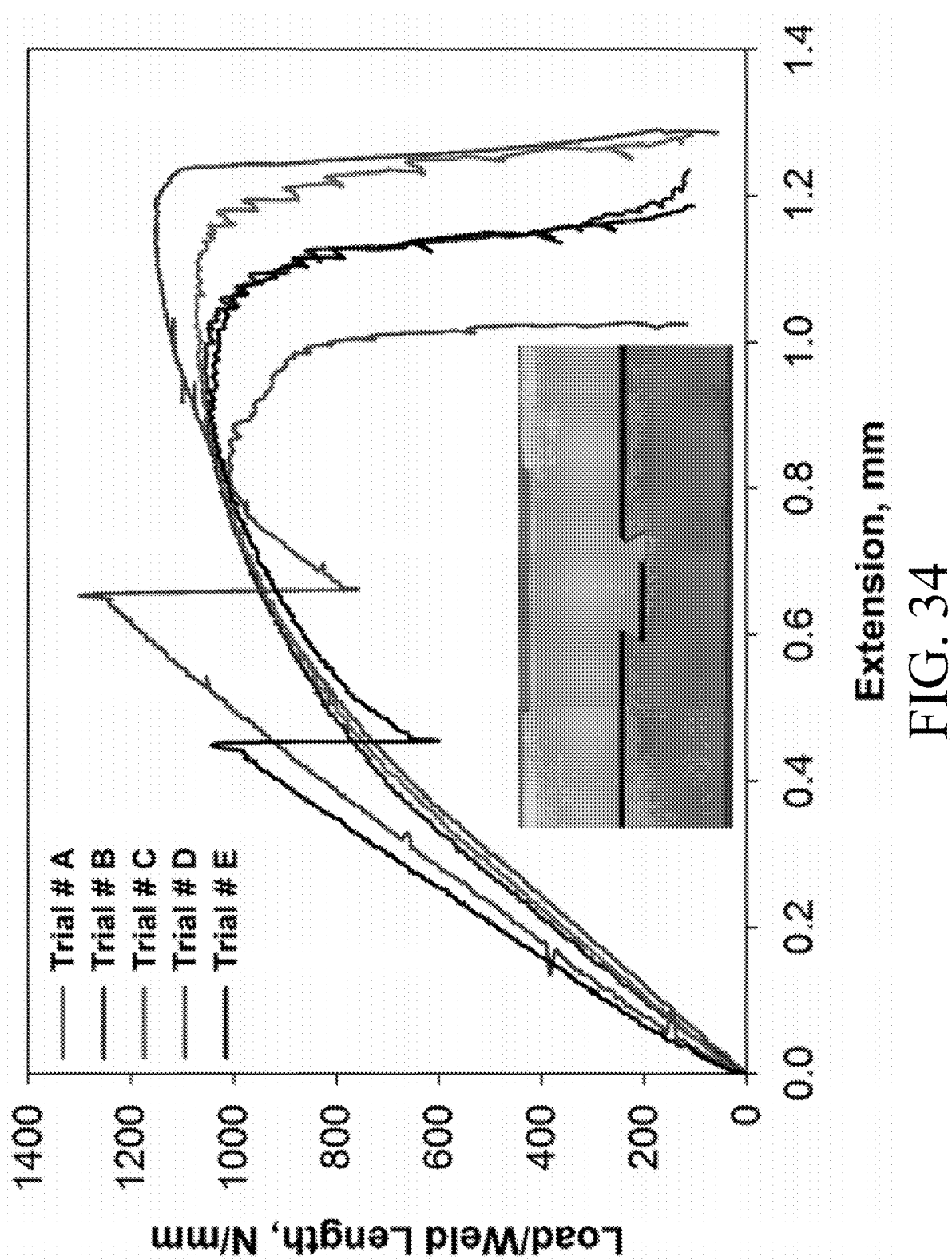
FIG. 34 is a graphical depiction of the lap shear tensile tests of materials connected according to an embodiment of the disclosure.

Referring next to FIG. 34, lap shear data of Trials A, B, C, D, and E are shown with Extension time vs. Load/Weld Length in N/mm. The lap shear tensile test was conducted for at least 4 specimens of each trial and the normalized load (load/weld length) as a function of displacement was plotted with a representative test data for each trial. It should be noted here that the load carrying capacity for trials A, B and C are governed by the mechanical interlocking through the dovetails and disrupted dovetail interfaces since no continuous metallurgical bonding is observed in these trials. It was observed in FIG. 34 that, the load increases with displacement up to the maximum value followed by a sharp change in load when the corner of the extruded Al within dovetail fails for trials A, B and C.

Regarding the two parts of characteristic load-displacement curves of the lap shear specimen for trial D and trial E in FIG. 34, the load increases linearly up to the maximum value and suddenly drop at constant displacement, however, the load regain up to certain value before completely failure of the specimens. The first part of the load displacement curve (linear up to the maximum value) may be attributed to the combined action of metallurgical bonding and metallurgical interlocking that govern the load carrying capacity of trial D and E specimens. The sudden drop in load is when the IMCs fail and load afterward, is being carried by the dovetail mechanical interlocking solely. This is consistent with the brittleness of the Zn rich IMCs layer where load drop suddenly at the time of IMCs failure.

In the second part of the load displacement curve after the failure of IMCs, load increases with displacement until the corner of AA7099 within the dovetail fail (similar to trials A, B and C). Therefore, the load carrying capacity of the lap shear tensile specimen for trial D and E is predominated by dovetail interlock in the second phase of the curve. The maximum load of 1257 N/mm was observed for trial D which is 17-25% higher than other trials. It was observed that in all trials of AA7099 to RHA FSD process, the failure location of the lap shear tensile test are observed in similar location with initial separation of disrupted/metallurgical bonded interface followed by the failure of corner of the Al within the dovetail on the loading side.

Figure 35:
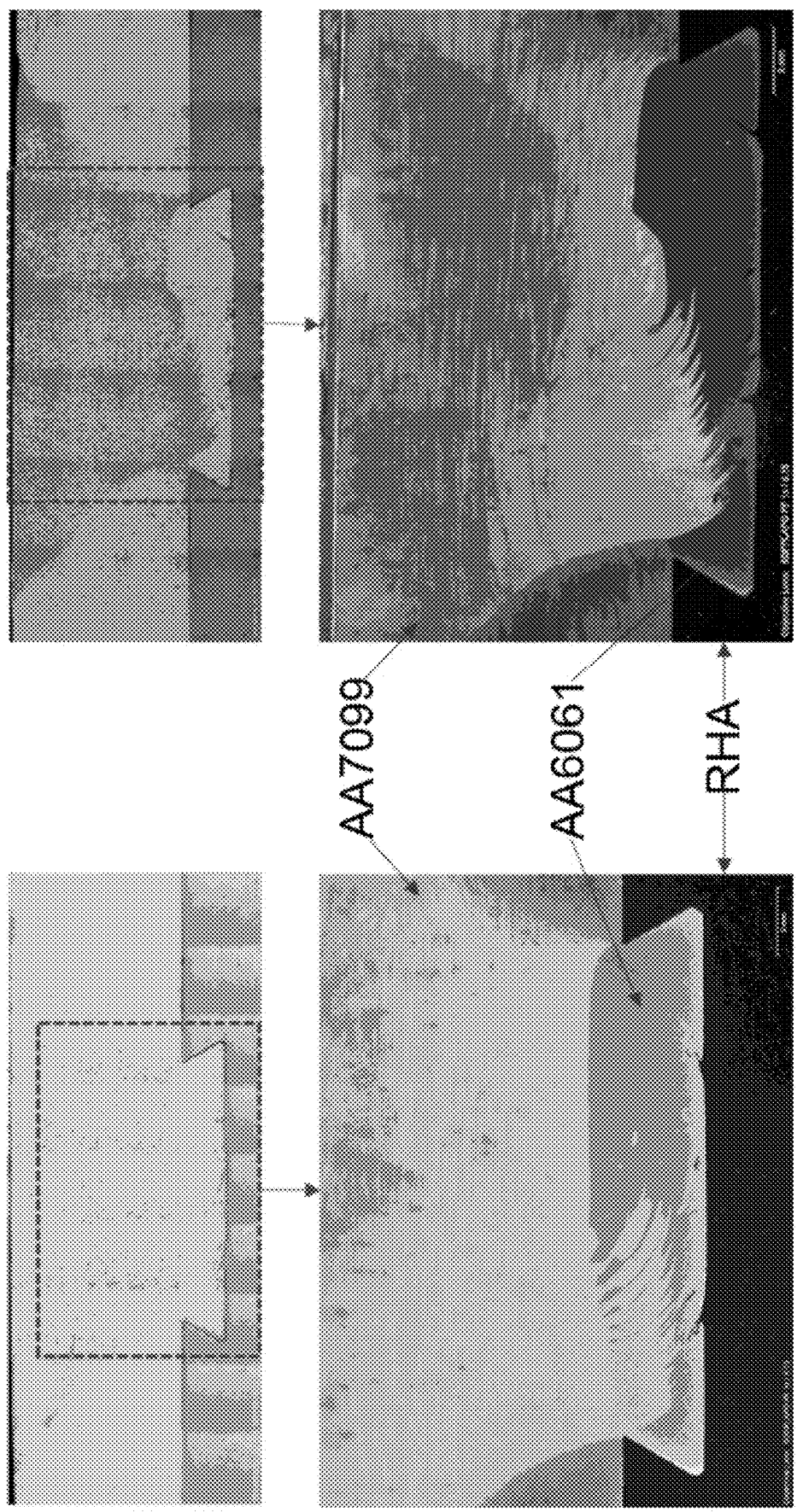
FIG. 35 shows depictions of weld macro cross sections of materials connected utilizing methods according to an embodiment of the disclosure.

Referring next to FIG. 35, the weld traverse macro sections of double passes FSD and FSW joints of AA7099 to RHA with AA6061 as an intermediate layer are depicted. In each image the advancing side is on the left and retreating side is on the right. Each column of the images show the cross sections for particular trial (trial F on the left and trial G on the right) in which the process parameters of the second pass was varied (refer Table 3). The interface of AA6061 and RHA near the dovetail root was metallurgical bonded to a length of about 8 mm.

Plunge Depth (PD) was observed to effect the resulting bonding as shown in the difference in the mixing of AA7099 and AA6061 at different commanded plunge depth (PD) of trial F and G (PD of trial G was 0.12 mm higher than trial F). It is evident from the weld cross sections that the mixing of two material within the dovetail is higher with less plunge (trial F) than higher plunge (trial G). This resulted in a higher protrusion of AA6061 into AA7099 on the retreating side in trial G compared to trial F leaving less amount of AA6061 in the dovetail (mass conservation). This asymmetric nature of material flow in advancing and retreating side is generally common in FSW.

Figure 36:
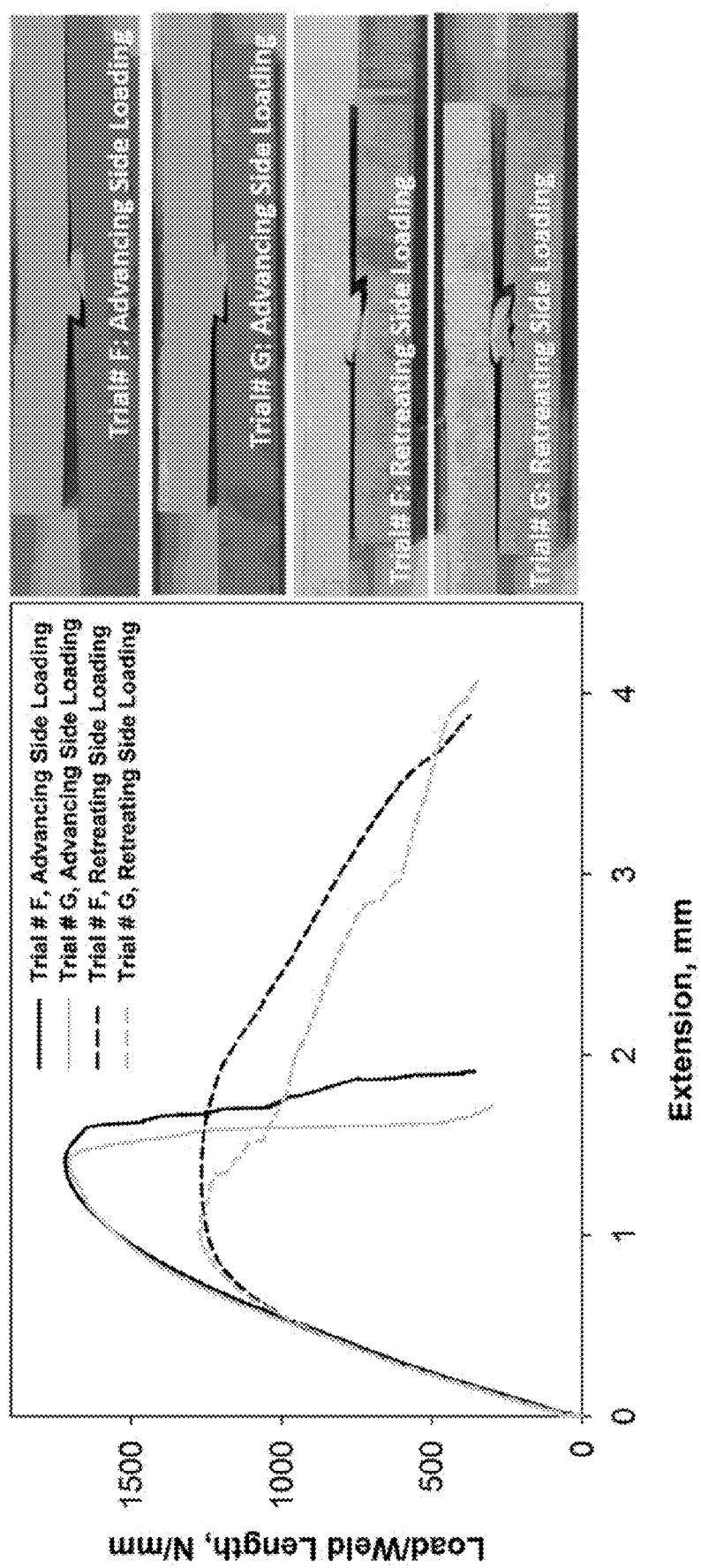
FIG. 36 is both a graph and depiction of materials and a load vs. displacement curve of those materials connected according to an embodiment of the disclosure.

The asymmetrical material flow of AA6061 in the weld cross sections reinforced the need for conducting the lap shear tensile test with AA7099 being loaded on both advancing and retreating side to elucidate any difference in strength. FIG. 36 presents the Load vs. Displacement curve of the trial F (dark lines) and G (gray lines) with load being applied on advancing side (continuous line) and retreating side (dashed lines) in Al during lap shear tensile test. The ascending part of the curve up to peak loads for similar loading configurations are identical for trial F and G as revealed from FIG. 36. Subsequently, the descending part of the curve differ between trial F and G in which the failure of Al is governed by the level of intermixing of two alloys (AA7099 and AA6061). It is also revealed from the FIG. 36 that, the peak load in case of pulling from advancing side of Al is about 35% higher than that with retreating side loading. This can be a demonstration that methods to reduce asymmetry in strength as a function of loading direction are important.

Figure 37:
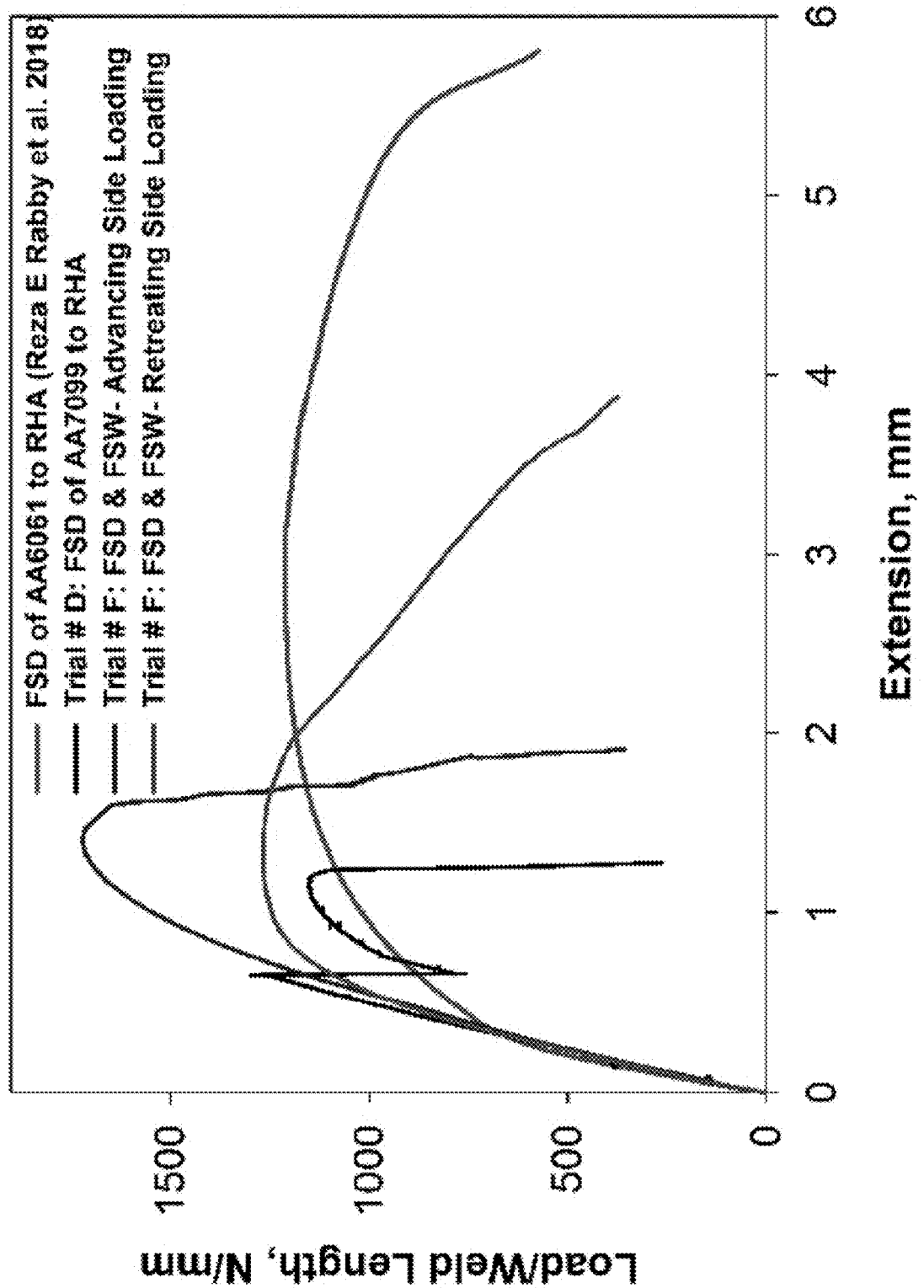
FIG. 37 is a load vs. displacement comparison of materials connected according to an embodiment of the disclosure.

FIG. 37 presents the load vs. displacement curves that comprises of four best FSD trials including AA6061 to RHA, trial D (AA7099 to RHA) and trial F (AA7099 to RHA with AA6061 intermediate layer at dovetail having loading on advancing and retreating sides). It is observed from FIG. 37 that the peak load is higher in case of AA7099 to RHA FSD compared to previously performed AA6061 to RHA FSD joint. However, AA7099 to RHA joint exhibits less ductility due to the presence of Zn rich brittle Fe—Al IMCs in contrast to AA6061 to RHA where Si rich $FeAl_3$ were produced. The load carrying capacity and the ductility of AA7099 to RHA lap joint was further improved with the introduction of AA6061 as an intermediate layer that interlink AA7099 and RHA.

Figure 38A:
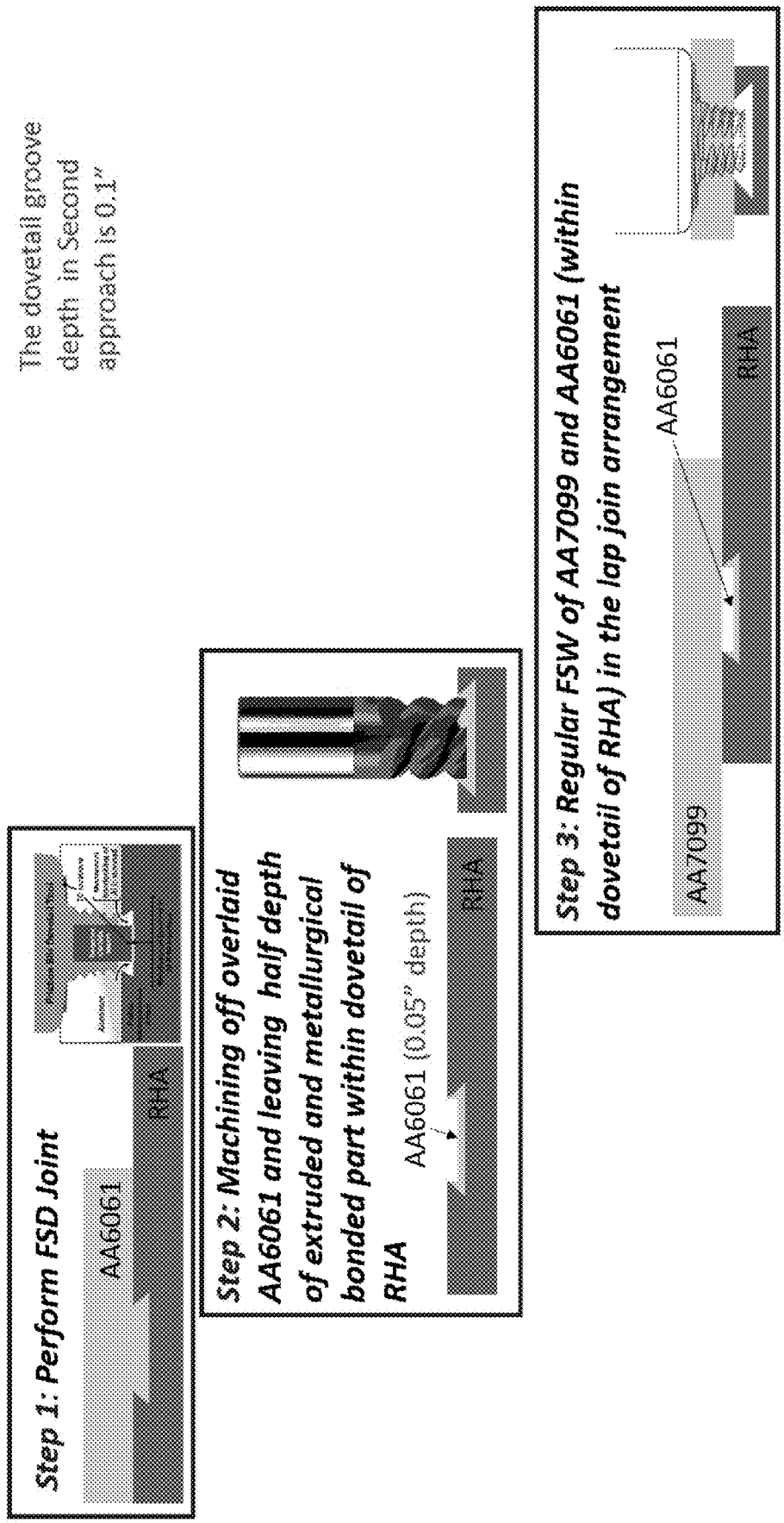
FIG. 38A is a depiction of methods used to connect materials according to an embodiment of the disclosure.

FIG. 38A is a depiction of a method for bonding two dissimilar materials according to an embodiment of the disclosure. In accordance with this method, first material can be placed within the groove of a second material, with the first material leaving at least a portion of the groove vacant, a void within the groove. In accordance with an example implementation, the void can be created by removing material from within the groove. In other implementations, the void can exist by placing material in the groove that does not occupy all the groove, thereby leaving a void or voids about the material within the groove.

Referring next to 38B, an additional step after the first 3 steps shown in FIG. 30B is shown, and this step creates an intermediary structure. This material has material 104 within a groove, but also leaves a void 202 within the groove as well. Material 106 is then placed and stir welded to material 102 through material 104 to create a mixture of material 104/106 within the groove. This can be a mixture of the second and third materials. Accordingly, this embodiment or this method includes at least three materials, a steel material, an intermetallic layer within the groove of the steel material, and then an unweldable or typically difficult to bond Al material being bonded to the steel material. Importantly for this method, a void is left within the groove and the intermediate structure.

Figure 38B:
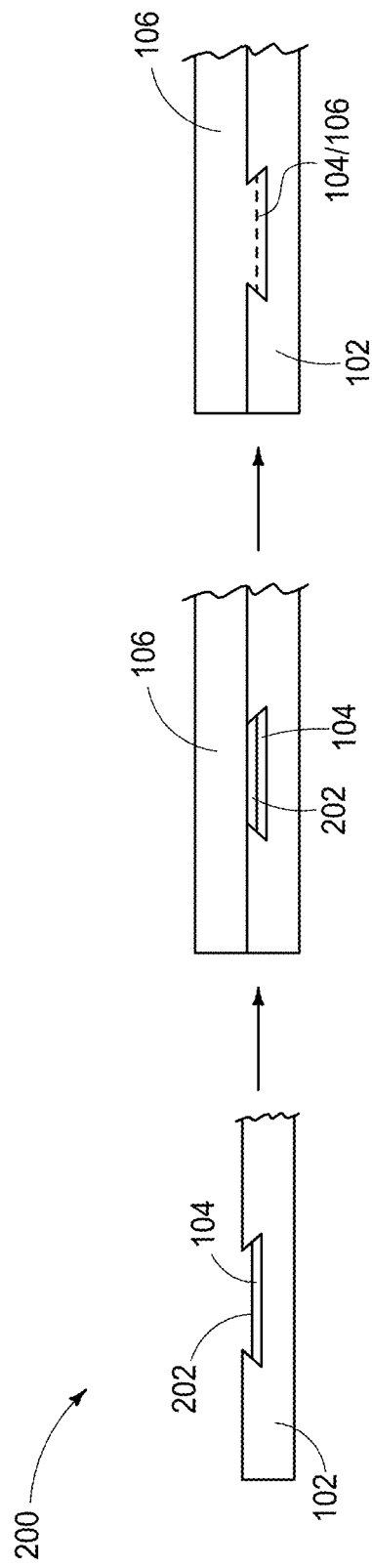
FIG. 38B is a depiction of methods used to connect materials according to an embodiment of the disclosure.
Figure 39:
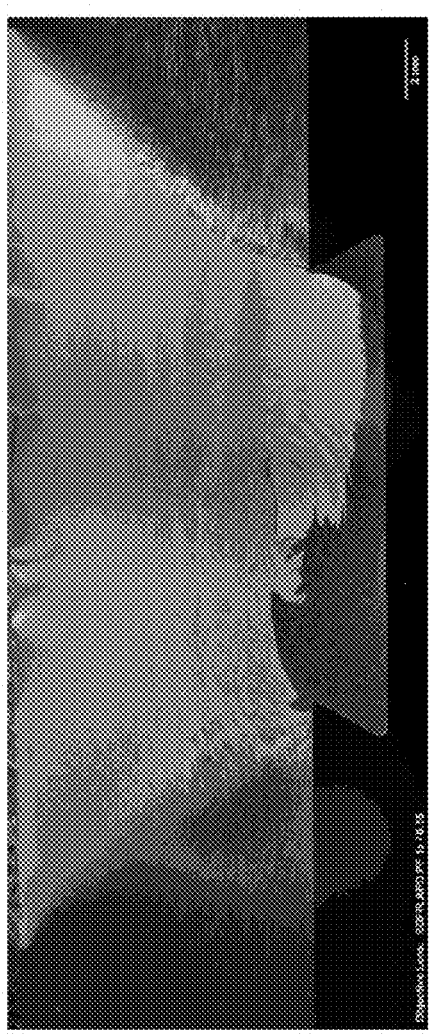
FIG. 39 shows images of materials connected utilizing methods according to an embodiment of the disclosure.
Figure 39:
Figure 40:
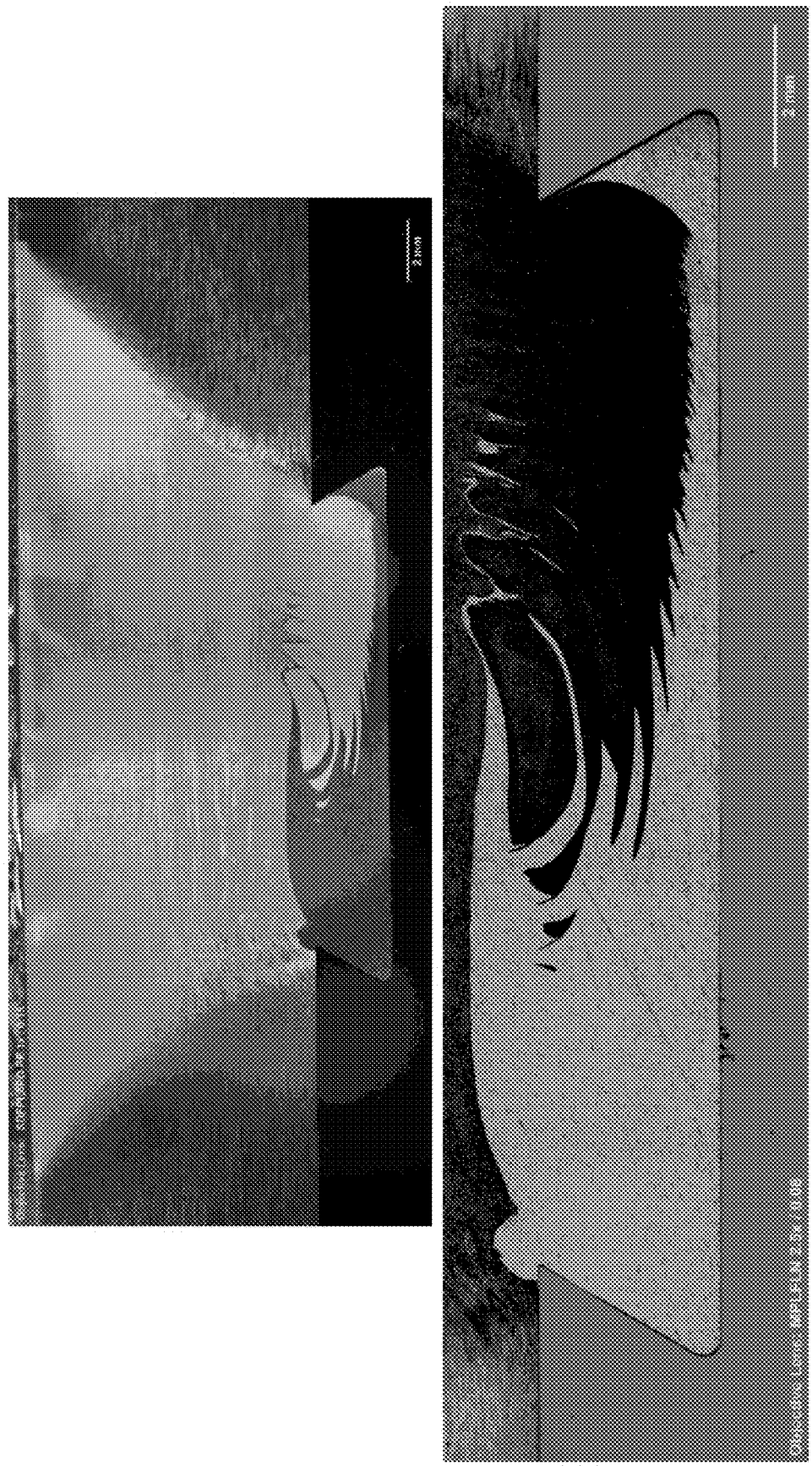
FIG. 40 is an image of materials connected utilizing methods according to an embodiment of the disclosure.

Referring to FIGS. 39 and 40, depictions of the materials bonded to one another using the methods of FIGS. 38A and 38B are shown wherein the stir welded material is mixed with the material within the groove to form a connection between steel material and the Al material.

Figure 41:
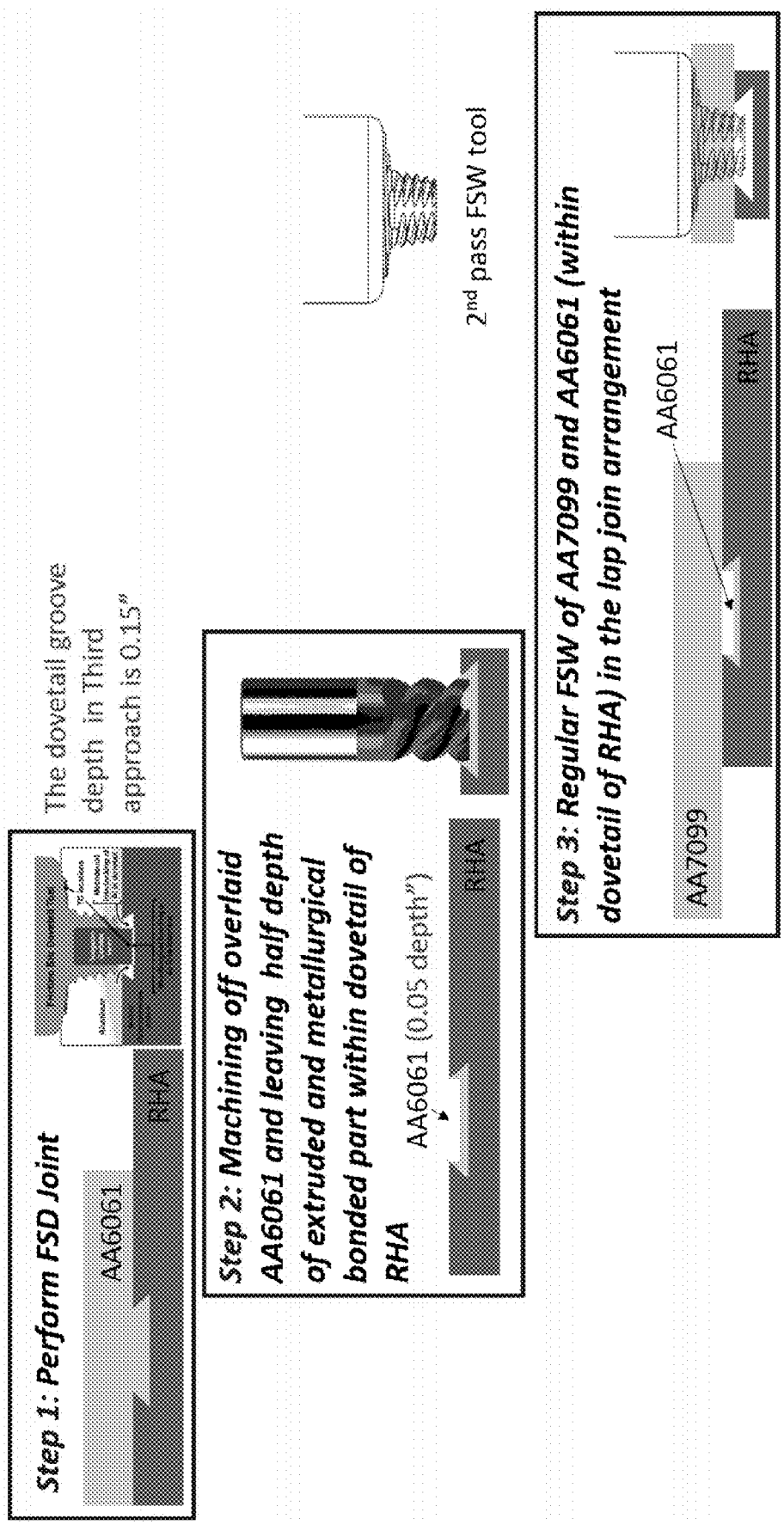
FIG. 41 is a depiction of methods used to connect materials according to an embodiment of the disclosure.
Figure 42:
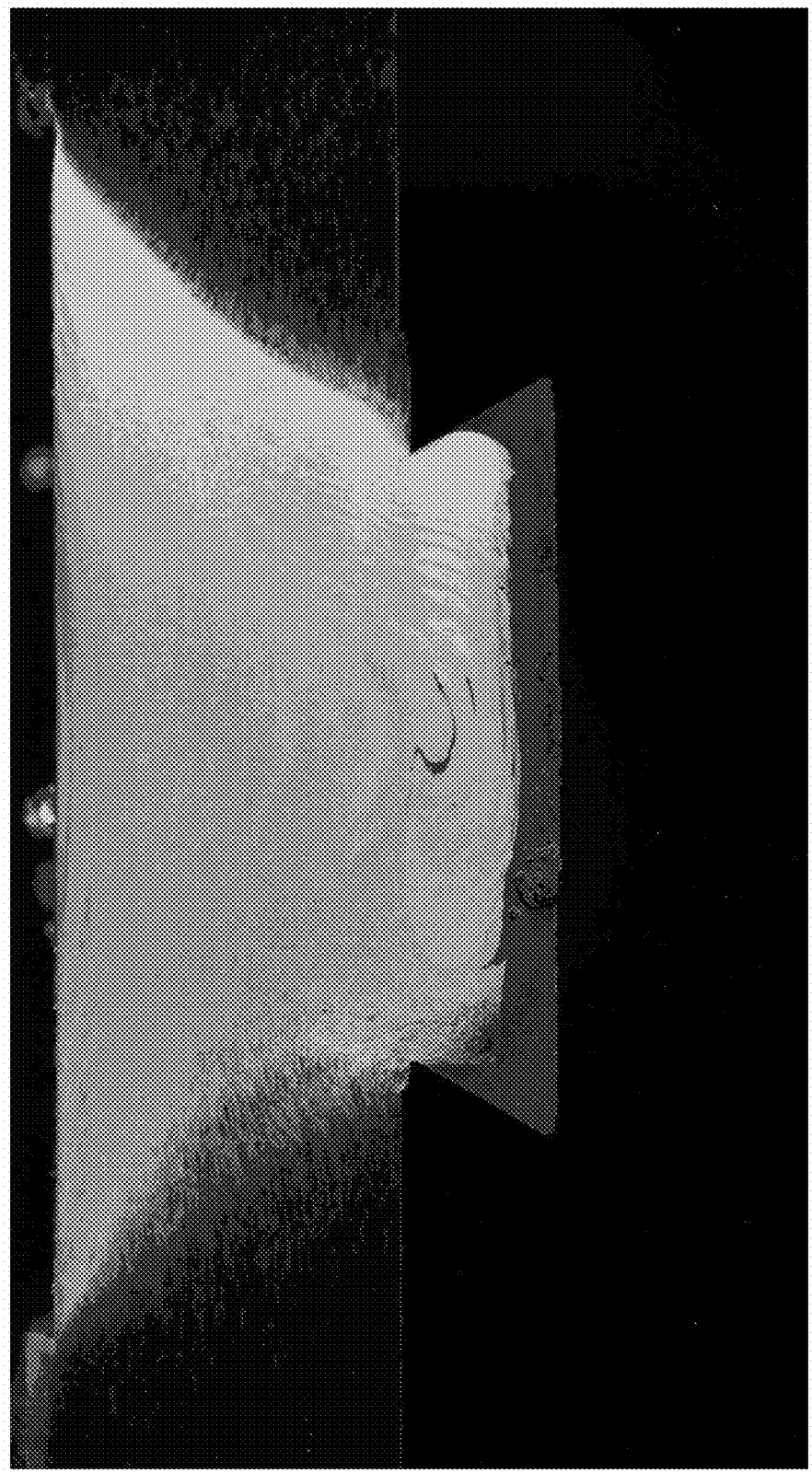
FIG. 42 is a depiction of materials connected according to an embodiment of the disclosure.
Figure 43:
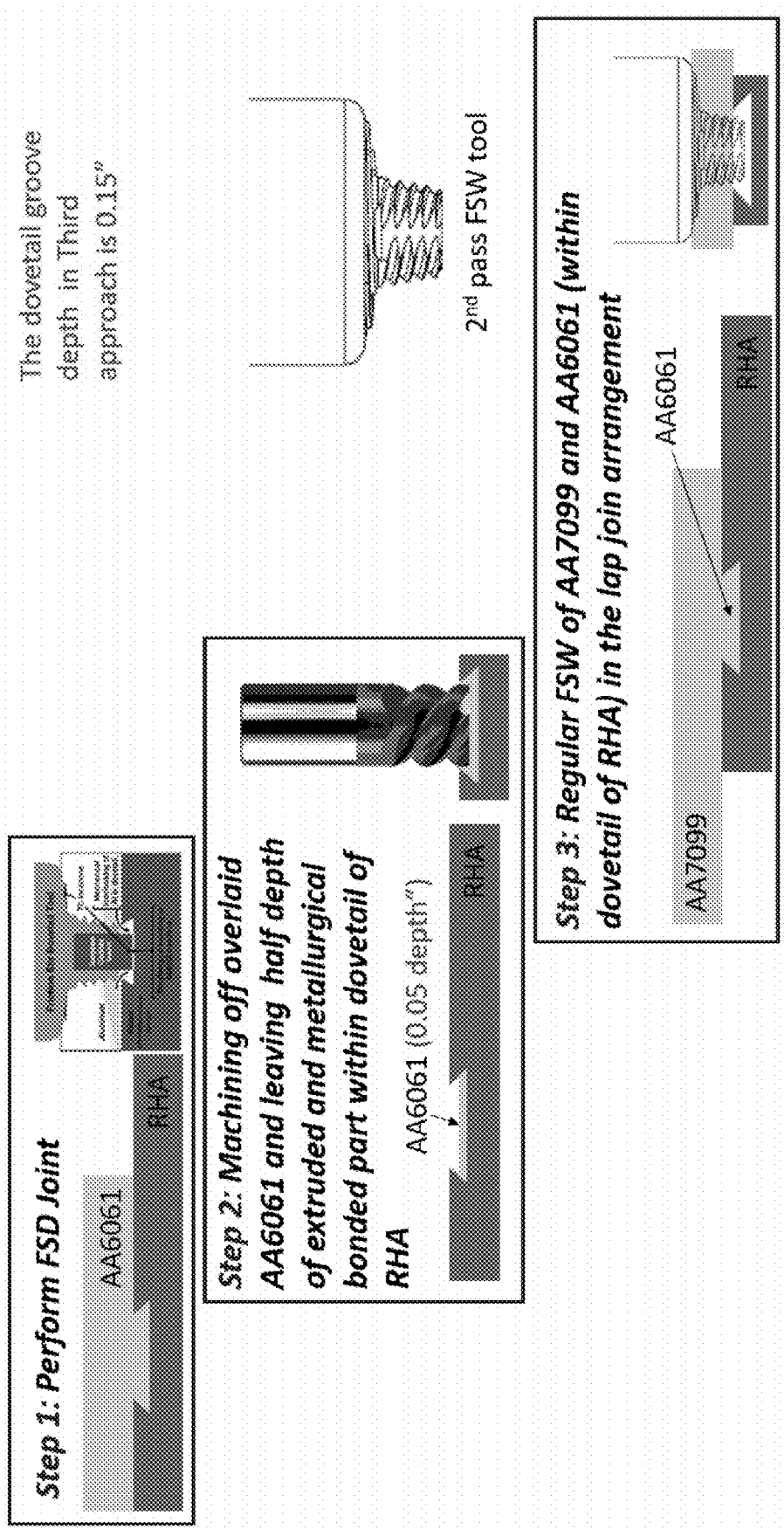
FIG. 43 is a depiction of a method utilized to connect materials according to an embodiment of the disclosure.
Figure 44:
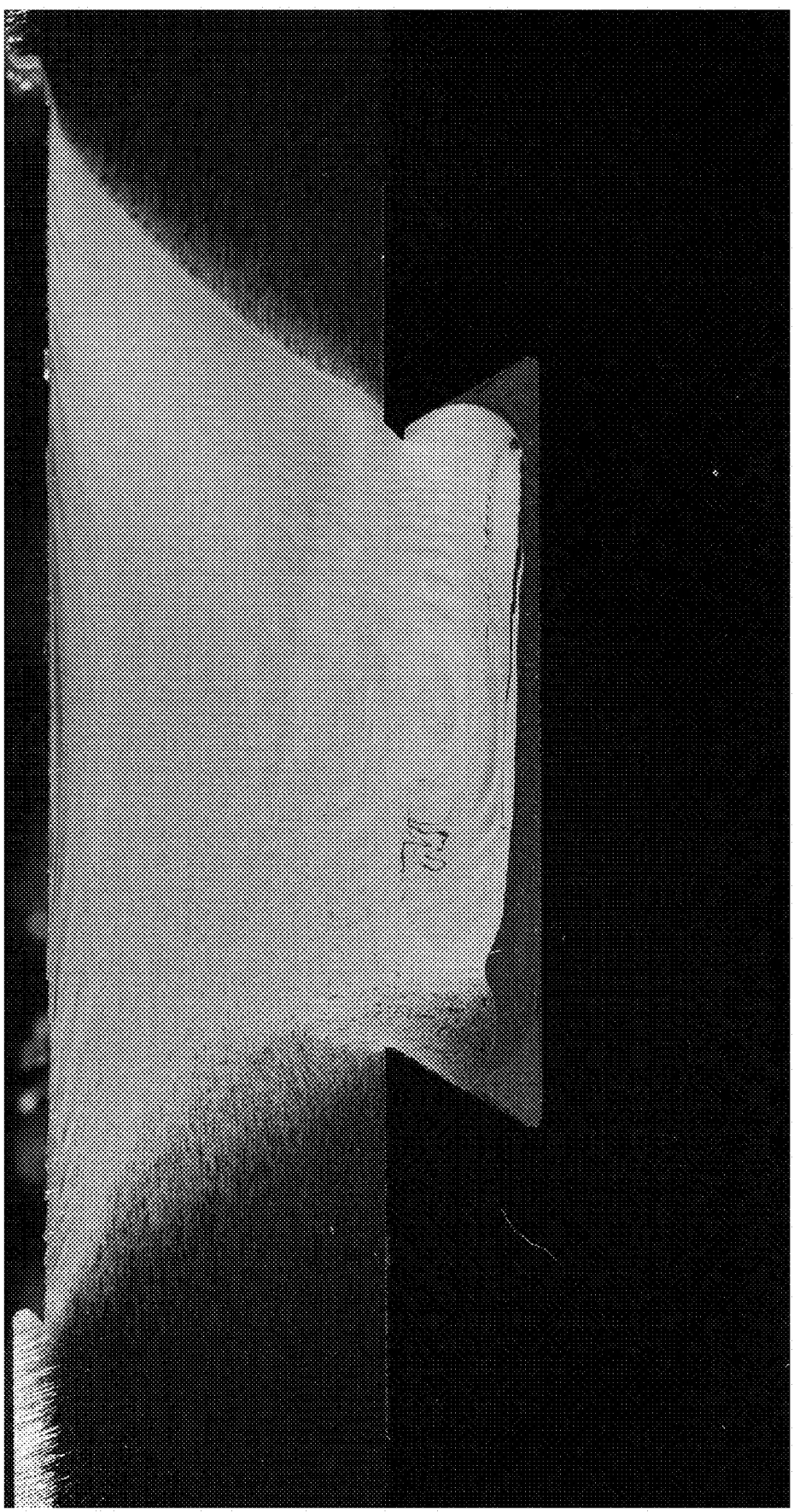
FIG. 44 is a depiction of materials connected according to an embodiment of the disclosure.

Referring next to FIG. 41, another method is shown for bonding two materials that includes the preparation of a rectangular void. This method utilizes the depicted tool for the second pass. An SEM depiction of the connection of these materials is shown in FIG. 42. Referring next to FIG. 43, another method is shown that includes the preparation of a trapezoidal void, and accordingly, a depiction of the materials bonded are shown in FIG. 44. Using these approaches, FIGS. 42 and 44 demonstrate, for example, that movement of AA6061 above the top of the dovetail groove can be prevented. Thus with the dovetail or trapezoidal void, strength and/or symmetry of the joint is greatly improved.

Figure 45:
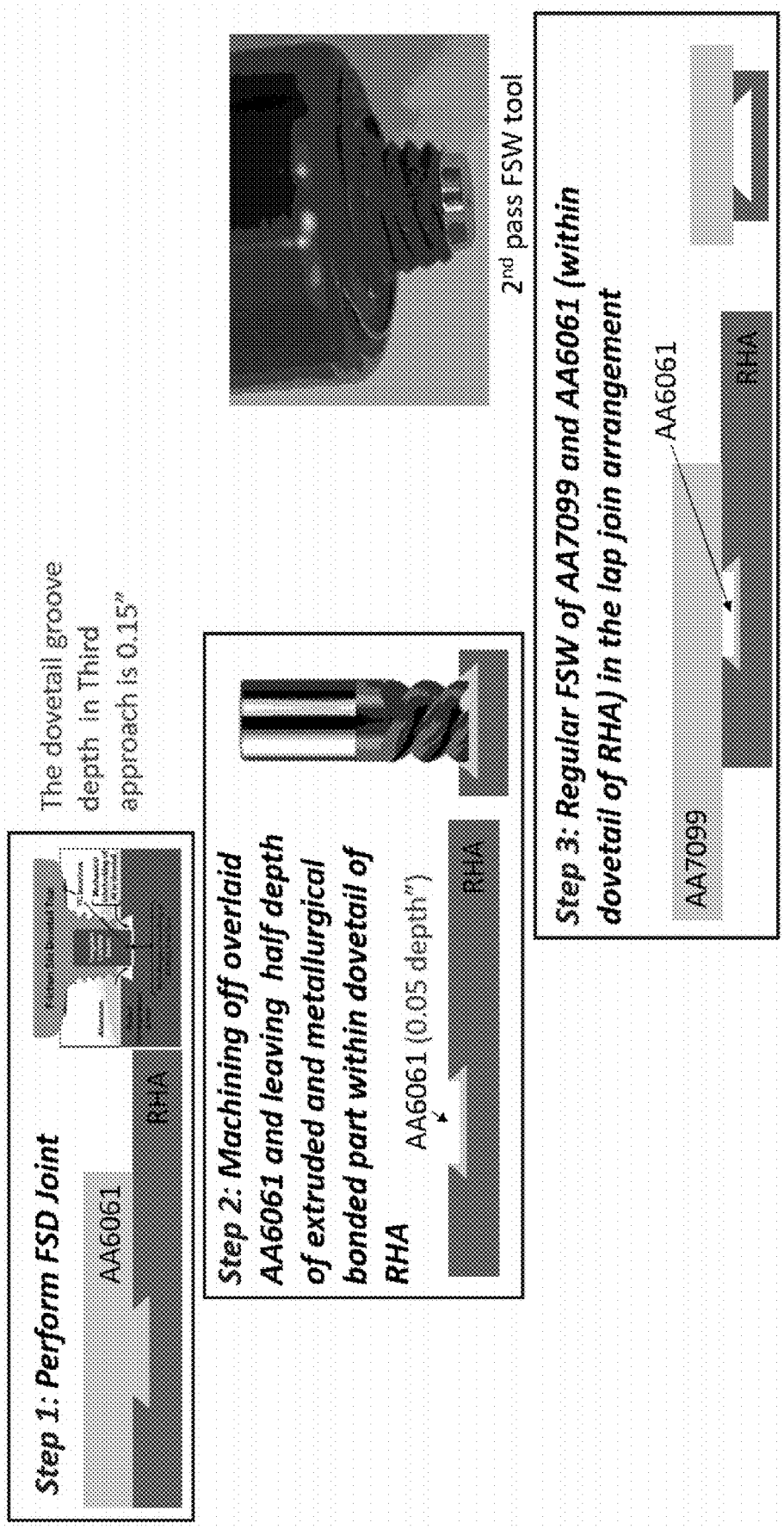
FIG. 45 is a depiction of methods used to connect materials according to an embodiment of the disclosure.
Figure 46:
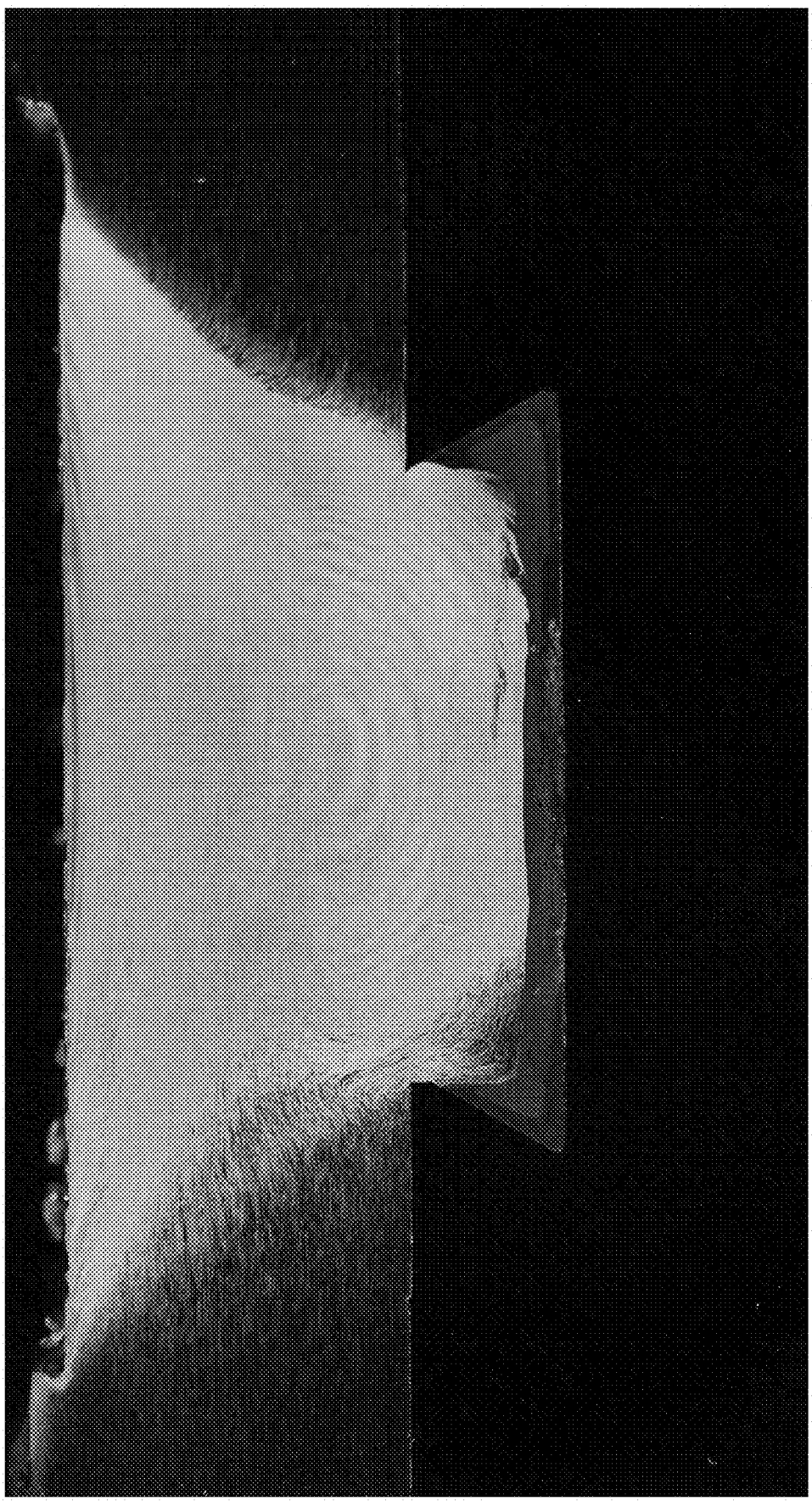
FIG. 46 is a depiction of materials connected according to an embodiment of the disclosure.
Figure 47:
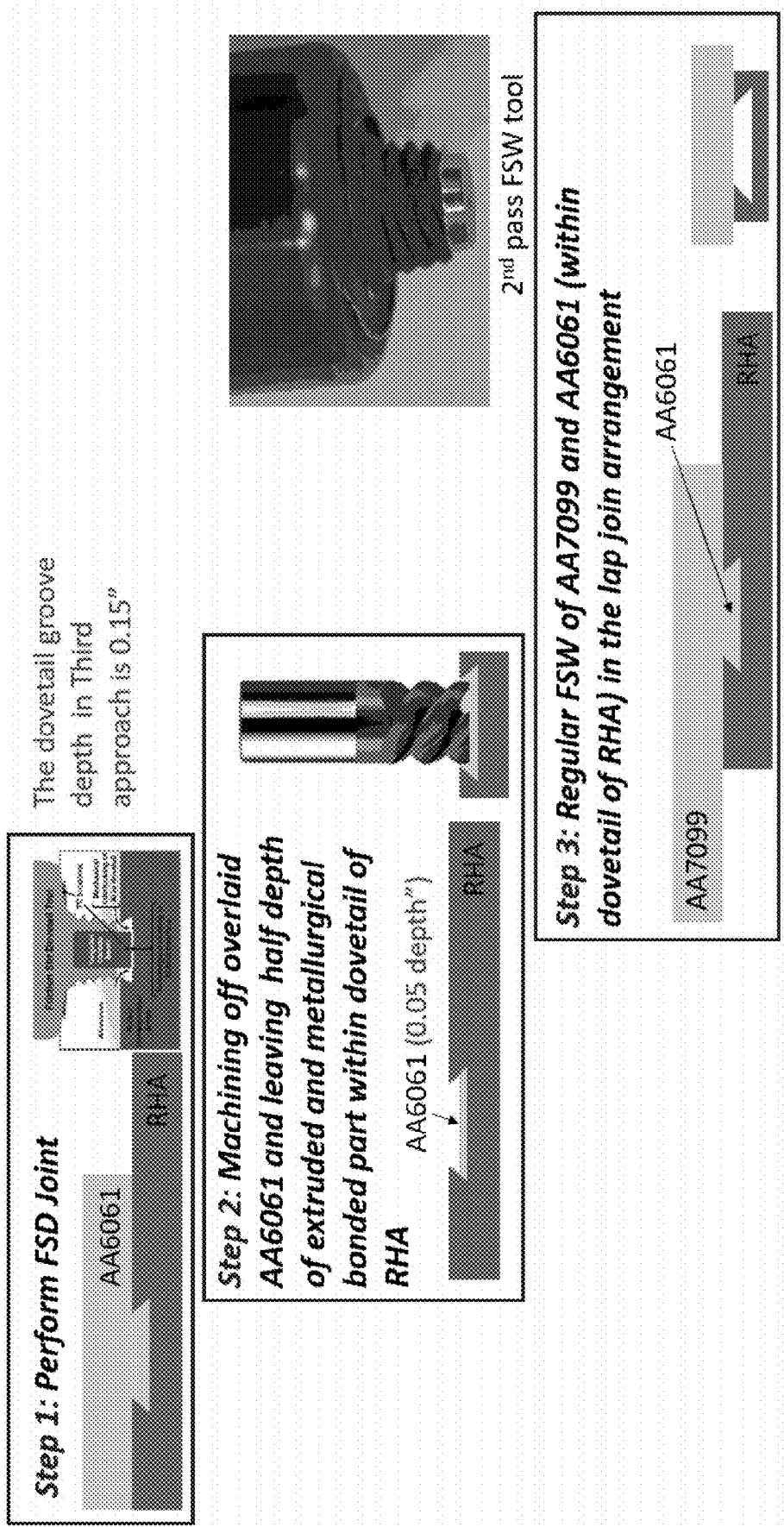
FIG. 47 is a depiction of methods used to connect materials according to an embodiment of the disclosure.
Figure 48:
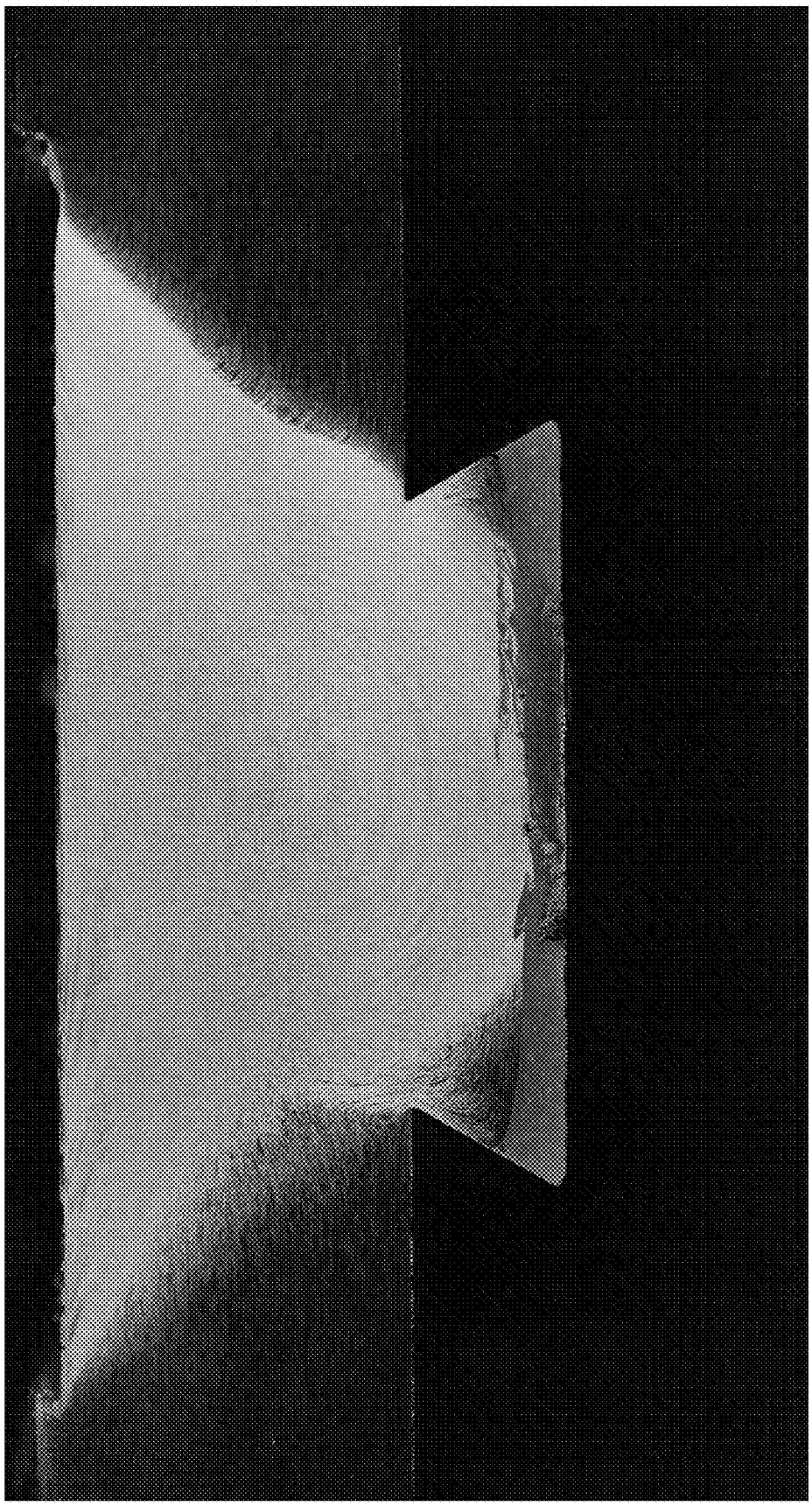
FIG. 48 is a depiction of materials connected according to an embodiment of the disclosure.

Next, with reference to FIG. 45, another method is shown, employing a rectangular void, with the second pass FSW tool of the present disclosure (FIG. 52) having threads machined off near the tip. The materials are bonded are shown in FIG. 46. Another method is shown in FIG. 47, employing a trapezoidal void, with the FSW tool of the present disclosure (FIG. 52), and the materials bonded as shown in FIG. 48. Using these approaches, FIGS. 46 and 48 show, for example, that movement of AA6061 above the top of the dovetail groove has been prevented. Thus with the FSW tool of the present disclosure and the dovetail groove, strength and symmetry of the joint is improved.

Figure 49:
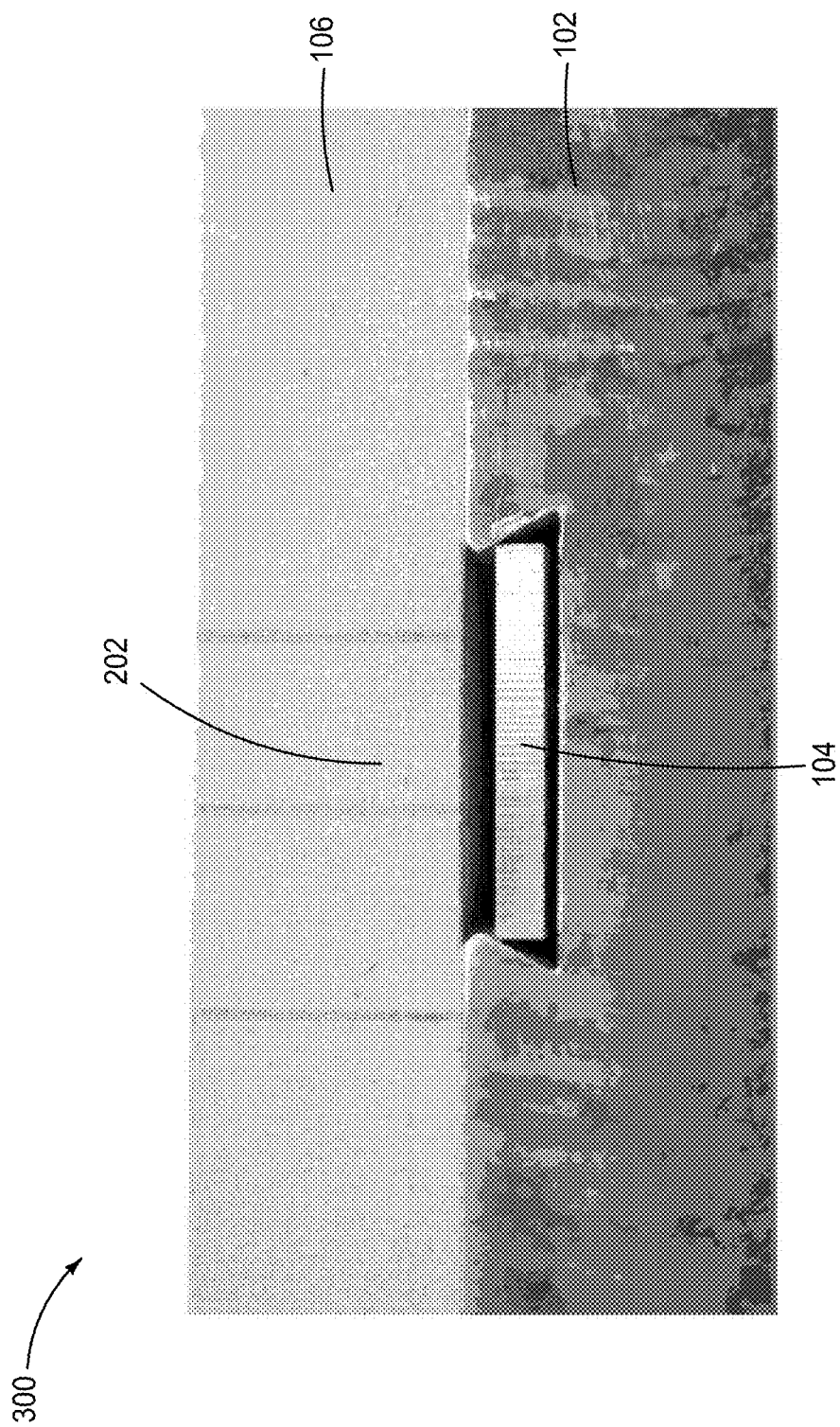
FIG. 49 is an example depiction of an intermediate assembly utilized in a method to connect materials according to an embodiment of the disclosure.
Figure 50:
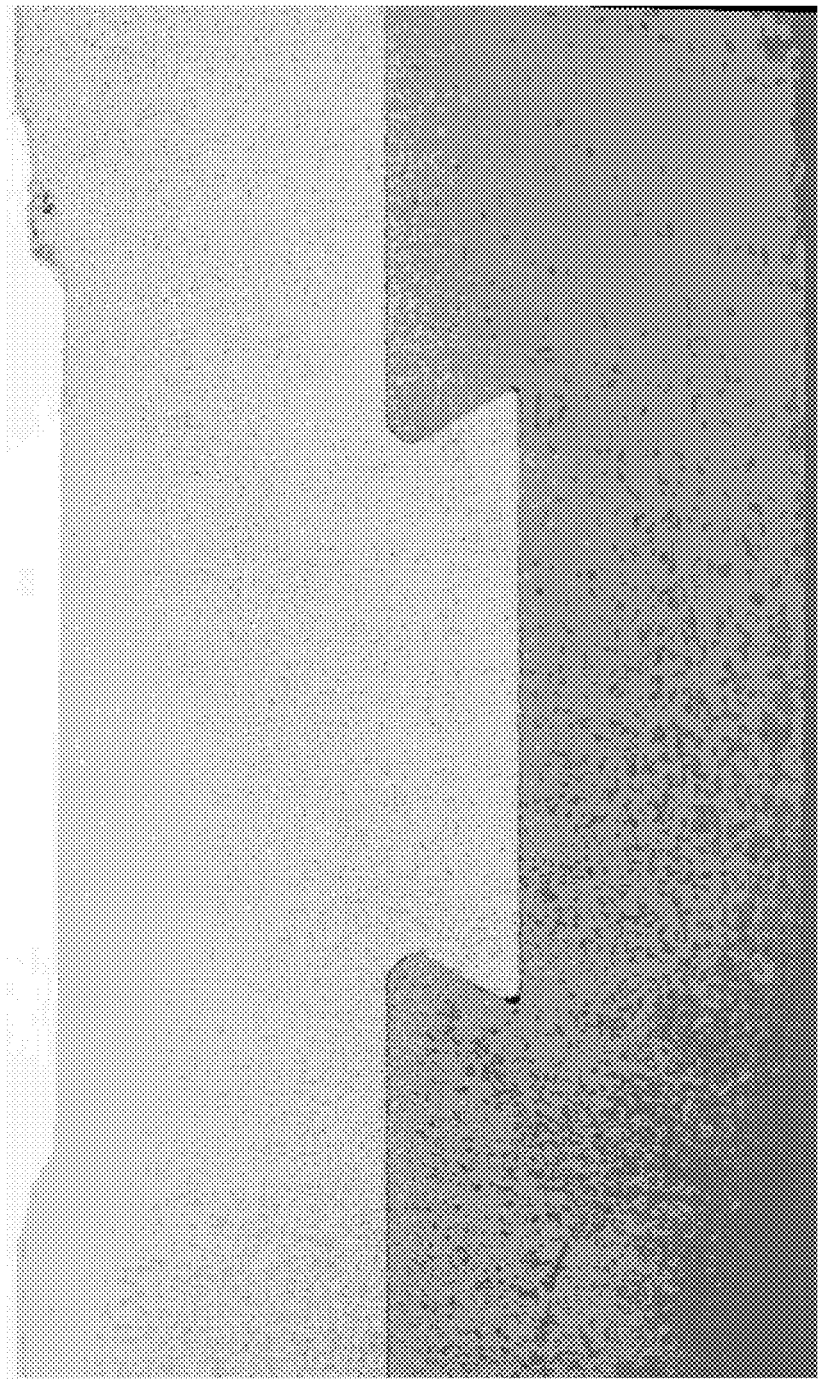
FIG. 50 is a depiction of materials connected utilizing methods according to an embodiment of the disclosure.
Figure 51:
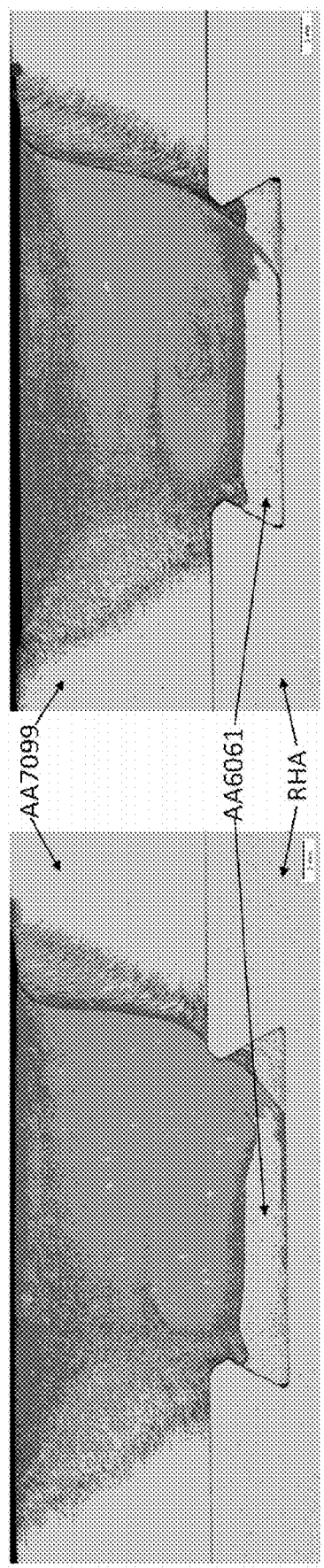
FIG. 51 is a comparison of materials connected utilizing two different methods according to an embodiment of the disclosure.

In accordance with yet another example implementation and with reference to FIG. 49, an intermediate structure 300 is shown with a steel member having a groove therein, and a loose or standalone bar or strip of 104 extending within the groove of material 102. In accordance with example implementations, material 106 can rest above this bar and groove combination within this intermediate structure preceding FSD utilizing the tools described herein. In accordance with example implementations, FIG. 50 depicts a bond between 102 and 106 utilizing this intermediate structure. In accordance with example implementations and with reference to FIG. 51, additionally the WC tip temperature can be controlled at 490° C. in particular embodiments, or any other temperature to achieve the desired intermetallic formation at the aluminum-steel interface.

Figure 52:
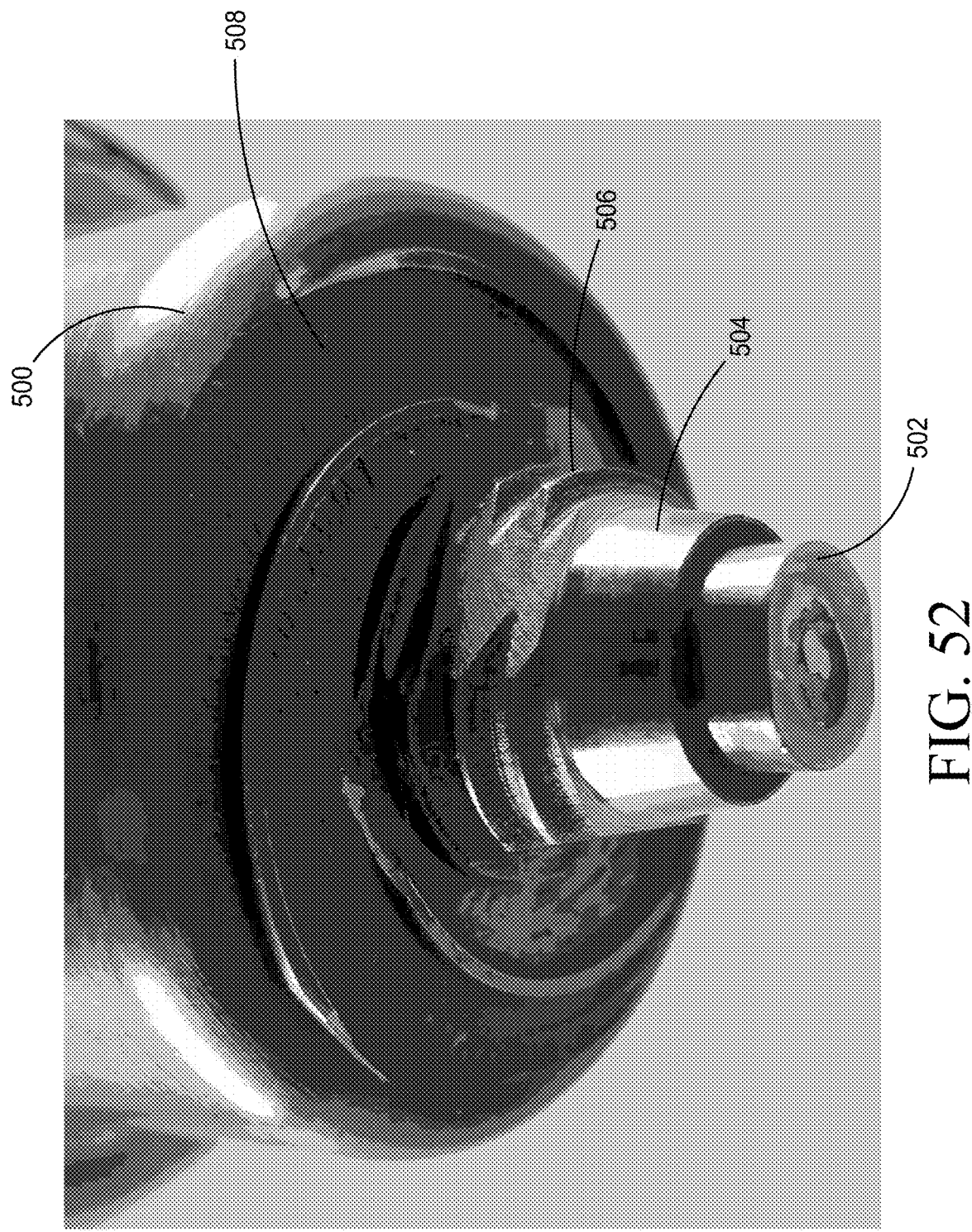
FIG. 52 is a welding tool head according to an embodiment of the disclosure.
Figure 53:
FIG. 53 is a depiction of materials connected utilizing methods and the tool of FIG. 52 according to an embodiment of the disclosure.
Figure 54:
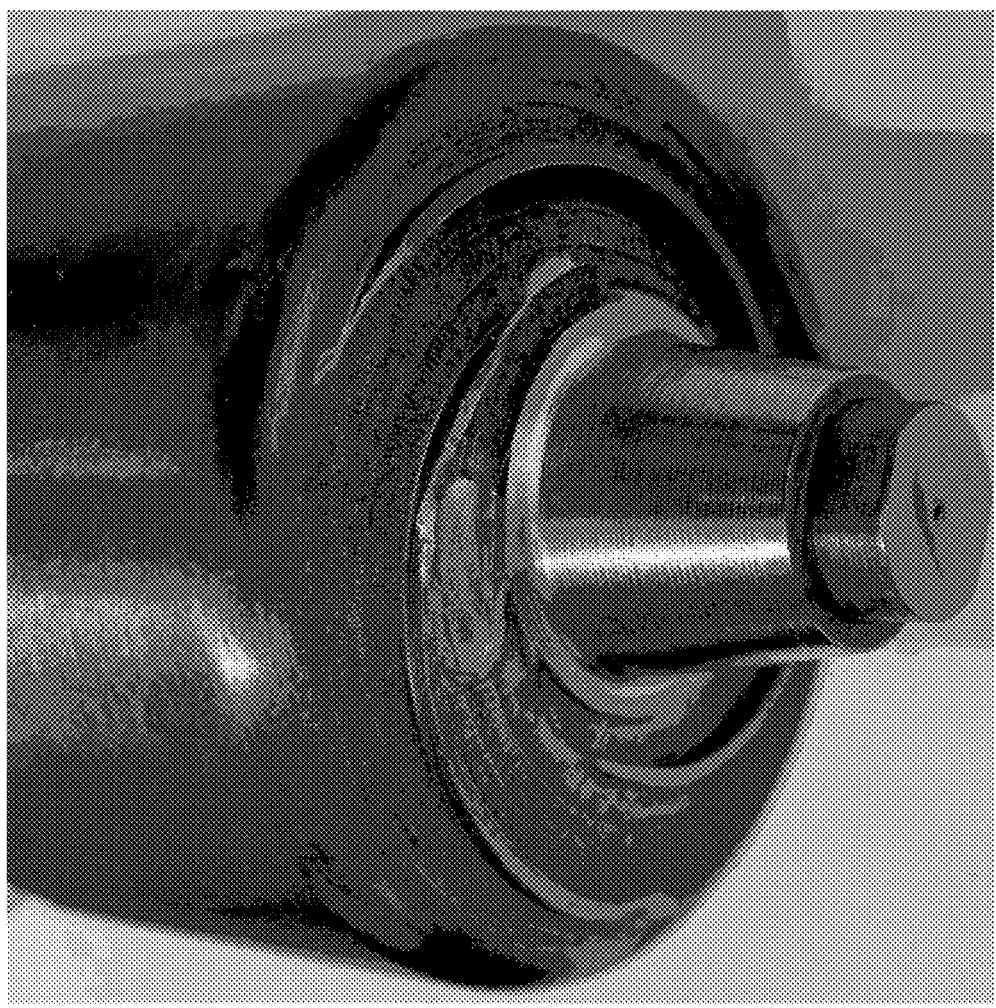
FIG. 54 is an example welding tool head according to an embodiment of the disclosure.
Figure 55:
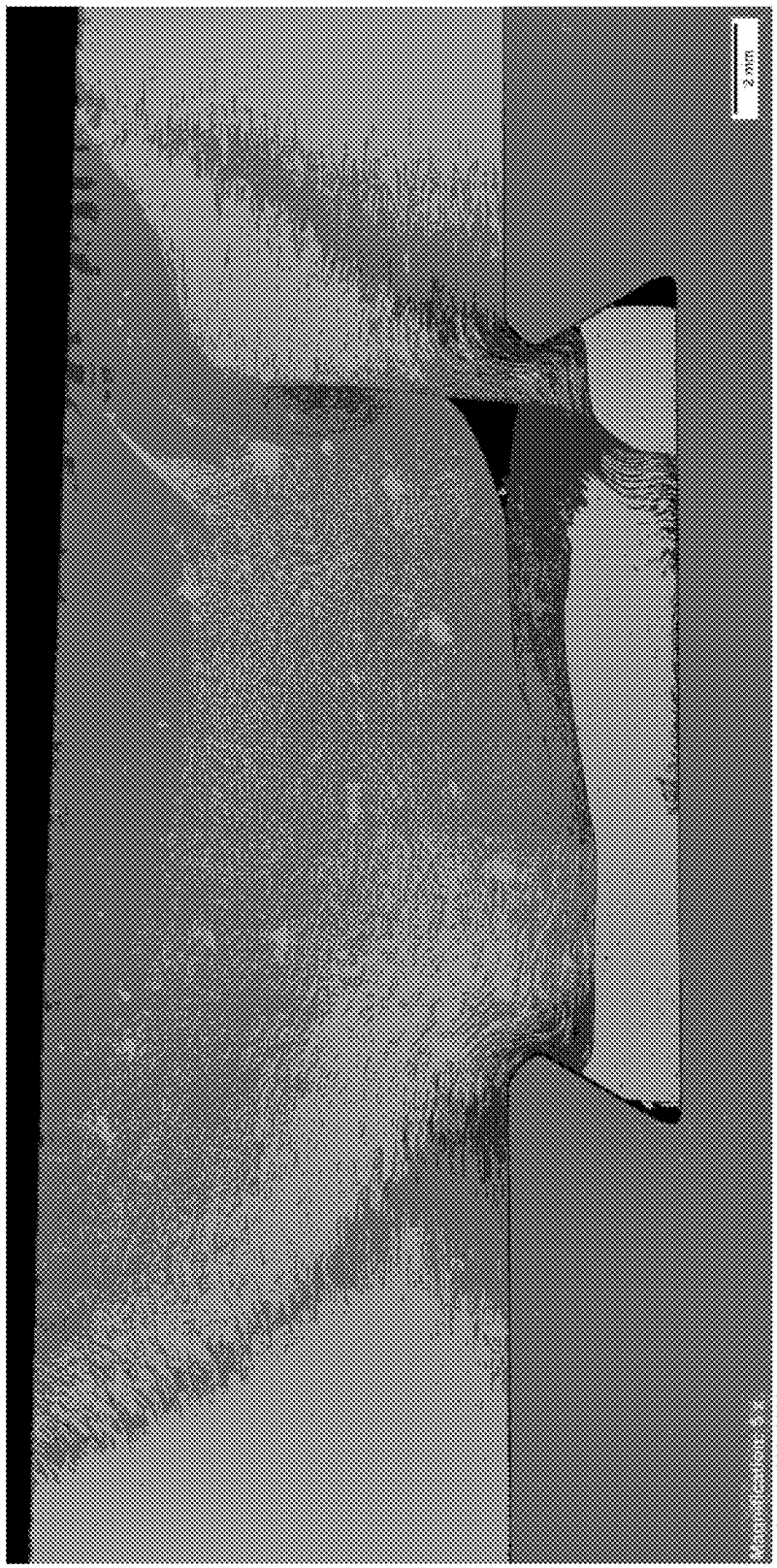
FIG. 55 is a depiction of example materials connected utilizing the tool of FIG. 54 according to an embodiment of the disclosure.

Referring next to FIG. 52, an improved tool head is described for use in combination with the intermediate structure depicted in FIG. 49. Accordingly, the tool structure 500 can have a WC tip 502 as well as a smooth sidewalled frustum 504 as well as threaded portion 506 and the shoulder portion 508 which also includes a partially threaded portion. This portion 508 is described herein with reference to the previously described tool tip. However, one of the differences described here in this tool tip is the smooth frustum portion 504 which extends between the WC tip 502 and the threaded portion which amounts to the base of the conical tip of the tool. In accordance with example implementations, the weld cross section utilizing this tool is depicted in FIG. 53. Accordingly, this amounts to a satisfactory weld and bonding of the materials. In accordance with example implementations, just to demonstrate the differences between a completely smooth frustum as shown in FIG. 54, material was attempted bonded and demonstrated a substantial failure as shown in FIG. 55. In accordance with example implementations, the present disclosure provides methods, intermediate structures, and tools for connecting dissimilar materials.

Figure 56:
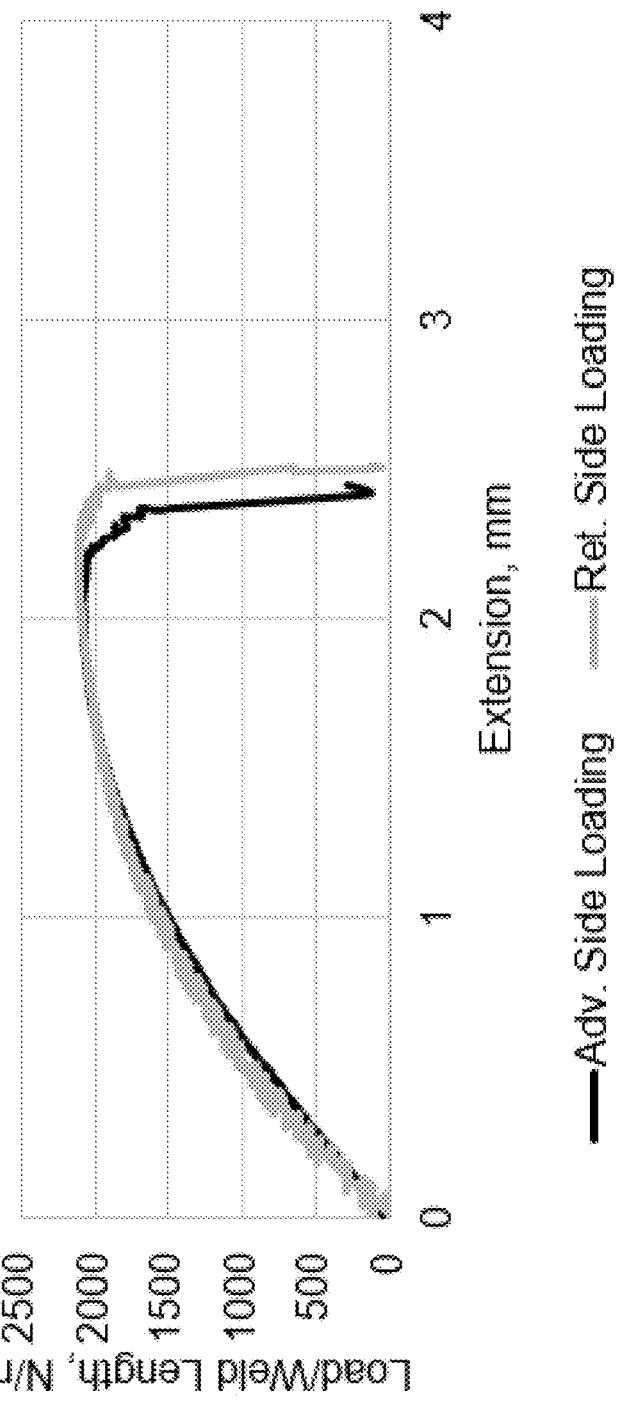
FIG. 56 is a depiction of strength data acquired from materials made using methods of the present disclosure.

Referring next to FIG. 56, strength data corresponding to FIG. 42 pulled toward the advancing and retreating sides is depicted. Notably, strength does not depend on the direction that the joint is loaded because the AA6061 no longer pushes up above the top of the dovetail groove.

Figure 57:
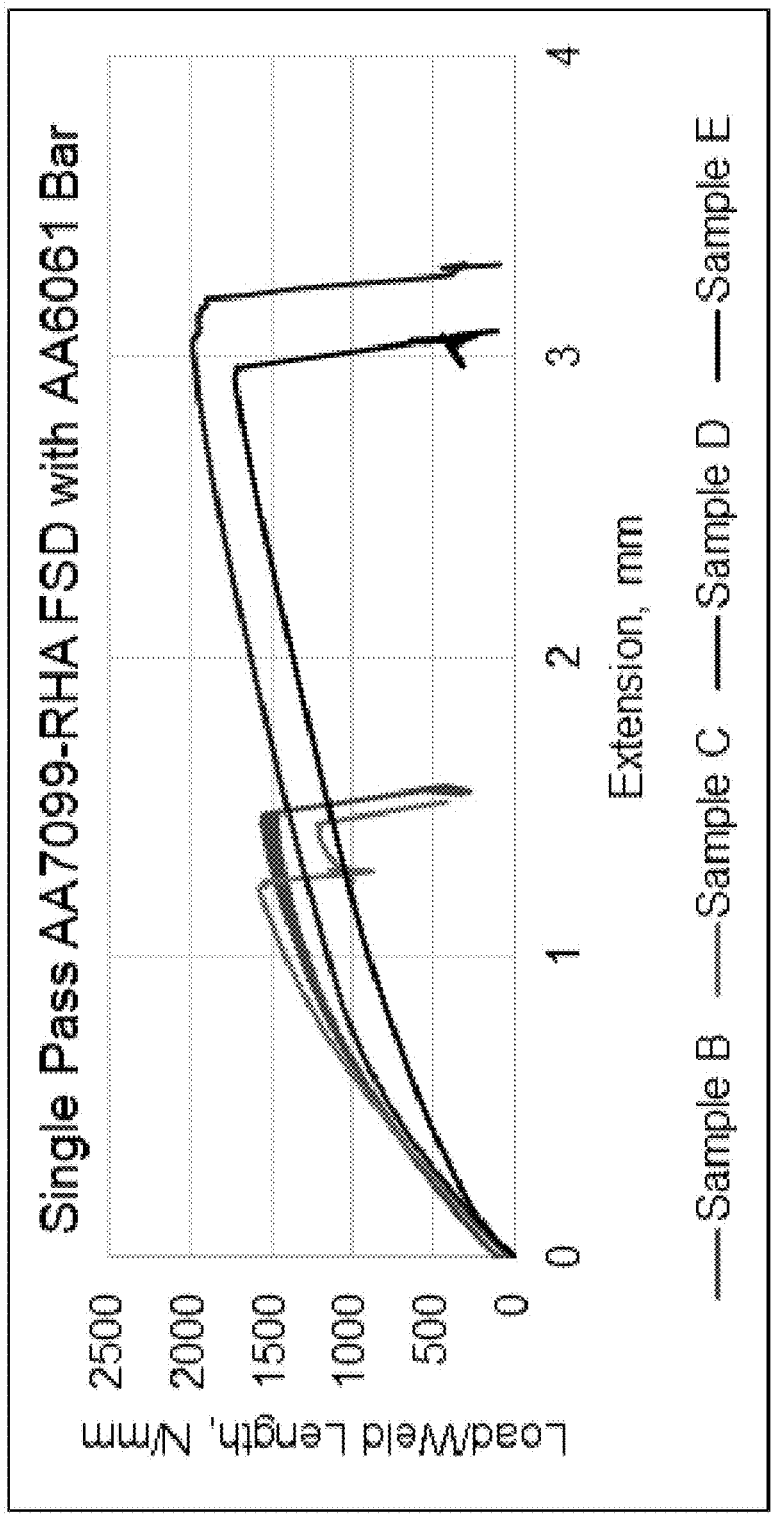
FIG. 57 is a depiction of strength data acquired from materials made using methods of the present disclosure.

Referring next to FIG. 57, similar strength data is shown using the method that formed FIG. 53. Notably, only a single pass as compared to the two passes that were required for the method that formed FIG. 42.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

What is claimed is:

1. A method, comprising:
bonding a first material within a groove of a second material using first friction stir welding, wherein a portion of the first material is then removed leaving at least a portion of the groove vacant;
placing a third material upon the second material and over the groove, wherein the second and third materials are materials of different composition having different melting points; and
using second friction stir welding to heat a mixture of the first material and the second material formed using the first friction stir welding to a temperature sufficient to plasticize and form a bond between the mixture of the first and second materials, and the third material.

2. The method of claim 1, wherein the first and third materials are the same materials.

3. The method of claim 1, wherein the heat is controlled to prevent overheating.

4. The method of claim 1, wherein the first and third materials are aluminum alloys.

5. The method of claim 1, wherein the groove defines a dovetail.

6. The method of claim 1, wherein the third material is extruded into the groove during the second friction stir welding.

7. The method of claim 1, wherein the first material is metallurgically bonded to a base of the groove of the second material due to heat associated with the first friction stir welding.

8. The method of claim 1, wherein the vacant portion occupies an upper portion of the groove opposite a base of the groove.

9. The method of claim 8, wherein the third material fills at least a portion of the upper portion of the groove.

10. The method of claim 1, wherein the vacant portion defines a trapezoid.

11. The method of claim 1, wherein the vacant portion defines a rectangle.

12. A method, comprising:
bonding a first material within a groove of a second material using first friction stir welding;
removing an upper portion of the first material opposite the second material from the groove, the removed upper portion leaving a vacant portion of the groove;
placing a third material upon the second material and over the groove, wherein the second and third materials are materials of different composition having different melting points; and
using second friction stir welding to heat a mixture of the first material and the second material formed using the first friction stir welding to a temperature sufficient to plasticize and form a bond between the mixture of the first and second materials, and the third material.

13. The method of claim 12, wherein a lower portion of the first material remaining in the groove is metallurgically bonded to the second material by the first friction stir welding.

14. The method of claim 12, wherein the vacant portion is at a depth that is half a total depth of the groove.

15. The method of claim 12, wherein the second friction stir welding is performed using a friction stir welding device that extends beyond a thickness of the third material into the groove.

16. The method of claim 15, wherein the friction stir welding device extends beyond the thickness of the third material into the groove to a specified plunge depth to cause a particular amount of strength and ductility.

* * * * *